US011636288B2

(12) United States Patent
Faust et al.

(10) Patent No.: US 11,636,288 B2
(45) Date of Patent: Apr. 25, 2023

(54) PLATFORM, DEVICE AND PROCESS FOR ANNOTATION AND CLASSIFICATION OF TISSUE SPECIMENS USING CONVOLUTIONAL NEURAL NETWORK

(71) Applicant: UNIVERSITY HEALTH NETWORK, Toronto (CA)

(72) Inventors: Kevin Faust, Toronto (CA); Zoya Volynskaya, Toronto (CA); Ugljesa Djuric, Toronto (CA); Phedias Diamandis, Toronto (CA)

(73) Assignee: UNIVERSITY HEALTH NETWORK, Toronto (CA)

( * ) Notice: Subject to any disclaimer, the term of this patent is extended or adjusted under 35 U.S.C. 154(b) by 80 days.

(21) Appl. No.: 16/761,577

(22) PCT Filed: Nov. 6, 2018

(86) PCT No.: PCT/CA2018/051400
§ 371 (c)(1),
(2) Date: May 5, 2020

(87) PCT Pub. No.: WO2019/084697
PCT Pub. Date: May 9, 2019

(65) Prior Publication Data
US 2020/0272864 A1 Aug. 27, 2020

Related U.S. Application Data

(60) Provisional application No. 62/582,068, filed on Nov. 6, 2017.

(51) Int. Cl.
*G06N 3/04* (2006.01)
*G06K 9/62* (2022.01)
(Continued)

(52) U.S. Cl.
CPC ......... *G06K 9/6267* (2013.01); *G06K 9/6228* (2013.01); *G06K 9/6256* (2013.01);
(Continued)

(58) Field of Classification Search
CPC combination set(s) only.
See application file for complete search history.

(56) References Cited

U.S. PATENT DOCUMENTS 10,049,450 B2 * 8/2018 Madabhushi ............ G06N 3/08
10,223,788 B2 * 3/2019 Bozorgtabar ......... G06T 7/0012
(Continued)

FOREIGN PATENT DOCUMENTS

WO 2017051191 A2 3/2017

OTHER PUBLICATIONS

WIPO, International Search Report and Written Opinion of International Application No. PCT/CA2018/051400 dated Jan. 23, 2019.
(Continued)

*Primary Examiner* — Tsung Yin Tsai
(74) *Attorney, Agent, or Firm* — Norton Rose Fulbright Canada LLP

(57) ABSTRACT

Embodiments described herein provide a platform, device and process for digital pathology that enable multi-level annotation and visualization of histopathologic slides using a modular arrangement of deep convolutional neural networks (CNNs). The CNNs can be trained using pathology images (e.g., in some cases increasing the base of data by breaking larger fields of view into smaller ones) to learn features consistent with certain pathologies. The platform can use the CNNs to visually annotate pathology slides at an interface tool of a display device. The platform can automate the process of selection, as well as provide an opportunity for the pathologist to see a depiction of predicted results. The platform can use the CNNs to identify regions of interest on
(Continued)

pathology slides. The interface tool can enable a predicted region of interest (ROI) type to be visually presented on a surface map showing the basis of the prediction. If the ROI primarily lands in part of the hyperdimensional space not occupied by any training set, then the interface tool is capable of marking it as an ROI of unknown type.

20 Claims, 48 Drawing Sheets

(51) Int. Cl.
*G06N 3/08* (2023.01)
*G06T 7/00* (2017.01)

(52) U.S. Cl.
CPC ............ *G06N 3/0454* (2013.01); *G06N 3/08* (2013.01); *G06T 7/0012* (2013.01); *G06T 2207/20081* (2013.01); *G06T 2207/20084* (2013.01); *G06T 2207/30096* (2013.01); *G06V 2201/03* (2022.01)

(56) References Cited

U.S. PATENT DOCUMENTS

| | | | | |
|---|---|---|---|---|
| 10,346,982 | B2* | 7/2019 | Podilchuk | G06T 7/223 |
| 10,445,879 | B1* | 10/2019 | Fuchs | G16H 50/30 |
| 10,528,848 | B2* | 1/2020 | Madabhushi | G06T 7/0012 |
| 10,846,367 | B2* | 11/2020 | Madabhushi | G06V 10/454 |
| 11,080,855 | B1* | 8/2021 | Beck | G06F 16/5854 |
| 2002/0097902 | A1* | 7/2002 | Roehrig | A61B 6/032 |
| | | | | 382/132 |
| 2017/0161891 | A1* | 6/2017 | Madabhushi | G06V 10/82 |
| 2017/0200067 | A1* | 7/2017 | Zhou | G06V 10/443 |
| 2018/0053300 | A1* | 2/2018 | Podilchuk | G06T 7/0016 |
| 2018/0061046 | A1* | 3/2018 | Bozorgtabar | G06K 9/6269 |
| 2018/0129911 | A1* | 5/2018 | Madabhushi | G06K 9/627 |
| 2018/0165808 | A1* | 6/2018 | Bagci | G06V 10/44 |
| 2018/0165809 | A1* | 6/2018 | Stanitsas | G06T 5/40 |
| 2018/0300576 | A1* | 10/2018 | Dalyac | G06N 20/00 |
| 2018/0322327 | A1* | 11/2018 | Smith | G06V 10/764 |
| 2019/0087532 | A1* | 3/2019 | Madabhushi | G06T 7/0012 |
| 2019/0259157 | A1* | 8/2019 | Madabhushi | G16B 50/00 |
| 2019/0295252 | A1* | 9/2019 | Fuchs | G06K 9/6277 |

OTHER PUBLICATIONS

"Automatic detection of invasive ductal carcinoma in whole slide images with Convolutional Neural Networks", Cruz-Roa et al., Proceedings vol. 9041, Medical Imaging 2014: Digital Pathology, Mar. 2014 (Mar. 2014), pp. 1-15, DOI:10.1117/12.2043872 [online] [retrieved on Dec. 3, 2018 (Dec. 3, 2018)] Retrieved from the Internet: <https://pdfs.semanticscholar.org/0c23/73773b8bc6bb439a95a0c86b16ad107e6c7c.pdf>.

"Detection and Classification of Thyroid Follicular Lesions Based on Nuclear Structure from Histopathology Images", Wang et al., Cytomery Part A: the journal of the International Society for Analytical Cytology, May 2010 (May 2010), pp. 485-494, DOI:10.1002/cyto.a.20853 [online] [retrieved on Dec. 3, 2018 (Dec. 3, 2018)] Retrieved from the Internet: <https://onlinelibrary.wiley.com/doi/pdf/10.1002/cyto.a.20853>.

* cited by examiner

400

Receiving an unclassified pathology image
402

↓

Generating classification data using CNN(s) trained on pathology images to learn pathology features
404

↓

Generating output indications of regions of interest on digital pathology slides using the classification data, the regions of interest including a predicted region of interest (ROI) type of a hyperdimensional space and a surface map showing the basis of the prediction
406

↓

Visually annotating digital pathology slides
408

↓

Generate interface at interface tool or application
410

Store/transmit data
412

FIG. 4

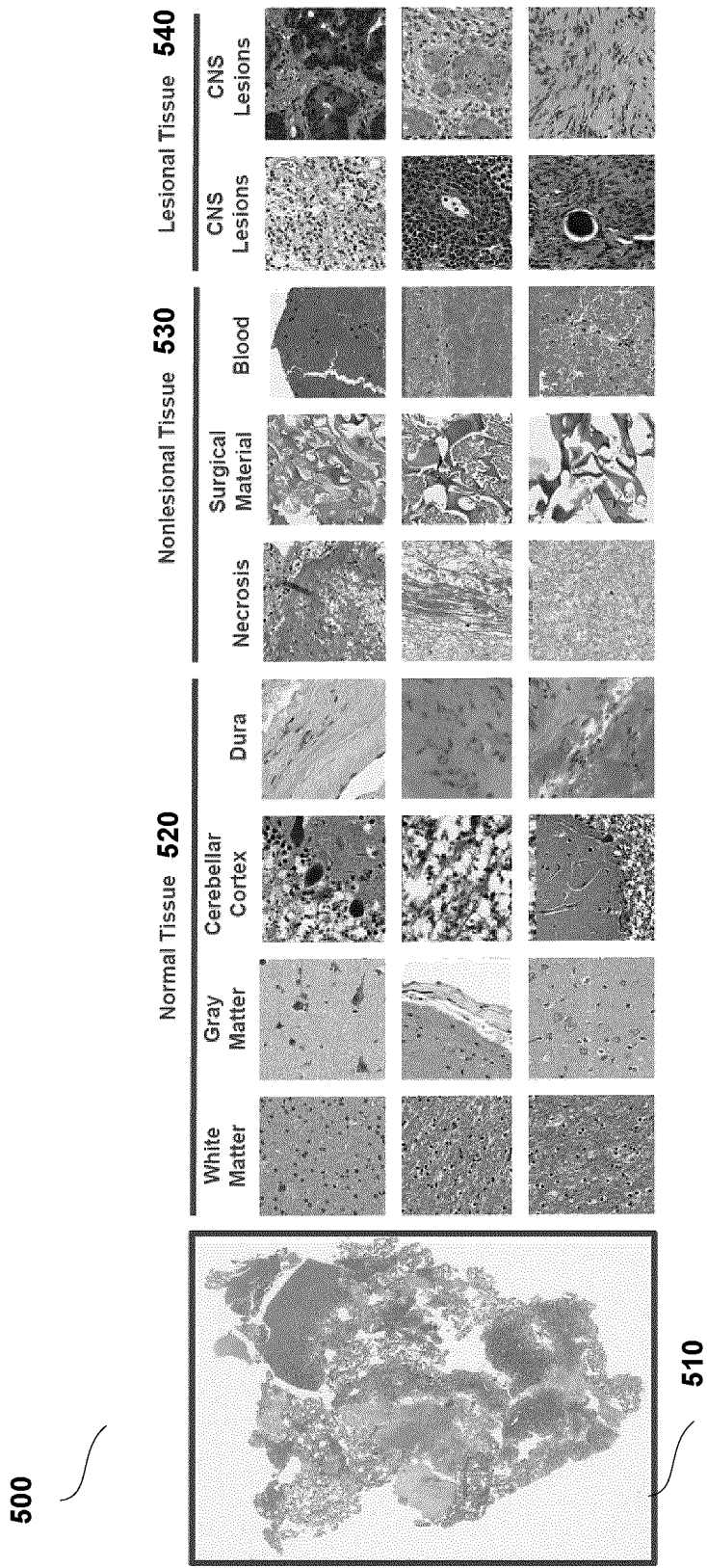

Inter- and Intra-slide tissue class variability in surgical neuropathology challenging automation. Left most panel showing whole slide H&E-stained image of a glioblastoma containing a heterogenous mixture of tumor, necrosis, normal brain tissue, blood and surgical material. The tumor comprises <30% of the slide's surface. Remaining smaller panels show common tissue classes often encountered in routine pathology specimens. This diversity, if not accounted for, can result in erroneously classification errors (e.g. mistaking dura for schwannoma). Inclusion of these classes allows for more accurate annotation of slides and improved lesion segmentation for future classification tasks.

FIG. 5

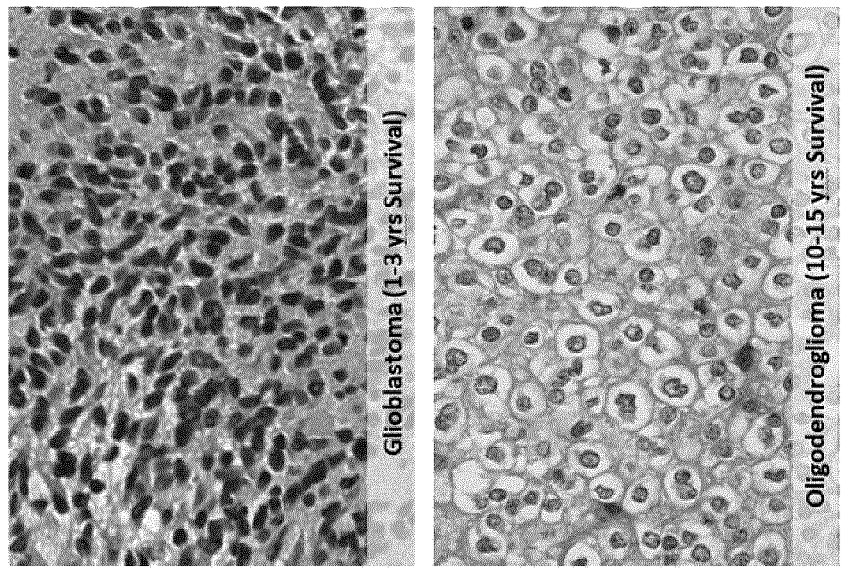
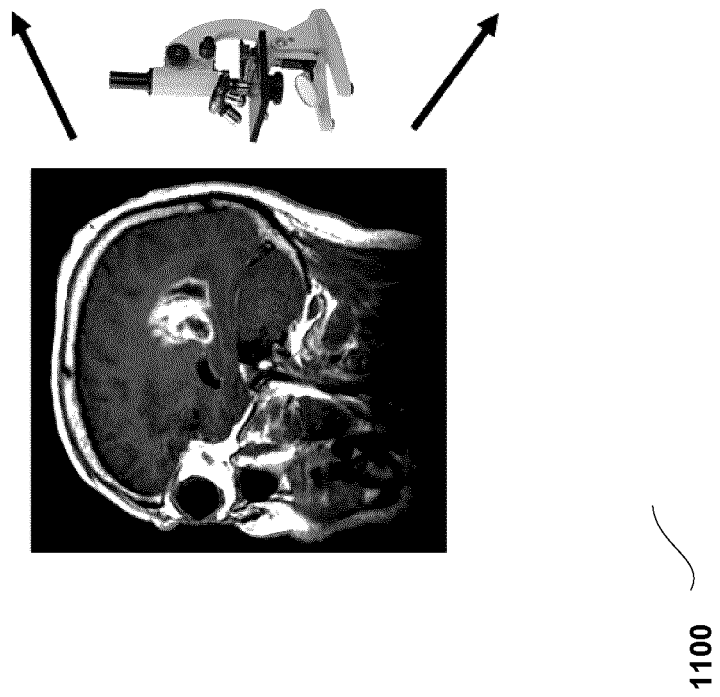
FIG. 11

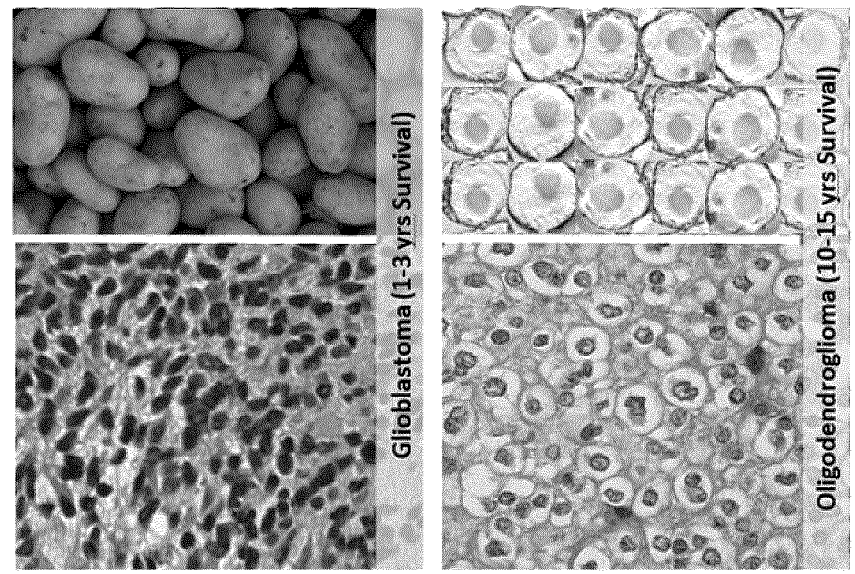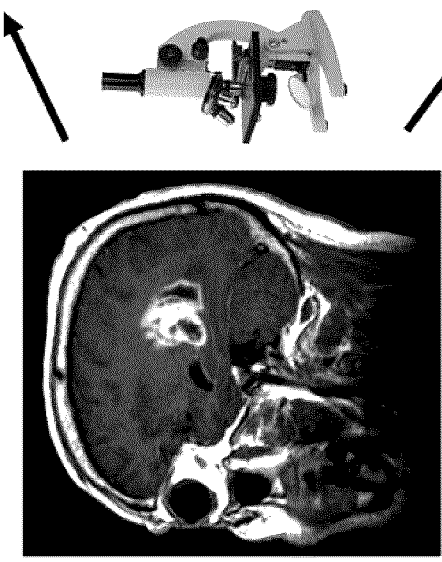
FIG. 12

Medical Need: Precision/Safety

*">70% of treatment decisions based on laboratory results"*

Surgical Pathology Case Reviews Before Sign-Out
A College of American Pathologists Q-Probes Study of 45 Laboratories

Patient Safety and Error Reduction in Surgical Pathology

Errors in Pathology
Discrepancy Rate between pathologist: 6.8%

48% → Benign to Begin , Malignant to Malignant
21% → Benign to Malignant, Malignant to Benign
4% → Margin Discrepancies

Significant Errors
~0.5-1.7% → 10,000 errors / million

Perspective:
Six Sigma Standard (manufacturing): 3.4 errors / million
<u>Is one error too many?</u>

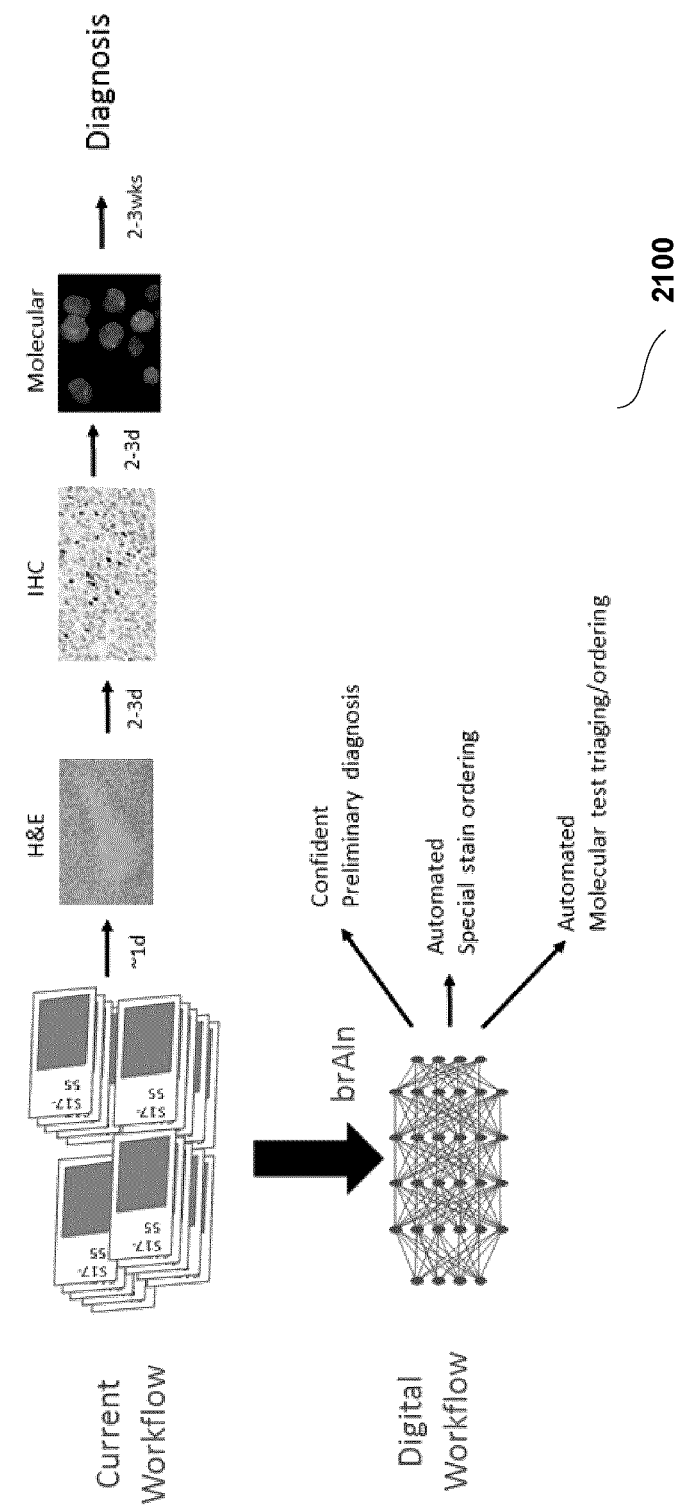
FIG. 17

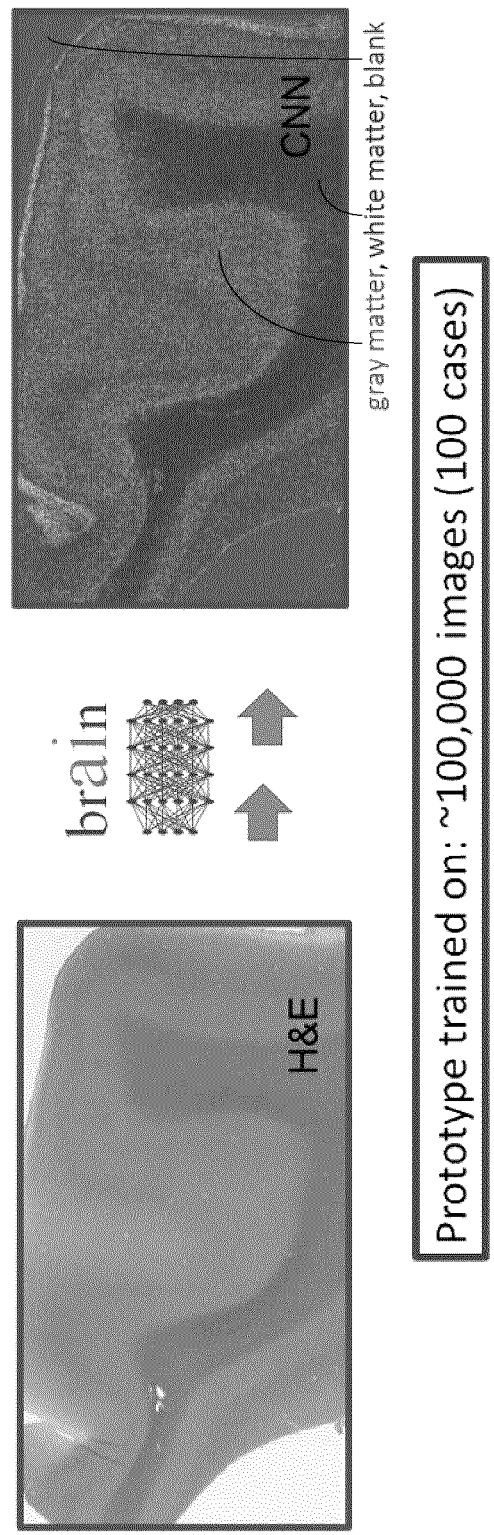
FIG. 19

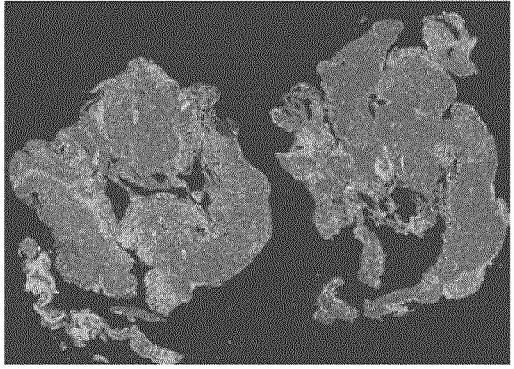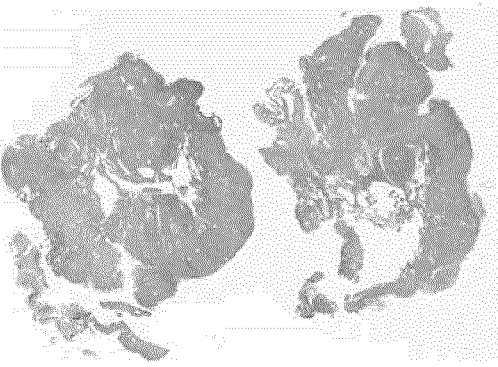
FIG. 23

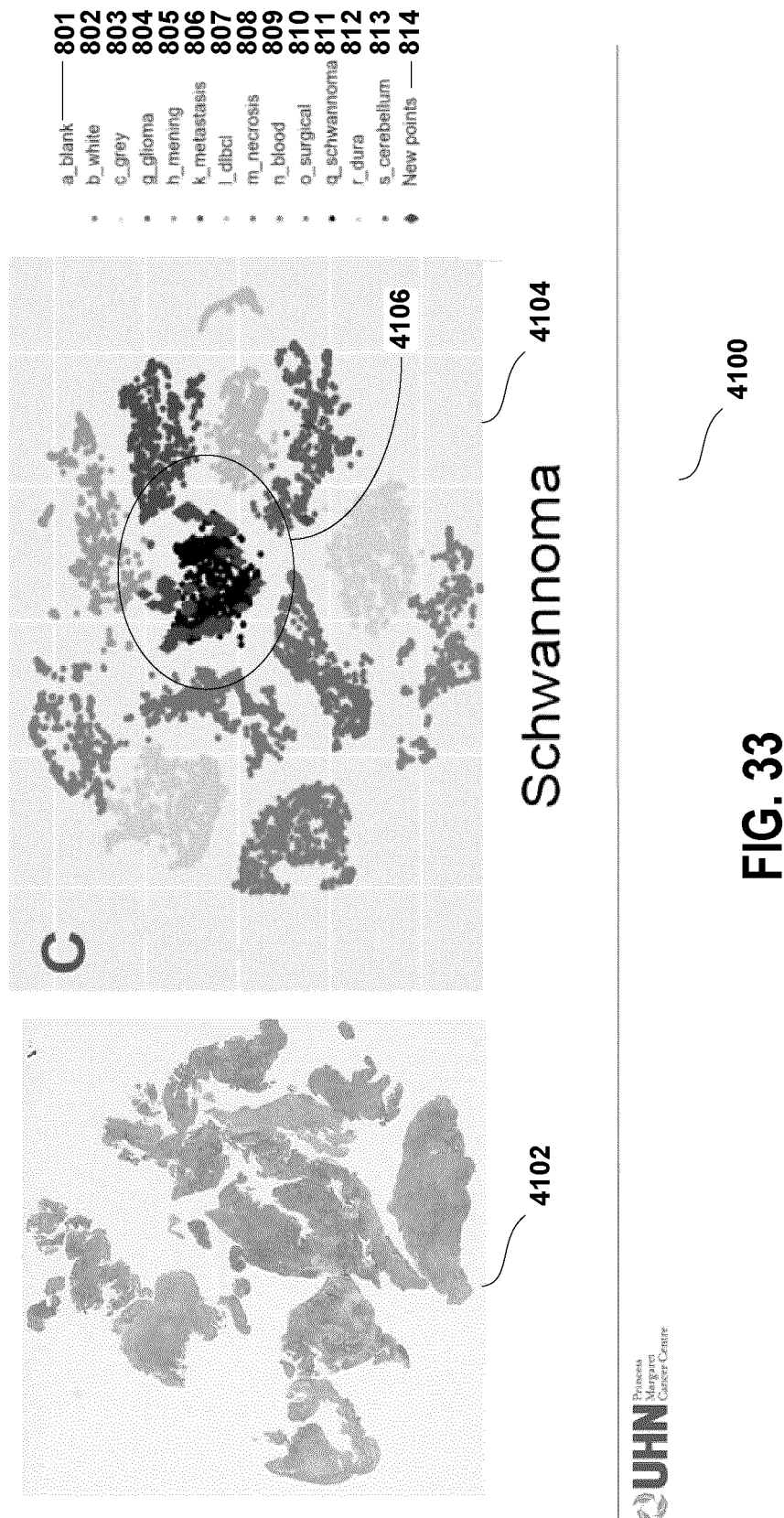
FIG. 33

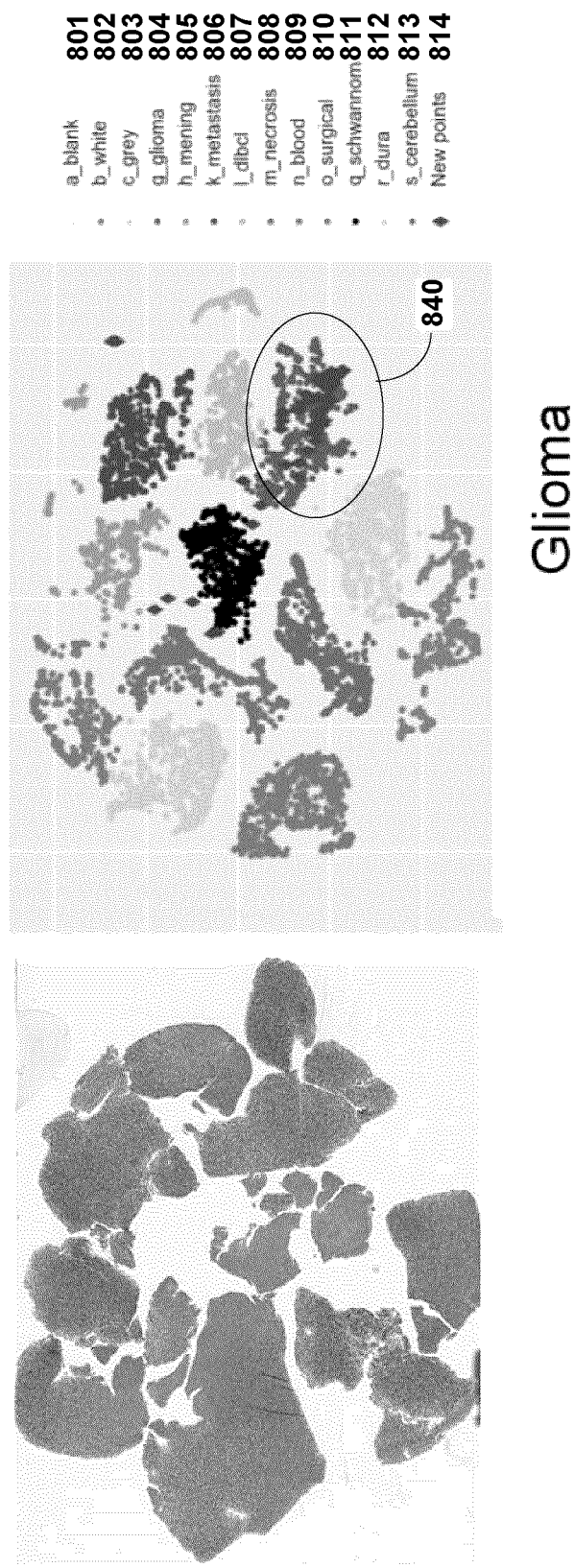
FIG. 39

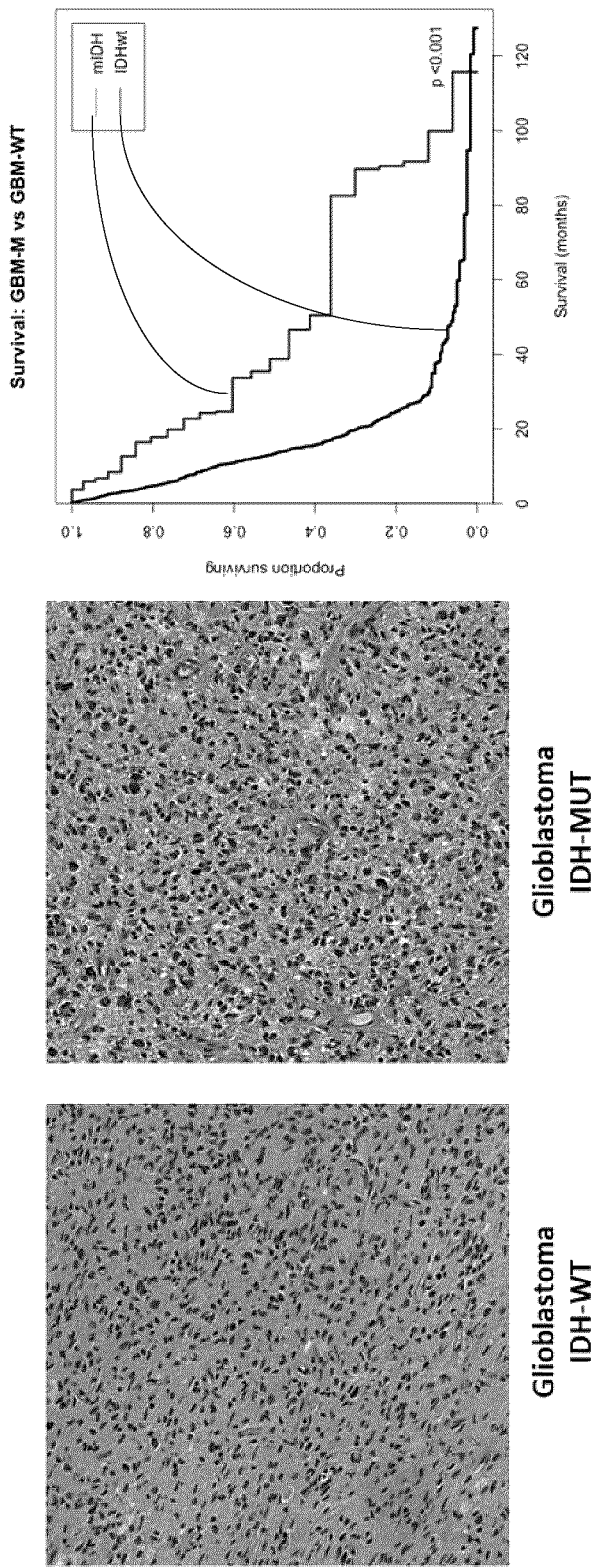
FIG. 42

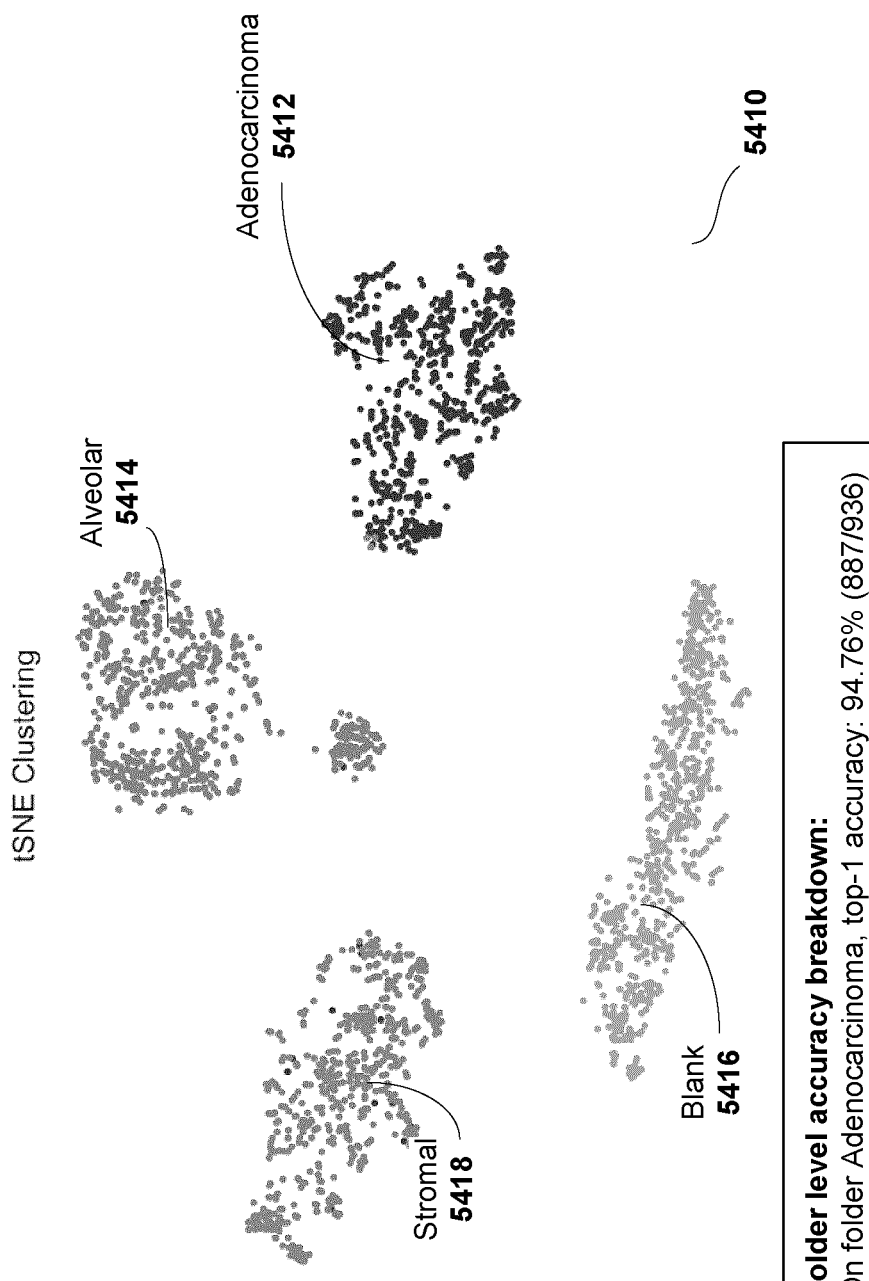

PLATFORM, DEVICE AND PROCESS FOR ANNOTATION AND CLASSIFICATION OF TISSUE SPECIMENS USING CONVOLUTIONAL NEURAL NETWORK

This application claims the benefit of U.S. Provisional Patent Application Ser. No. 62/582,068, filed Nov. 6, 2017, the entire contents of which are hereby incorporated by reference.

FIELD

The present disclosure generally relates to the field of digital pathology, image processing, artificial intelligence, machine learning, deep learning, convolutional neural networks, diagnostics, and computer interfaces.

INTRODUCTION

Digital pathology is an image-based computing environment that allows for the viewing, management and analysis of digital slides on a computer interface and display. In machine learning, artificial neural networks have an input layer and an output layer of artificial neurons, as well as multiple hidden layers of artificial neurons. Artificial neural networks receive input data, and transform the input data through a series of hidden layers of artificial neurons. A convolutional neural network (CNN) is a class of deep artificial neural networks that can be used for processing images.

SUMMARY

Embodiments described herein provide a platform, device and process for digital pathology. In particular, embodiments described herein can provide a platform, device and process for multi-level annotation and visualization of histopathologic slides using a modular arrangement of deep neural networks.

In accordance with an aspect, there is provided a computer platform for digital pathology. The platform has a memory having a stored data structure defining a convolutional neural network that models a hyperdimensional space, the convolutional neural network trained using pathology images. The platform has one or more processors, and one or more programs. The one or more program are stored in the memory and configured to be executed by the one or more processors, the one or more programs including instructions to: determine a region of interest on a pathology slide and a predicted region of interest (ROI) type by classifying a plurality of pathology features abstracted from the pathology slide using the convolutional neural network; and generate, at an interface tool for display on a display device, output indications of the region of interest on a visual representation of the pathology slide and annotations of the predicted region of interest type on the visual representation of the pathology slide.

In some embodiments, the processor executes the instructions to determine the predicted region of interest type by determining a mapping of the region of interest to a portion of the hyperdimensional space, wherein the portion recognizes one or more of the plurality of pathology features consistent with the predicted region of interest type.

In some embodiments, the processor executes the instructions to generate the output indications comprising a surface map showing the basis of a prediction for the predicted region of interest type, the surface map being a reduced dimensionality view of a classification for the predicted region of interest type.

In some embodiments, the processor executes the instructions to use a first convolutional neural network to classify the pathology slide and, based on the classification, select a second convolutional neural network to determine the region of interest on the pathology slide.

In some embodiments, the output indications comprise an original pathology slide, a false colour slide showing the region of interest, an overall view of the original pathology slide and the false colour slide, and a legend indicating the predicted region of interest type and an associated false colour.

In some embodiments, the processor executes the instructions to receive, at the interface tool, an input indication that a specific region of interest is of an unknown type.

In some embodiments, the processor executes the instructions to determine a prediction score for the predicted region of interest type using the convolutional neural network.

In some embodiments, the processor executes the instructions to generate, at the interface tool, a t-distributed stochastic neighbor embedding visualization of the convolutional neural network, the t-distributed stochastic neighbor embedding visualization depicting the hyperdimensional space modeled by the convolutional neural network.

In some embodiments, the processor executes the instructions to determine the region of interest on the pathology slide and the predicted region of interest (ROI) type by tiling an image on the pathology slide into a plurality of image times and classifying the plurality of image tiles using the convolutional neural network.

In some embodiments, the processor executes the instructions to generate a distribution of a plurality of image tiles on a t-distributed Stochastic Neighbour Embedding plot to display, at the interface tool, a planar representation of the convolutional neural network.

In some embodiments, the processor executes the instructions to project representative image tiles from the plurality of image tiles onto the planar representation.

In some embodiments, the processor executes the instructions to generate, at the interface tool, a class activation map having the region of interest and the predicted region of interest type.

In some embodiments, the pathology features and the predicted region of interest type comprise a cancer tumor type.

In some embodiments, wherein the pathology features and the predicted region of interest type comprise a brain tumor type.

In some embodiments, the pathology features and the predicted region of interest type comprise a lung tumor type.

In an aspect, there is provided a process for digital pathology upon an unclassified pathology image. The process involves, at a processor, receiving the unclassified pathology image; determining a region of interest on a pathology slide and a predicted region of interest (ROI) type by classifying a plurality of pathology features abstracted from the pathology slide using a convolutional neural network that models a hyperdimensional space, the convolutional neural network trained using pathology images, the convolutional neural network stored on a memory accessible by the processor; generating output indications on the pathology image using the classification data, the output indications comprising the region of interest, the predicted region of interest type, and optionally a surface map showing a basis of the prediction for the predicted region of interest type; and visually annotating the pathology image using an interface tool with the output indications.

In an aspect, there is provided a computer product with non-transitory computer readable media storing program instructions to configure a processor to: determine a region of interest on a pathology slide and a predicted region of interest (ROI) type by classifying a plurality of pathology features abstracted from the pathology slide using a convolutional neural network that models a hyperdimensional space, the convolutional neural network trained using pathology images; generate output indications of the region of interest on a visual representation of the pathology slide and annotations of the predicted region of interest type on the visual representation of the pathology slide; and update an interface tool to display the output indications and the annotations on a display device.

In some embodiments, the instructions configure the processor to determine the predicted region of interest type by determining a mapping of the region of interest to a portion of the hyperdimensional space, wherein the portion recognizes one or more of the plurality of pathology features consistent with the predicted region of interest type.

In some embodiments, the instructions configure the processor to generate the output indications comprising a surface map showing the basis of a prediction for the predicted region of interest type, the surface map being a reduced dimensionality view of a classification for the predicted region of interest type.

In some embodiments, the instructions configure the processor to use a first convolutional neural network to classify the pathology slide and, based on the classification, select a second convolutional neural network to determine the region of interest on the pathology slide.

In some embodiments, the output indications comprise an original pathology slide, a false colour slide showing the region of interest, an overall view of the original pathology slide and the false colour slide, and a legend indicating the predicted region of interest type and an associated false colour.

In some embodiments, the instructions configure the processor to receive, at the interface tool, an input indication that a specific region of interest is of an unknown type.

In some embodiments, the instructions configure the processor to determine a prediction score for the predicted region of interest type using the convolutional neural network.

In some embodiments, the instructions configure the processor to generate, at the interface tool, a t-distributed stochastic neighbor embedding visualization of the convolutional neural network, the t-distributed stochastic neighbor embedding visualization depicting the hyperdimensional space modeled by the convolutional neural network.

In some embodiments, the instructions configure the processor to determine the region of interest on the pathology slide and the predicted region of interest (ROI) type by tiling an image on the pathology slide into a plurality of image times and classifying the plurality of image tiles using the convolutional neural network.

In some embodiments, the instructions configure the processor to generate a distribution of a plurality of image tiles on a t-distributed Stochastic Neighbour Embedding plot to display, at the interface tool, a planar representation of the convolutional neural network.

In some embodiments, the instructions configure the processor to project representative image tiles from the plurality of image tiles onto the planar representation.

In some embodiments, the instructions configure the processor to generate, at the interface tool, a class activation map having the region of interest and the predicted region of interest type.

In some embodiments, the pathology features and the predicted region of interest type comprise a cancer tumor type.

In some embodiments, wherein the pathology features and the predicted region of interest type comprise a brain tumor type.

In some embodiments, the pathology features and the predicted region of interest type comprise a lung tumor type.

In an aspect, there is provided a computer platform for digital pathology. The platform has a memory having a stored data structure defining a convolutional neural network that models a hyperdimensional space, the convolutional neural network trained using pathology images. The platform has one or more processor, and one or more programs, wherein the one or more program are stored in the memory and configured to be executed by the one or more processors, the one or more programs including instructions to: detect a lesion on a pathology slide by implementing multi-class lesion segmentation using the convolutional neural network; determine a lesion classification of the detected lesion by implementing multi-class lesion classification using the convolutional neural network; determine a lesion sub-classification of the lesion classification by implementing lesion sub-classification using the convolutional neural network; and generate, at an interface tool for display on a display device, output indication of the lesion sub-classification on a visual representation of the pathology slide.

In accordance with an aspect, there is provided a computer platform for digital pathology. The platform has a memory for training and storing convolutional neural networks using pathology images to learn a plurality of pathology features. The platform has a processor configured to determine a region of interest on a pathology slide and a predicted region of interest type using the convolutional neural networks, a hyperdimensional space, and one or more of the plurality of pathology features. The platform has an interface tool for display on a display device, the interface tool configured to generate output indications of the regions of interest on a visual representation of the pathology slide and visually annotate the visual representation of the pathology slide with the predicted region of interest type.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 is a view of an example digital pathology process according to some embodiments;

FIG. 5 is a view of example inter-slide and intra-slide tissue class variability;

FIG. 11 is a view of example digital pathology slides of tissue;

FIG. 12 is a view of example digital pathology slides of tissue;

FIG. 14 depicts example pathologist error rates;

FIG. 17 depicts an example workflow of a digital pathology system as well as a sample workflow not using a digital pathology system;

FIG. 19 depicts class activation maps (CAMs) reflecting tumour type classification by digital pathology platform;

FIG. 23 depicts CAMs reflecting tumour type classification by digital pathology platform;

FIG. 33 depicts t-SNE plots of data stored in a CNN and multi-level classification;

FIG. 39 depicts t-SNE plots of data stored in a CNN and multi-level visualization;

FIG. 42 depicts a view of a report presented at generated at or presented at an interface application that shows prognostic outcome of various molecularly distinct pathologies;

FIGS. 46A to 46C depict an example classifier for lung tumors, in accordance with some embodiments.

DETAILED DESCRIPTION

Figure 1:
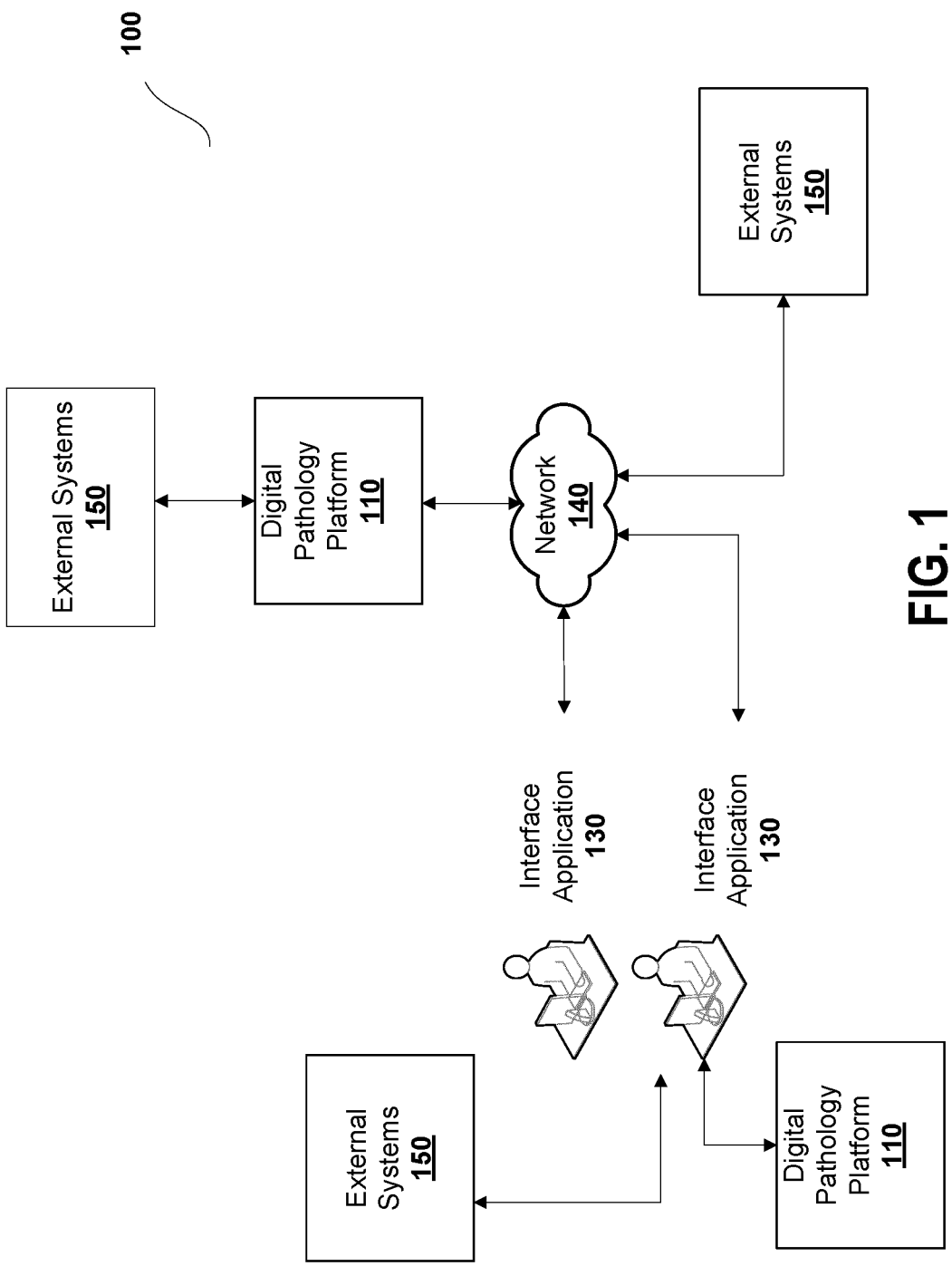
FIG. 1 is a view of an example digital pathology system according to some embodiments.

Embodiments described herein provide a platform, device and process for digital pathology. In particular, embodiments described herein can provide a platform, device and process for multi-level annotation and visualization of histopathologic slides using a modular arrangement of deep neural networks.

The platform can process pathology images (e.g., in some cases increasing the base of data by breaking larger fields of view into smaller ones) to train deep convolutional neural networks (CNNs) in the features consistent with certain cancers. The platform can use the CNNs to identify regions of interest on pathology slides. The platform and process is not limited to specific pathologies and regions. An example embodiment relates to brain tumors for illustrative purposes. Similar results have been achieved in other cancer types (e.g., lung), as described in an example below.

The platform can use the CNNs to visually annotate pathology slides at an interface tool of a display device. In an example embodiment, the interface tool can present a display that includes the original slide (e.g., hematoxylin and eosin (H&E) stained), a false colour slide showing the identified regions of interest, an overlay of these two, and/or a legend indicating the predicted ROI type and associated false colour. Ordinarily, the pathologist would have to manually select certain slides for follow-up testing (such as antibody specific tests) and wait up to several days for the results. The platform can automate the process of selection, as well as provide an opportunity for the pathologist to see a depiction of predicted results for that follow-up testing. In addition to H&E slides, the tool can also quantify immunohistochemical slides using similar approaches.

The interface tool can enable a predicted region of interest (ROI) type to be visually presented on a "surface map" showing the basis of the prediction, which is a reduced dimensionality view of the classification. For example, if the ROI consistently lands in the hyperdimensional space occupied by the glioblastoma training set, then it is likely glioblastoma and a report can be generated that provides quantitative estimates of confidence (e.g., 82% fall in the glioblastoma space, 17% in medulloblastoma, 1% other). If however, the ROI primarily lands in part of the hyperdimensional space not occupied by any training set, then the tool is capable of marking it as an ROI of unknown type. These spaces can be populated with data over time making it possible to identify many other different types. This may involve the use of multiple neural networks based on tissue origin, and so on. The interface tool provides the ability to identify even unknown types. All these decisions are generated using a chi-square test of the distribution of the sampled tiles and their corresponding classes. The p-value for this chi-square test can be adjusted to the user's preference.

The platform trains CNNs (or one or more layers of a CNN) on the relevant image data. The platform uses one or more trained CNNs to classify new image data according to the relevant features. For example, the platform can define personalized diagnostic and prognostic information; identify novel molecular, proteomic, or clinical subgroups; enhance diagnosis or classification of images (e.g., pathology slides) beyond human accuracies (e.g., including during fatigue or where classification is "unknown" or extremely rare); identify novel molecular, proteomic, or clinical groups of clinical or research significance; identify novel morphologic surrogates of biomarkers; and identify morphogenomic correlations and clinically annotated and actionable variables (e.g., response to specific treatments).

In some embodiments, the platform can reduce error rates linked to conventional, manual techniques. For example, FIG. 14 at 1400 depicts example pathologist error rates. In some embodiments, the platform can reduce error rates compared to using probability scores in isolation.

Dynamic visualization of the results by the interface tool can be leveraged by caregivers or researchers to improve clinical care or basic research. For example, researchers can engage with the interface tool to view digital pathology slides annotated with disease or molecular classification or to view surface maps showing the basis of the classification and providing for further classification and enhanced classification accuracy.

Embodiments described herein can annotate images with classifications or predicted types, for example, molecularly or proteomically distinct tumour types, and can uncover novel distinctions, for example, with prognostic relevance. Embodiments described herein can provide a faster, more accurate, and more efficient technology for clinical care and research and can uncover differences in pathology images not detectable by the human eye or otherwise readily understood.

FIG. 1 is a view of an example digital pathology system 100 according to some embodiments. Digital pathology system 100 includes digital pathology platform 110. Digital pathology platform 110 connects to external system 150 and interface application 130, for example, to receive pathology images, such as digital slides annotated with clinical, molecular, or pharmacological information, unannotated slides or images, or data reflecting proteomic or molecular signatures, for example, hierarchical clustering data of proteomic signatures. Digital pathology system 100 can transmit data to interface application 130 to generate annotations and indicators, as described herein. A slide image can reflect hematoxylin and eosin (H&E)-stained slides or one of various immunohistochemical stains or fixation techniques, for example, those amenable to formalin fixed paraffin embedded (FFPE) tissue samples or to frozen tissue samples. Other stains and fixation methods that could change how the slide looks or affect classification include the use of other available stains (e.g., silver stain, H&E+ luxol fast blue (LFB), histochemical stains, and so on). A proprietary stain can be used that improves image analysis.

The digital slides may be used to train one or more CNNs or other training models. The digital slides may be associated or annotated with the data reflecting proteomic or molecular signatures. Digital pathology platform 110 may use one or more CNNs to classify one or more digital slides or images or parts thereof or regions of interest. Digital pathology platform 110 may use data reflecting proteomic or molecular signatures, prognostic data, clinical data, classification data, or other annotations to train, re-train, or validate one or more CNNs or other training models. The CNNs or other training models can be used to classify or annotate new slides or images or uncover proteomic or molecular signatures, biomarkers, or other clinically or molecularly relevant subgroups, for example, sub-types of IDH-wt glioblastoma (GBM) types or proteomic sub-groups representing gliomas driven by pathways amenable to pharmacological inhibition.

Images can include pathology images, pathology slides, digital slides, image tiles, pictures, histologic data, images of slides depicting a tissue sample, depictions of samples, pixels, and/or a portion or part of same (e.g., features extracted from image data).

Digital pathology platform 110 can create or train one or more classification models or CNNs, for example, for classification of images, histologic data, or of images of slides depicting a tissue sample. Digital pathology platform 110 can receive data from one or more interface applications 130. Digital pathology platform 110 can receive stored data from one or more external systems 150 or interface applications 130. Digital pathology platform 110 can organize or associate the data by tissue type (e.g., a type of glioma) or by patient identity, for example. Digital pathology platform 110 can build or train one or more classification models using this data. Digital pathology platform 110 can use a CNN or a hierarchy of convolutional neural networks or one or more other classification models to classify the data and cause a result to be sent to an entity 150 or interface application 130. The result can cause an entity to actuate a response, which can be a message suggesting or automating the ordering of one or more clinical tests or a message or annotation identifying one or more probable classifications.

In some embodiments, digital pathology platform 110 can receive one or more trained CNNs or other classification models from an external system 150.

In some embodiments, digital pathology platform 110 can re-train one or more CNNs, for example, the final three layers of a trained convolutional neural network, for example, to take advantage of transfer learning of pre-learned features so as to fine-tune node weightings within the network to optimize classification of desired features, for example, histopathologic features.

In some embodiments, data may be processed by or received at digital pathology platform 110 as image patches or tiles, for example, of 1024×1024 pixels. Digital pathology platform 110 can generate or extract tiles from an image, where each tile represents a discrete section of the image.

The automated tiling can be done using image handling codes using the python programing language, for example, that take the images and processes it into 1024×1024 images. This is an example and other automated tiling processes can be used. Digital pathology platform 110 can use these tiles to train or re-train one or more convolutional neural networks or other classification models and/or classify the tile or tiles using one or more convolutional neural networks or other classification models. The tile size used may be of a large size so as to excel at complex classification tasks by providing multiple levels of morphologic detail (single cell-level and overall tumor structure) without significantly affecting computation times. For example, a trained or re-trained CNNs (or hierarchy of convolutional neural networks) may differentiate between classes, for example, 13 or more different tissue classes commonly found on neuropathology tissue slides including hemorrhage, surgical material, dura, necrosis, blank slide space, and normal cortical gray, white, and cerebellar brain tissue. Other categories that the convolutional neural network (or hierarchy of convolutional neural networks) may differentiate between include nervous system tumor types such as glioma, meningioma, schwanomma, metastasis, and lymphoma. The convolutional neural network (or hierarchy of convolutional neural networks) may differentiate between molecular GBM subtypes (e.g., IDH-mutant (IDH-mut) and IDH-wildtype (IDH-wt)), between mutations in isocitrate dehydrogenase (IDH) genes and presence of 1p/19q co-deletions, between samples indicative or correlative to long-term survivors and baseline survivors, or between any union of same, for example, between IDH-wt GBM-BS, IDH-wt GBM-LTS, IDH-wt GBM, IDH-mut GBM, IDH-mut low grade astrocytomas, and IDH-mut 1p/19q co-deleted oligodendrogliomas. Classification may allow for risk stratification of conditions, diseases, pathologies, molecular or proteomic signatures, pathways or drivers amenable to pharmacological or other intervention, tumour types, cancers, or detectable difference in tissue or sample.

In some embodiments, digital pathology platform 110 can use one or more CNNs to automate retrieval of regions of interest, for example, diagnostic ("lesional") areas. These tiles can be used to train or re-train one or more convolutional neural networks or one or more layers within same. Digital pathology platform 110 can use these tiles to incorporate new classes into one or more classification models. Digital pathology platform 110 can use the tiles to train, validate, and test a convolutional neural network classifier optimized at distinguishing between, for example, two genomically distinct GBM subtypes. This may allow digital pathology platform 110 to resolve distinct classes (such as tumour classes) that are indistinguishable to the human observer, with applications, for example, in diagnosis, ordering tests or courses of treatment, in providing information such as prognostic correlates, or for identifying appropriate pharmacological or clinical intervention. This may also allow for expedient and feasible training of convolutional neural networks on various immunostains used by specialists. For example, automated tile generation can generate >10,000,000 image tiles that span the vast majority of diagnostic tumor classes in neuropathology and can be used to train convolutional neural networks on various immunostains or fixations.

In some embodiments, a hierarchy or modular arrangement of convolutional neural networks may be used to successively classify data, for example, pathology images or slide image tiles, at increasingly finer gradients or smaller sub-groups or to carry out sequentially more refined classification tasks in the appropriate setting (e.g., following classification of a glioma). This multi-level approach can reduce the need for continual revalidation of robust and pre-learned classification tasks can allow new learning tasks to be integrated and activated in a context specific manner. This may improve classification, for example, its accuracy.

Each convolutional neural network may be trained on appropriate data or otherwise configured to classify or predict certain result and/or classify certain input data. Each convolutional neural network may thus be optimized or fine-tuned for different classification purposes. For example, a trained convolutional neural network may classify a tile, and digital pathology platform 110 can use the classification to determine which second convolutional neural network will be used to further classify the tile. A plurality of convolutional neural networks may be used successively on the same data, for example, slide image tile, or on output from the previous convolutional neural network. The identity of each convolutional neural network used in succession can be dynamically determined by digital platform 110, for example, based on the classification, result, or data output from one or more convolutional neural networks (for example, previously used in the hierarchy), machine learning, classification model, clustering algorithm, or data collected by digital pathology platform 110.

For example, a VGG19 CNN trained on 1.2 million images available through ImageNet, for example, pictures of cats and dogs, can be received from external system 150 and used by digital pathology platform 110. Digital pathology platform can re-train the CNN and change the weighting of the CNN to be better optimized at recognizing and classifying tumors instead of cats and dogs. For each "module" or level in a hierarchy of CNNs, each CNN is retrained to carry out a context specific task.

In some embodiments, digital pathology platform 110 can generate output indications of regions of interest on digital pathology slides using classification data. For example, digital pathology platform 110 can identify, for example, by classification using one or more convolutional neural networks, classification models, and/or clustering techniques, one or more regions of interest within image data, for example, data representing a digital slide image, data representing a single image tile constructed from a portion of a digital slide image, or data representing one or more overlays of image tiles. Digital pathology platform 110 can generate data, for example, classification data or output from one or more convolutional neural networks, and digital pathology platform 110 can use the data to generate one or more output indications of regions of interest. Digital pathology platform 110 can associate the output indications of a region of interest with the corresponding image data whose classification was used in the generation of the indications of a region of interest. For example, a region of interest can include a predicted region of interest type of a hyperdimensional space, for example, depicted, representable by, or stored by one or more convolutional neural networks.

The use of a CNN results in a hyperdimensional space. The t-SNE is generated based on the hyper-dimensional space stored within the t-SNE. In some embodiments, the t-SNE mainly uses the final CNN layer. During t-SNE generation there can be a parameter called perplexity that may be used in some embodiments (e.g., a value of 40 can be used). The digital pathology platform 110 can remove extra points far away from main cluster.

For example, digital pathology platform 110 can generate annotations, overlays, or legends depicting indications of regions of interest, predicted region of interest types, or classifications of regions of interest. Digital pathology platform 110 can associate such annotations, overlays, or legends with the corresponding image data whose classification was used in the generation of the indications of a region of interest. Digital pathology platform 110 can transmit the data and associations to an interface application 130 or to an external system 150 or interface application 130. Interface application 130 can process, combine with other data (for example, received from external systems 150 or stored at interface application 130), and/or present the data as visually annotated images, for example, visually annotated versions of digital pathology slides provided to interface application 130 for classification. Interface application 130 can visually annotate the digital pathology slides using the interface tool.

In some embodiments, digital pathology platform 110 can generate a distribution of image tiles, such as lesion tiles, on a t-distributed Stochastic Neighbour Embedding (t-SNE) plot to show a planar representation of a convolutional neural network layer (for example, the final layer). Digital pathology platform 110 can generate the t-SNE plot using high-dimensional data stored within convolutional neural network trained on, for example, IDH-mutated and IDH-wildtype GBMs. The CNN layer can be one of the inputs to this process. Digital pathology platform 110 can use a classifier to use the distribution of data on the t-SNE plot to classify, predict, or assign a classification, prediction, or region of interest type to image data such as image tiles. This may allow for validation of a first classification of the image data (for example, generated by a convolutional neural network) and/or more accurate classifications or predictions of region of interest types (for example, where the classification substantially agrees with another classification of the same region of interest, image, or tile). This may allow for identification of unknown types, for example, where an image for classification or a region of interest primarily lands in part of the hyperdimensional space not occupied by any training set. This computer defined process resulting in a t-SNE plot depicting hyperdimensional space in a two-dimensional view does not force a classification and allows visualization of how the computer is seeing or predicting regions of interest in the tissue.

Both prediction scores and t-SNE can be generated from the trained CNN so they are inherently linked. For prediction scores the classification boundaries can be unknown. For the t-SNE, in a way the platform 100 is setting the boundaries very tightly around previous examples and to filter tiles that are truly unique. This results in a much more conservative classification but appears to make fewer mistakes as it is very conservative. Embodiments can blend prediction scores and t-SNE to get improved results.

For example, predictions for new cases, samples, or image tiles can be generated by overlaying image tiles on the trained t-SNE space and assessing its distribution. Digital pathology platform 110 can transmit or store this data or data generated at any intermediary step. For example, digital pathology platform 110 can transmit the overlayed image tiles and trained t-SNE space, concordance and/or variance with a first classification, and summary statistics for each identified class to an interface application 130 or external system 150 over a network 140 (or multiple networks).

Generation of the t-SNE plot can enable visualization of the internal organization of a training convolutional neural network. Visualization can include colour-coding, annotations, clustering, overlaying, organization, or a legend. Interface application 130 allows engagement with one or more t-SNE plots generated from a trained convolutional neural network. This may uncover or facilitate detection and analysis of trends or correlations within the data. For example, there may be a trend towards non-neuroepithelial and cohesive epitheliod lesions when moving upwards within a cluster of data points reflecting tissue classified as lesional tissue.

In some embodiments, digital pathology platform 110 can transmit a two-dimensional plot such as a t-SNE plot, depicting hyperdimensional space to an interface application 130 or to external systems 150.

In some embodiments, digital pathology platform 110 can generate a class activation map, surface map, or "heatmap" depicting the basis of classifications or predictions of, for example, image data, tiles, and/or pathology slides. For example, the class activation map can highlight, annotate, or otherwise depict discriminative image regions or features used by one or more convolutional neural networks to make the classification or prediction of a region of interest type. In some embodiments, a plurality of possible classifications of type or predictions of regions of interest (e.g., IDH-wt GBM-LTS, favourable prognostic outcome, pathology driven by a pathway amenable to pharmacological intervention, schwanomma, hemorrhage, etc.) can be depicted with their respective prediction scores displayed as a percentage.

In some embodiments, digital pathology platform 110 can transmit a class activation map, surface map, or "heatmap" to an interface application 130 or to external systems 150.

In some embodiments, digital pathology platform 110 can connect to interface application 130 over a network 140 (or multiple networks). In some embodiments, digital pathology platform 110 can connect to interface application 130 directly.

In some embodiments, interface application 130 can enable validation of outputs generated by a digital pathology platform 110, such as the classification of an image or slide. In some embodiments, interface application 130 can enable a multi-disciplinary and integrated workflow with care providers, whereby results (e.g., classifications) are generated and/or presented to users by digital pathology platform 110 or interface application 130 in an interleaved, iterative, or contemporaneous process to a care provider workflow.

In some embodiments, interface application 130 can generate output indications of regions of interest on digital pathology slides using classification data from digital pathology platform 110 or an external system 150 or data stored at interface application 130. For example, digital pathology platform 110 can identify, for example, by classification using one or more convolutional neural networks, classification models, and/or clustering techniques, one or more regions of interest within image data, for example, data representing a digital slide image, data representing a single image tile constructed from a portion of a digital slide image, or data representing one or more overlays of image tiles. Digital pathology platform 110 can transmit data, for example, classification data or output from one or more convolutional neural networks, to interface application 130 and interface application 130 can use the data to generate one or more output indications of regions of interest. Interface application 130 can associate the output indications of a region of interest with the corresponding image data whose classification was used in the generation of the indications of a region of interest. For example, a region of interest can include a predicted region of interest type of a hyperdimensional space, for example, depicted, representable by, or stored by one or more convolutional neural networks.

For example, interface application 130 can generate output indications of regions of interest on images or slides such as digital pathology slides depicting tissue. Interface application 130 can use classification data (including re-classification, subsequent classification, and classifications based on a combination of two or more classifications) to generate the output indications and present them on the image or slides. The regions of interest can include a predicted region of interest type of a hyperdimensional space and a surface map showing the basis of the prediction. The indications can be presented as annotations, overlays, or legends depicting indications of regions of interest, predicted region of interest types, or classifications of regions of interest. Interface application 130 can associate such annotations, overlays, or legends with the corresponding image data whose classification was used in the generation of the indications of a region of interest. Interface application 130 can store the data and associations or can transmit same to an external system 150 for analysis or research. Interface application 130 can process, combine with other data (for example, received from external systems 150 or stored at interface application 130), and/or present the data as visually annotated images, for example, visually annotated versions of digital pathology slides provided to interface application 130 for classification. Interface application 130 can visually annotate the digital pathology slides using the interface tool.

In some embodiments, interface application 130 can receive indications of regions of interest including a predicted region of interest type of a hyperdimensional space from a digital pathology platform 110 or external systems 150.

In some embodiments, interface application 130 can generate a distribution of image tiles, such as lesion tiles, on a t-distributed Stochastic Neighbour Embedding (t-SNE) plot to show a planar representation of a convolutional neural network layer (for example, the final layer). In some embodiments, interface application 130 can receive a two-dimensional plot such as a t-SNE plot, depicting hyperdimensional space from a digital pathology platform 110 or external systems 150.

Interface application 130 can generate the t-SNE plot using high-dimensional data stored within convolutional neural network trained on, for example, IDH-mutated and IDH-wildtype GBMs. Interface application 130 can use a classifier to use the distribution of data on the t-SNE plot to classify, predict, or assign a classification, prediction, or region of interest type to image data such as image tiles. This may allow for validation of a first classification of the image data (for example, generated by a convolutional neural network at digital pathology platform 110) and/or more accurate classifications or predictions of region of interest types (for example, where the classification substantially agrees with another classification of the same region of interest, image, or tile). This may allow for identification of unknown types, for example, where an image for classification or a region of interest primarily lands in part of the hyperdimensional space not occupied by any training set. This computer defined process resulting in a t-SNE plot depicting hyperdimensional space in a two-dimensional view does not force a classification and allows visualization of how the computer is seeing the tissue.

For example, predictions for new cases, samples, or image tiles can be generated by overlaying image tiles on the trained t-SNE space and assessing its distribution using, for example, a chi-square statistical distribution test. Interface application 130 can transmit or store this data or data generated at any intermediary step. For example, interface application 130 can transmit the overlayed image tiles and trained t-SNE space, concordance and/or variance with a first classification, and summary statistics for each identified class to a digital pathology platform 110 or external system 150 over a network 140 (or multiple networks).

Generation of the t-SNE plot can enable visualization of the internal organization of a training convolutional neural network. Visualization can include colour-coding, annotations, clustering, overlaying, organization, or a legend. Interface application 130 allows engagement with one or more t-SNE plots generated from a trained convolutional neural network trained. This may uncover or facilitate detection and analysis of trends or correlations within the data. For example, there may be a trend towards non-neuroepithelial and cohesive epitheliod lesions when moving upwards within a cluster of data points reflecting tissue classified as lesional tissue.

In some embodiments, interface application 130 can generate a class activation map, surface map, or "heatmap" depicting the basis of classifications or predictions of, for example, image data, tiles, and/or pathology slides. For example, the class activation map can highlight, annotate, or otherwise depict discriminative image regions or features used by one or more convolutional neural networks to make the classification or prediction of a region of interest type. In some embodiments, a plurality of possible classifications of type or predictions of regions of interest (e.g., IDH-wt GBM-LTS, favourable prognostic outcome, pathology driven by a pathway amenable to pharmacological intervention, schwanomma, hemorrhage, etc.) can be depicted with their respective prediction scores displayed as a percentage. In some embodiments, interface application 130 can receive a class activation map, surface map, or "heatmap" from a digital pathology platform 110 or external systems 150.

Interface application 130 can also generate and present an integrated summary output or report containing information such as classification, predicted region of interest type of a hyperdimensional space, a surface map showing the basis of the prediction, a class activation map, a t-SNE plot that can show unknown cases classified as "undefined", likelihood percentages or relative prediction scores associated with alternative predictions or classifications, visual annotations of images (such as digital pathology slides), and other data associated with an image or tile, a cluster of images or tiles, and/or a selection of image data. For example, the data presented can include context specific clinical information such as patient identifiers, age, tumour location, date and time of sampling, and physician comments. In some embodiments, a user can engage with interface application 130 to select or request one or more images or image sets, for example, corresponding to a single patient or tissue sample. Interface application 130 can present information associated with the selection or request. The user can provide input to interface application 130, for example, further comments, annotations, or corrections in relation to one or more images, set of images, or other groupings. Interface application 130 can process (for example, parse and associate with other data), store (for example, in one or more databases, memory, or external systems 150), and/or transmit this input data (for example, to a digital pathology platform 110 or external system 150).

Interface application 130 can connect with one or more user devices or with one or more external systems 150 and can request data. Interface application 130 can request data dynamically, for example, based on input or response from the one or more users or the one or more external systems 150 or based on a classification or a result received from a digital pathology platform 110 or a second external system 150. The user devices or external systems 150 can provide interface application 130 with data such as pathology images, for example, digital slides annotated with clinical, molecular, or pharmacological information, unannotated slides or images, or data reflecting proteomic or molecular signatures, for example, hierarchical clustering data of proteomic signatures.

Interface application 130 can present and/or transmit visualization representing one or more outputs from digital pathology platform 110, for example, a surface map showing the basis of a classification or prediction generated by digital pathology platform 110. In some embodiments, application 130 can create one or more such visualization using data from digital pathology platform 110 or from one or more external systems 150.

In some embodiments, the users or external systems 150 can engage with interface application 130 to annotate the data or digital slides. Interface application 130 can organize, synchronize, process, modulate, aggregate, or reorganize the data.

Interface application 130 can engage a user via a display, interactive display, keyboard, mouse, or other sensory apparatus. Interface application 130 can transmit and receive signals or data from such devices and cause data to be sent to digital pathology platform 110. Network 140 (or multiple networks) is capable of carrying data and can involve wired connections, wireless connections, or a combination thereof. Network 140 may involve different network communication technologies, standards and protocols, for example.

In some embodiments, external systems 150 can connect to digital pathology platform 110, for example, via network 140 (or multiple networks). In some embodiments, external systems 150 can connect to digital pathology platform 110 directly. External systems 150 can be one or more databases or data sources or one or more entities that aggregate or process data. For example, an external system 150 can be a second digital pathology platform 110 or other interface application 130 that collects pathology slide data (or other data), performs feature extraction on the data, and builds one or more classification models, convolutional neural networks, or hierarchy of convolutional neural networks. Feature extraction or training may be performed on image tiles. The external system 150 can then process the data and/or build one or more classification models or convolutional neural networks based on a selection of features. The one or more convolutional neural networks can be used by one or more other digital pathology platforms 110, stored in a database, and/or transmitted to an external system 150, for example, that is accessible by researchers or developers.

In some embodiments, external systems 150 can connect to interface application 130, for example, via network 140 (or multiple networks). In some embodiments, external systems 150 can connect to interface application 130 directly. External systems 150 can send and/or receive data from an interface application 130 and/or digital pathology platform 110. In some embodiments, an external system 150 can be a hospital, research institute, care facility, doctor, or caregiver. For example, an external system 150 in a remote community can transmit slide information to a digital pathology platform 110 or to an interface application 130 over a network (or multiple networks) 140. Digital pathology platform 110 can use one or more trained convolutional neural networks (for example, a hierarchy of convolutional neural networks), classification models, clustering, and/or other data manipulation techniques to annotate the slide. The data can be further processed and results of same can be sent to external system 150 in a remote community. This may help guide the doctor in the remote community on treatment options, likely prognosis or clinical significance, clinical testing or order, or other courses of action, for example, based on the proteomic or molecular signature, glioma subtype, prognostic significance, biomarker indication, or pharmacological target suggested by the classification output from the digital pathology platform 110.

In some embodiments, at an interface application 130, a specialist doctor can engage with the slide received from the external system 150 in a remote community, for example, to provide further annotations or classifications before the data is sent by interface application 130 to a digital pathology platform 110. Digital pathology platform 110 can apply one or more data processing techniques or convolutional neural networks based on the data received.

This connectivity can facilitate the viewing, manipulation, and/or analysis of the data by a researcher, developer, and/or healthcare provider engaged with an external system 150.

Figure 2:
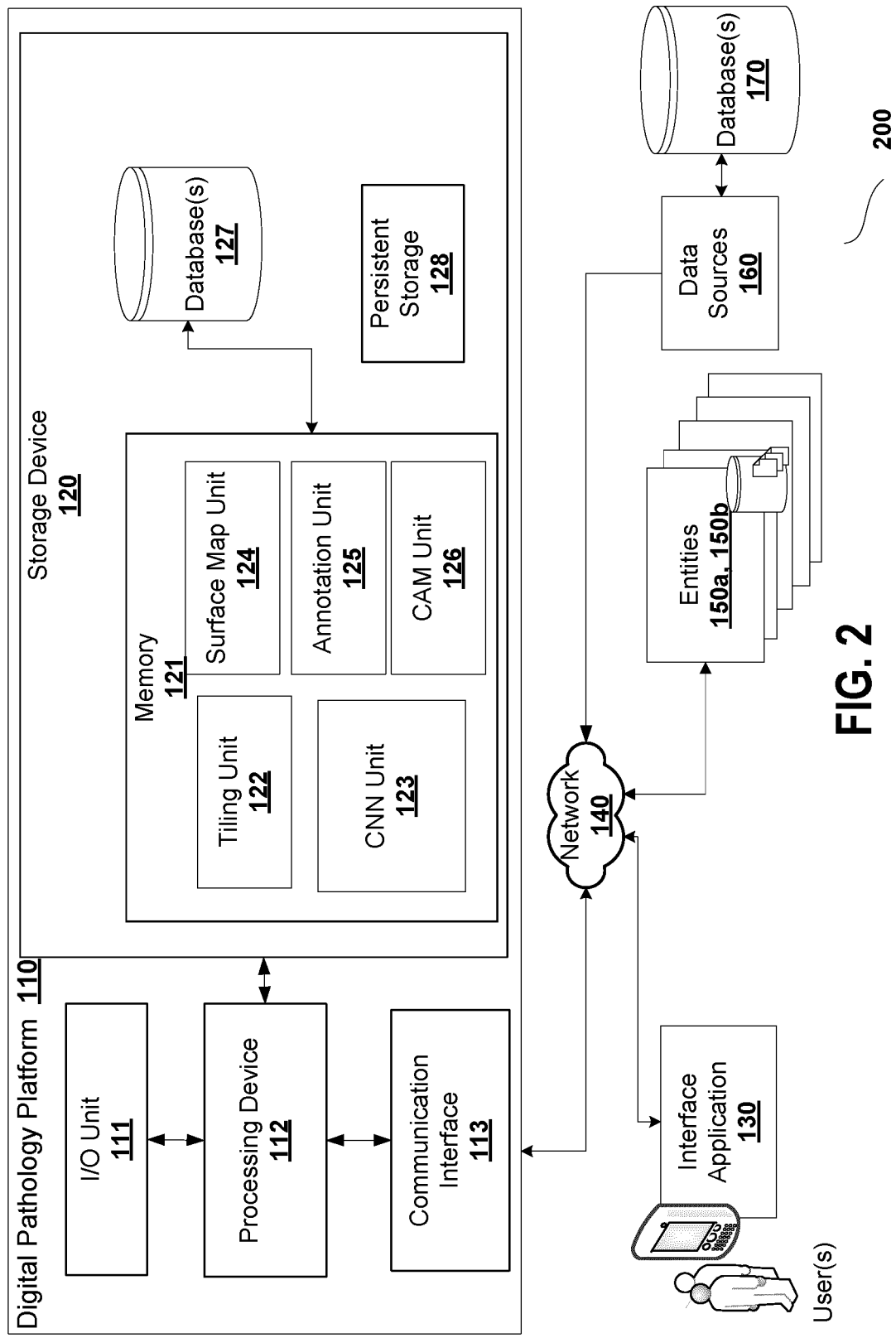
FIG. 2 is a view of an example digital pathology platform according to some embodiments.

FIG. 2 is a view of an example digital pathology platform 110 according to some embodiments. A digital pathology platform 110 can include an I/O Unit 111, processing device 112, communication interface 113, and storage device 120.

A digital pathology platform 110 can connect with one or more interface applications 130, entities 150, data sources 160, and/or databases 170. This connection may be over a network 140 (or multiple networks). Digital pathology platform 110 receives and transmits data from one or more of these via I/O unit 111. When data is received, I/O unit 111 transmits the data to processing device 112.

Each I/O unit 111 can enable the digital pathology platform 110 to interconnect with one or more input devices, such as a keyboard, mouse, camera, touch screen and a microphone, and/or with one or more output devices such as a display screen and a speaker.

A processing device 112 can execute instructions in memory 121 to configure storage device 120, and more particularly, tiling unit 122, convolutional neural network unit 123, surface map unit 124, annotation unit 125, and CAM unit 126. A processing device 112 can be, for example, any type of general-purpose microprocessor or microcontroller, a digital signal processing (DSP) processor, an integrated circuit, a field programmable gate array (FPGA), a reconfigurable processor, or any combination thereof. The oversampling is optional and in some embodiments there may not be an oversampling unit.

Memory 121 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 120 can include memory 121, databases 127, and persistent storage 128.

Each communication interface 113 can enable the digital pathology platform 110 to communicate with other components, to exchange data with other components, to access and connect to network resources, to serve applications, and perform other computing applications by connecting to a network (or multiple networks) capable of carrying data. The digital pathology platform 110 can be operable to register and authenticate users (using a login, unique identifier, and password for example) prior to providing access to applications, a local network, network resources, other networks and network security devices. The platform 110 may serve one user or multiple users.

The storage 127 may be configured to store information associated with or created by the tiling unit 122, convolutional neural network unit 123, surface map unit 124, annotation unit 125, and CAM unit 126. Storage 127 and/or persistent storage 128 may be provided using various types of storage technologies, such as solid state drives, hard disk drives, flash memory, and may be stored in various formats, such as relational databases, non-relational databases, flat files, spreadsheets, extended markup files, etc.

Storage device 120 can be used to build a classification model, for example, a convolutional neural network, by training on data received from interface application 130 or other entities 150, for example, images such as pathology images or pathology slides, including data representing a portion of or a part of same (e.g., image tiles or features extracted from image tiles).

Tiling unit 122 can be associated with a storage device 120 and digital pathology platform 110 can receive data, for example, image data corresponding to a pathology slide depicting a tissue sample from a patient, via interface application 130. Tiling unit 122 can receive stored data from one or more external systems 150 or interface applications 130, for example, corresponding to other image data from other patients, other hospitals, other samples from the same patient, or other (or same) class or type of image. Tiling unit 122 can process the data. In some embodiments, tiling unit 122 may not tile the data.

In some embodiments, tiling unit 122 can divide the image into a set of pixel images, for example, 1024×1024 pixel images or data encoding same. For some embodiments, tasks can result in different tile sizes (e.g. 512×512, 2048×2048) and this is an example only.

In some embodiments, tiling unit 122 can also identify regions of interest from the image data, for example, using one or more classification outputs from a trained convolutional neural network in CNN unit 123. Tiling unit 122 can create image tile data encoding a portion, part, or section of the image data. The image tile data for a single image tile may comprise only selected features from a single portion, part, or section of the image data.

Tiling unit 122 can transmit data, such as images or tiles to CNN unit 123. Tiles can include data encoding 1024×1024 pixel images derived from a whole pathology image, to CNN unit 123. CNN unit 123 can receive same. Tiling images can facilitate the production of image patches for robust training and feature extraction by CNN unit 123.

CNN unit 123 can train on any user defined variable that is available and tied to training images. Digital pathology platform 110 can test any clinical or molecular variable tied to an image (e.g., diagnosis and IDH-mutated and/or 1p19q codeleted gliomas). The automated workflow employed by digital pathology system 100 can test for any variable amongst 100's of whole slides (100,000 of image tiles, and so on).

For example, this includes molecular changes (e.g., IDH status, O6-methylguanine-methyltransferase (MGMT), etc.) and clinical data (e.g., survival). Not all variables may have morphologic correlates but digital pathology platform 110 can allow for their empirical testing and identification in an automated and expeditious way. In that sense, digital pathology platform 110 can look or assess for any variable that is in some way potentially tied to morphology. For example, digital pathology platform 110 or CNN unit 123 can allow for identification or classification that distinguishes between molecular changes (molecular subgroups/changes including IDH-mutated and IDH-wildtype, other molecular changes commonly occurring in gliomas and of high clinical value such as 1p19q co-deletion), survival/prognostic outcomes (e.g., baseline (BS) v LTS, highly aggressive tumors and less aggressive tumors simply by morphology), proteomically distinct groups, biologically distinct/genomically defined groups, and morphologic groups.

As molecular tests are more expensive, in addition to linking trained image features to genetic changes (e.g., IDH mutations, 1p19q codeletion), they can also be linked to protein alterations. The computer identifies morphology. Molecular and clinically significant changes identified can be tied by digital pathology platform 110 to morphologic groups noted by the computer.

CNN unit 123 associated with a storage device 120 can process the tiles of pathology images, for example, to remove trends, noise, and artifacts, and can reconstruct each tile from the remaining components. CNN unit 123 can extract features from the image or tile data using one or more feature extraction methods. This can produce a vector of histological features. CNN unit 123 can select features from the features extracted from the images or tiles.

CNN unit 123 can use the selected features to train one or more convolutional neural networks, such as VGG19, InceptionV3 CNN image classifier, or one or more selected layers of a pre-trained convolutional neural network. Training may be performed to fine-tune one or more CNNs or one or more layers of a CNN to optimize classification for particular images, tiles, pathologies, gliomas, or molecularly or proteomically distinct classes. CNN unit 123 can create or train multiple CNNs that CNN unit 123 can use in a hierarchical or modular arrangement, for example, to sequentially more refined classification tasks in the appropriate context (e.g., after classification of glioma).

CNN unit 123 can classify data such as image data, tiles, or digital pathology slides using one or more trained or re-trained convolutional neural networks. CNN unit 123 can generate classification data and output indications of regions of interest using the classification data.

In some embodiments, surface map unit 124 can generate a distribution of images or image tiles, such as lesion tiles, on a t-distributed Stochastic Neighbour Embedding (t-SNE) plot to show a planar representation of a convolutional neural network layer (for example, the final layer). In some embodiments, surface map unit 124 can receive a two-dimensional plot such as a t-SNE plot, depicting hyperdimensional space from a digital pathology platform 110 or external systems 150. Surface map unit 124 can cause such distribution of images or image tiles to be stored in a database 127 or persistent storage 128 or transmitted over a network 140, for example, to interface application 130.

In some embodiments, annotation unit 125 can generate output indications of regions of interest on digital pathology slides using classification data. For example, CNN unit 123 can identify, for example, by classification using one or more convolutional neural networks, classification models, and/or clustering techniques, one or more regions of interest within image data. Annotation unit 125 can associate the classification or predicted region of interest type with an image, tile, or digital pathology slide, for example, that was used in creating the classification or predicted region of interest type. Annotation unit 125 can cause such associations to be stored in a database 127 or persistent storage 128 or transmitted over a network 140, for example, to interface application 130. Using the association data, annotation unit 125 can create data allowing the presentation of the classifications or predicted region of interest type on the image, tile, or digital pathology slide. Interface application 130 can receive the data and visually annotate the image, tile, or digital pathology slide for presentation to a user.

Figure 3:
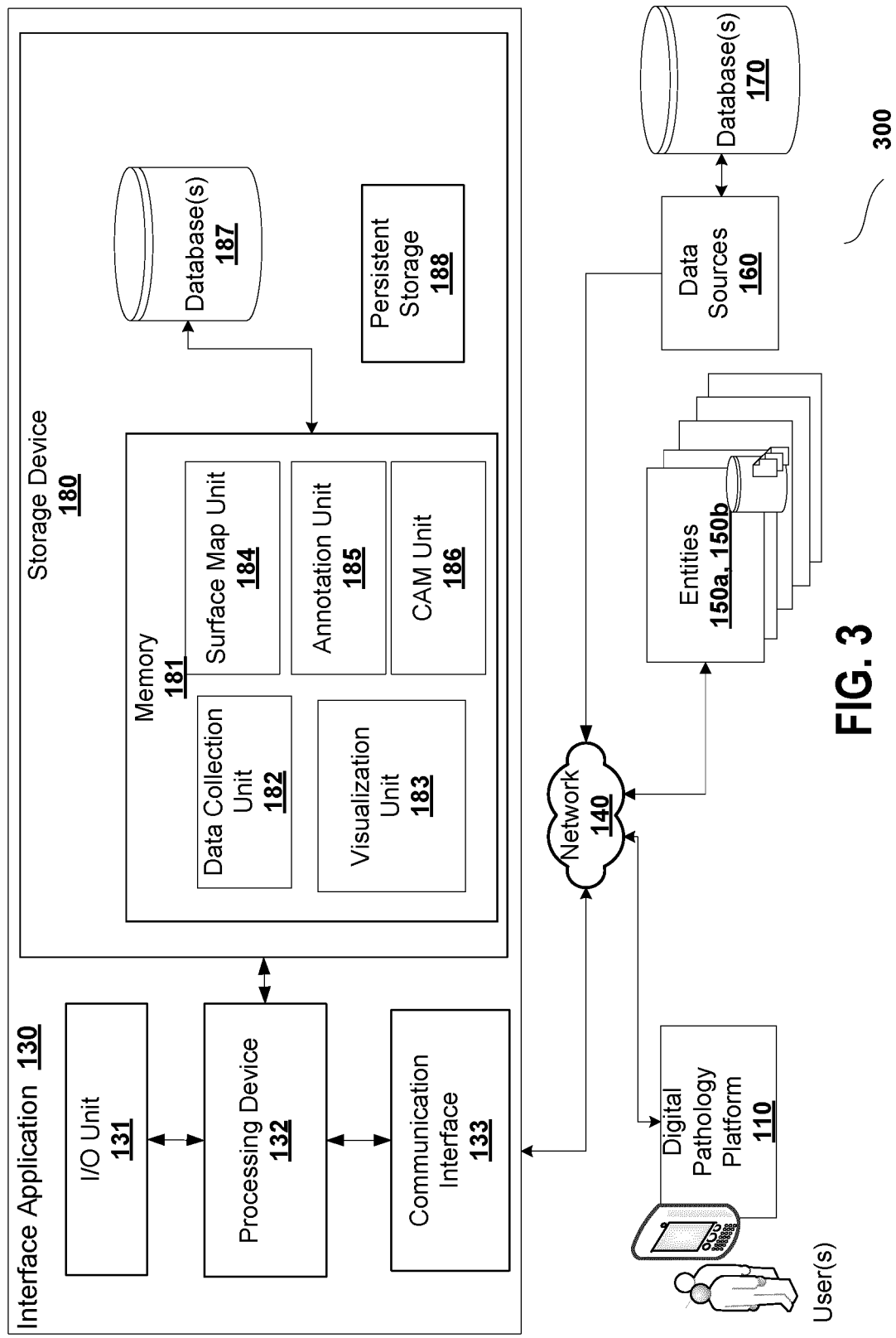
FIG. 3 is a view of an example interface application according to some embodiments.

In some embodiments, CAM unit 126 can generate a class activation map, surface map, or "heatmap" depicting the basis of classifications or predictions of, for example, image data, tiles, and/or pathology slides. CAM unit 126 can cause such class activation map, surface map, or "heatmap" to be stored in a database 127 or persistent storage 128 or transmitted over a network 140, for example, to interface application 130. FIG. 3 is a view of an example interface application 130 according to some embodiments. The interface application 130 can include a visual representation of a pathology tile.

An interface application 130 can include an I/O Unit 131, processing device 132, communication interface 133, and storage device 180.

An interface application 130 can connect with one or more digital pathology platforms 110, entities 150, data sources 160, and/or databases 170. This connection may be over a network 140 (or multiple networks). Interface application 130 receives and transmits data from one or more of these via I/O unit 131. When data is received, I/O unit 131 transmits the data to processing device 132.

Each I/O unit 131 can enable the interface application 130 to interconnect with one or more input devices, such as a keyboard, mouse, camera, touch screen and a microphone, and/or with one or more output devices such as a display screen and a speaker.

A processing device 132 can execute instructions in memory 181 to configure storage device 180, and more particularly, data collection unit 182, visualization unit 183, surface map unit 184, annotation unit 185, and CAM unit 186. A processing device 132 can be, for example, any type of general-purpose microprocessor or microcontroller, a digital signal processing (DSP) processor, an integrated circuit, a field programmable gate array (FPGA), a reconfigurable processor, or any combination thereof. The oversampling is optional and in some embodiments there may not be an oversampling unit.

Memory 131 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 180 can include memory 181, databases 187, and persistent storage 188.

Each communication interface 133 can enable the interface application 130 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The interface application 130 can be operable to register and authenticate users (using a login, unique identifier, and password for example) prior to providing access to applications, a local network, network resources, other networks and network security devices. The platform 110 may serve one user or multiple users.

The storage 187 may be configured to store information associated with or created by the data collection unit 182, visualization unit 183, surface map unit 184, annotation unit 185, and CAM unit 186. Storage 187 and/or persistent storage 188 may be provided using various types of storage technologies, such as solid state drives, hard disk drives, flash memory, and may be stored in various formats, such as relational databases, non-relational databases, flat files, spreadsheets, extended markup files, etc.

Data collection 182 associated with a storage device 180 and interface application 130 can receive data, for example, image data corresponding to a pathology slide depicting a tissue sample from a patient. Data collection unit 182 can receive stored data from one or more external systems 150 or digital pathology platform 110, for example, corresponding to other image data from other patients, other hospitals, other samples from the same patient, or other (or same) class or type of image. Data collection unit 182 can process the data.

In some embodiments, surface map unit 184 can generate a distribution of images or image tiles, such as lesion tiles, on a t-distributed Stochastic Neighbour Embedding (t-SNE) plot to show a planar representation of a convolutional neural network layer (for example, the final layer). In some embodiments, surface map unit 184 can receive a two-dimensional plot such as a t-SNE plot, depicting hyperdimensional space from a digital pathology platform 110 or external systems 150. Surface map unit 184 can cause such distribution of images or image tiles to be stored in a database 187 or persistent storage 188 or transmitted over a network 140, for example, to digital pathology platform 110. Surface map unit 184 can cause the t-SNE plot to be presented to a user engaged with interface application 130.

In some embodiments, annotation unit 185 can generate output indications of regions of interest on digital pathology slides using classification data. For example, annotation unit 185 can receive classification data transmitted from a digital pathology platform 110. Annotation unit 185 can associate the classification or predicted region of interest type with an image, tile, or digital pathology slide, for example, that was used in creating the classification or predicted region of interest type. Annotation unit 185 can cause such associations to be stored in a database 187 or persistent storage 188 or transmitted over a network 140, for example, to digital pathology platform 110. Using the association data, annotation unit 185 can create data allowing the presentation of the classifications or predicted region of interest type on the image, tile, or digital pathology slide. Annotation unit 185 can visually annotate the image, tile, or digital pathology slide for presentation to a user engaged with interface application 130.

In some embodiments, CAM unit 186 can generate a class activation map, surface map, or "heatmap" depicting the basis of classifications or predictions of, for example, image data, tiles, and/or pathology slides. CAM unit 186 can cause such class activation map, surface map, or "heatmap" to be stored in a database 187 or persistent storage 188 or transmitted over a network 140, for example, to digital pathology platform 110 or entities 150. CAM unit 186 can cause the class activation map, surface map, or "heatmap" to be presented to a user engaged with interface application 130.

Visualization unit 183 can generate and present an integrated summary output or report containing information such as classification, predicted region of interest type of a hyperdimensional space, a surface map showing the basis of the prediction, a class activation map, a t-SNE plot that can show unknown cases classified as "undefined", likelihood percentages or relative prediction scores associated with alternative predictions or classifications, visual annotations of images (such as digital pathology slides), and other data associated with an image or tile, a cluster of images or tiles, and/or a selection of image data. Visualization unit 183 can cause the integrated summary output or report to be presented to a user engaged with interface application 130.

FIG. 4 is a view of an example workflow 400.

At 402, digital pathology platform 110 receives, at a processor, an unclassified pathology image.

At 404, digital pathology platform 110 generates, at the processor, classification data using one or more convolutional neural networks trained using pathology images to learn pathology features. Memory stores the convolutional neural networks.

At 406, digital pathology platform 110 generates, at an interface tool or interface application, output indications of regions of interest on digital pathology slides using the classification data, the regions of interest including a predicted region of interest type of a hyperdimensional space and a surface map showing the basis of the prediction.

At 408, digital pathology system 100 visually annotates the digital pathology slides using the interface tool 130.

At 410, digital pathology system 100 generates an interface at interface application 130, for example, a visualization of annotated digital pathology slides, a surface map, a CAM map, an integrated summary report, or a predicted region of interest type.

Alternatively or in addition, at 412, digital pathology system 100 stores the annotated digital pathology slide data and/or transmits same over a network (or multiple networks) 140.

Figure 13:
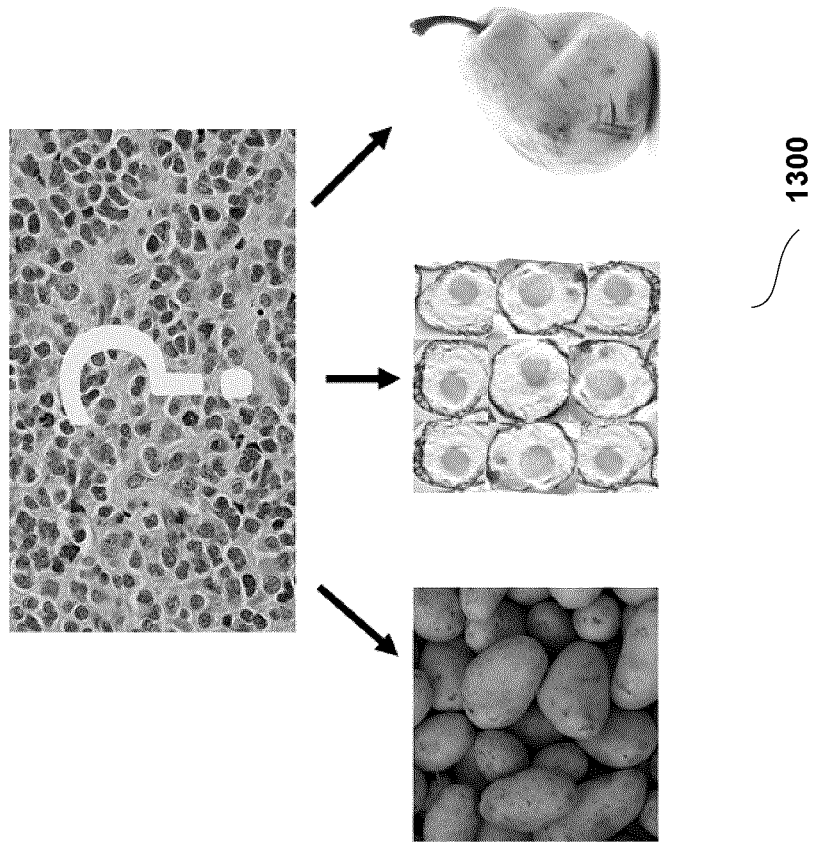
FIG. 13 is a view of example digital pathology slides of tissue.

FIGS. 11 to 13 at 1100, 1200, and 1300, respectively, depict example digital pathology slides of tissue with different tumour diagnosis and associated prognosis.

Figure 15:
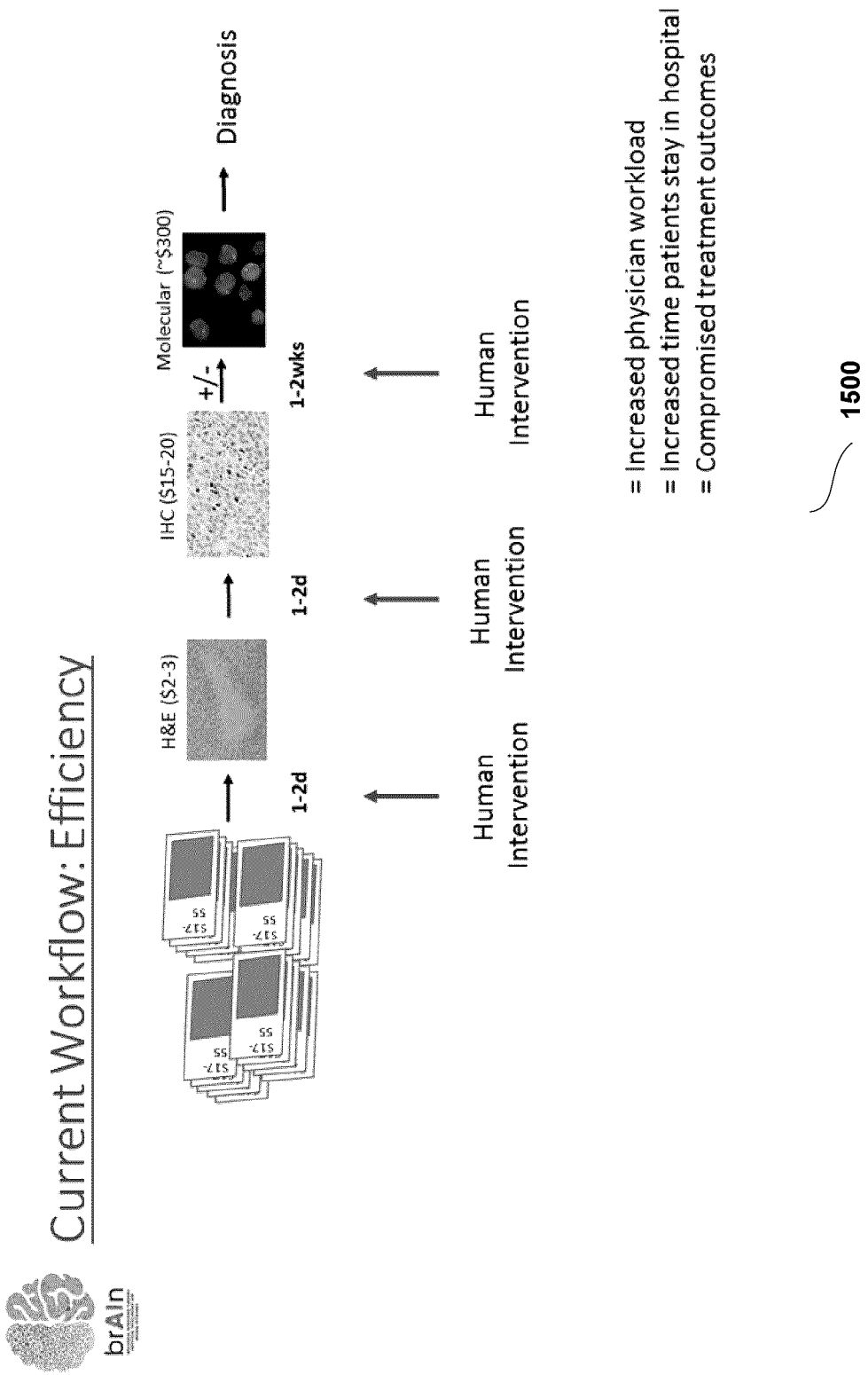
FIG. 15 depicts an example workflow using tissue mounted on slides.
Figure 16:
FIG. 16 depicts an example workflow using tissue mounted on slides.

FIGS. 15 and 16 at 1500 and 1600, respectively, depict example workflows for diagnosis using tissue mounted on slides. Digital pathology system 100 can mitigate a need to order extra tests on a tissue sample (e.g., for diagnosis), time costs, and safety costs.

FIG. 17 at 2100 depicts an example conceptual workflow employing digital pathology system 100 as well as a lengthier workflow not employing digital pathology system 100.

Figure 18:
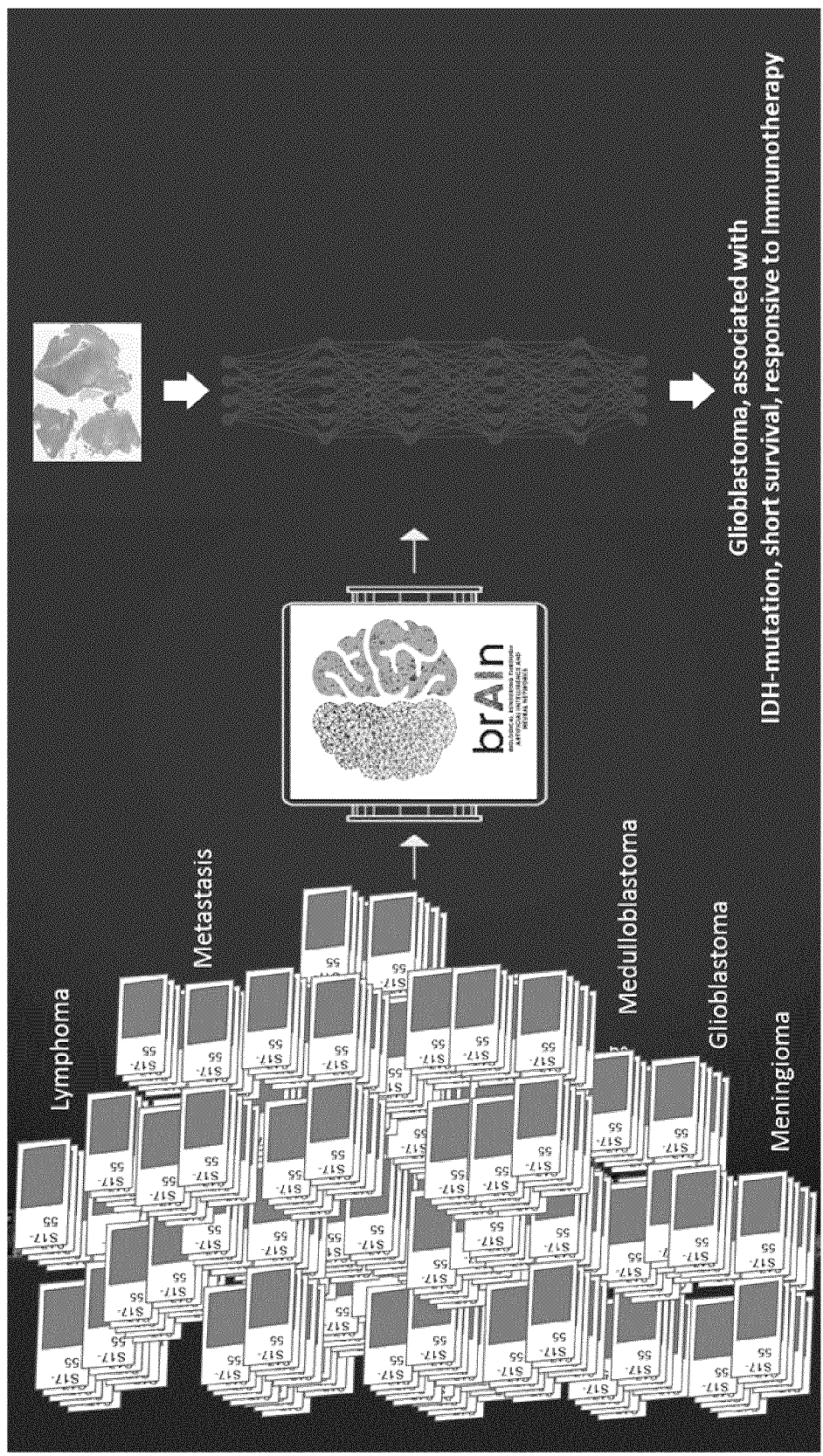
FIG. 18 depicts use of a digital pathology system to predict prognosis from slide data for different tumour types.
Figure 20:
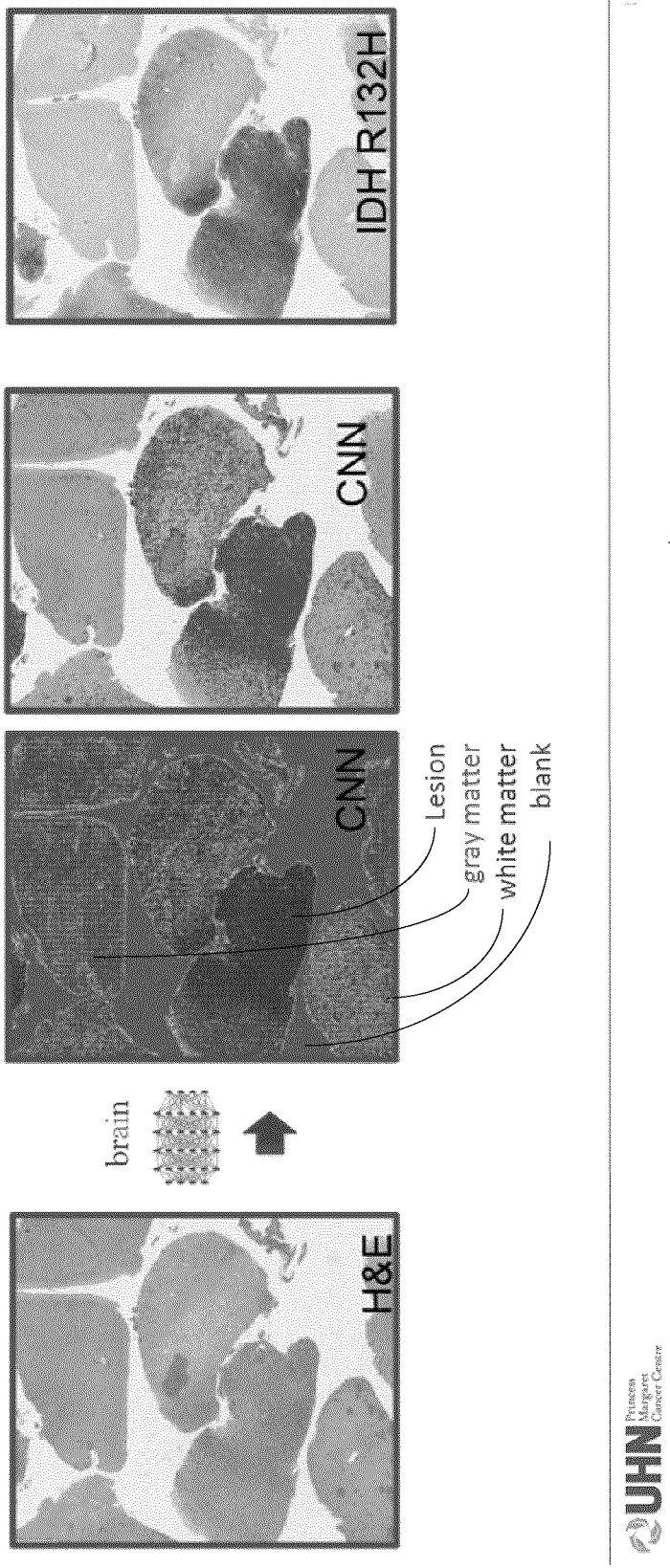
FIG. 20 depicts CAMs reflecting tumour type classification by digital pathology platform.
Figure 21:
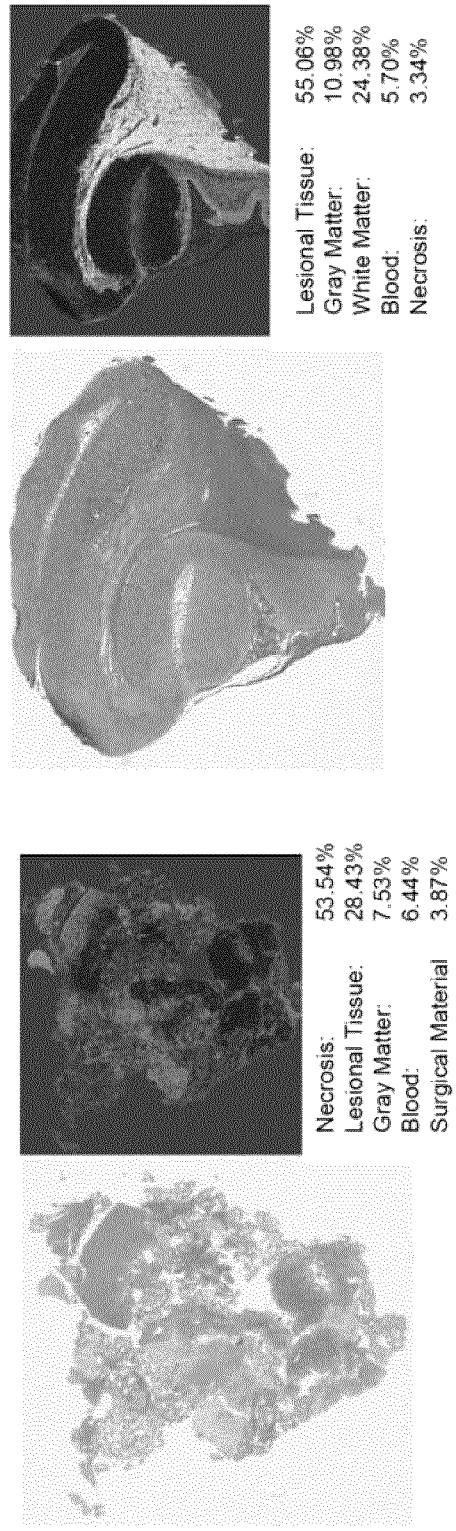
FIG. 21 depicts CAMs reflecting tumour type classification by digital pathology platform.

FIG. 18 at 2200 depicts use of digital pathology system 100 to predict prognosis from slide data for different tumour types.

FIGS. 19 to 25 at 2300, 2400, 2500, 2600, 2700, 2800, 2900, respectively, depict class activation maps (CAMs) reflecting tumour type classifications or predictions generated by digital pathology platform 110. Probability for each predicted class can also be presented. The most probable classes can be used to identify a final predicted class and displayed to the user. In the integrated reports 2800, 2900 shown on FIG. 24 and FIG. 25, the output displays an aggregate percentage score for each class across the whole slide and lists the most likely diagnosis in the box 2802, 2902. A similar scope and exercise is carried out with the distribution of tiles on the t-SNE plot. If these match (e.g., as in FIG. 24) a diagnosis 2804 is given. When these do not match (e.g., as in FIG. 25), the algorithm senses this is a novel or difficult case and elects to flag the slide without giving a diagnosis 2904.

Figure 26:
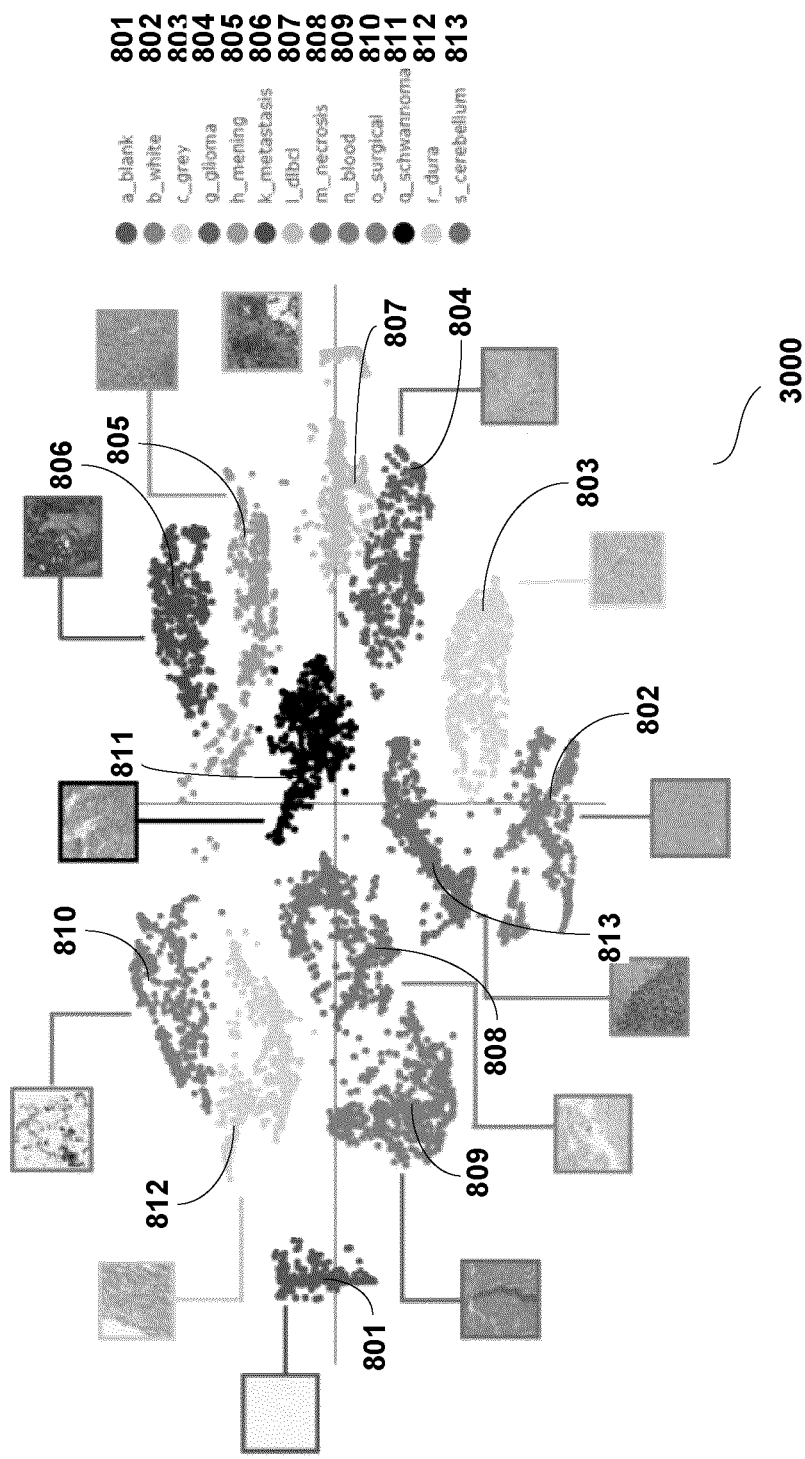
FIG. 26 depicts multi-level visualization by digital pathology platform using t-SNE.

FIG. 26 at 3000 depicts a t-SNE plot for a hyperdimensional space stored by a convolutional neural network. In the t-SNE plot, training images are plotted to highlight the organization of information within the neural network. By plotting a large number of tiles, decision boundaries may be developed and organized between classes.

Figure 27:
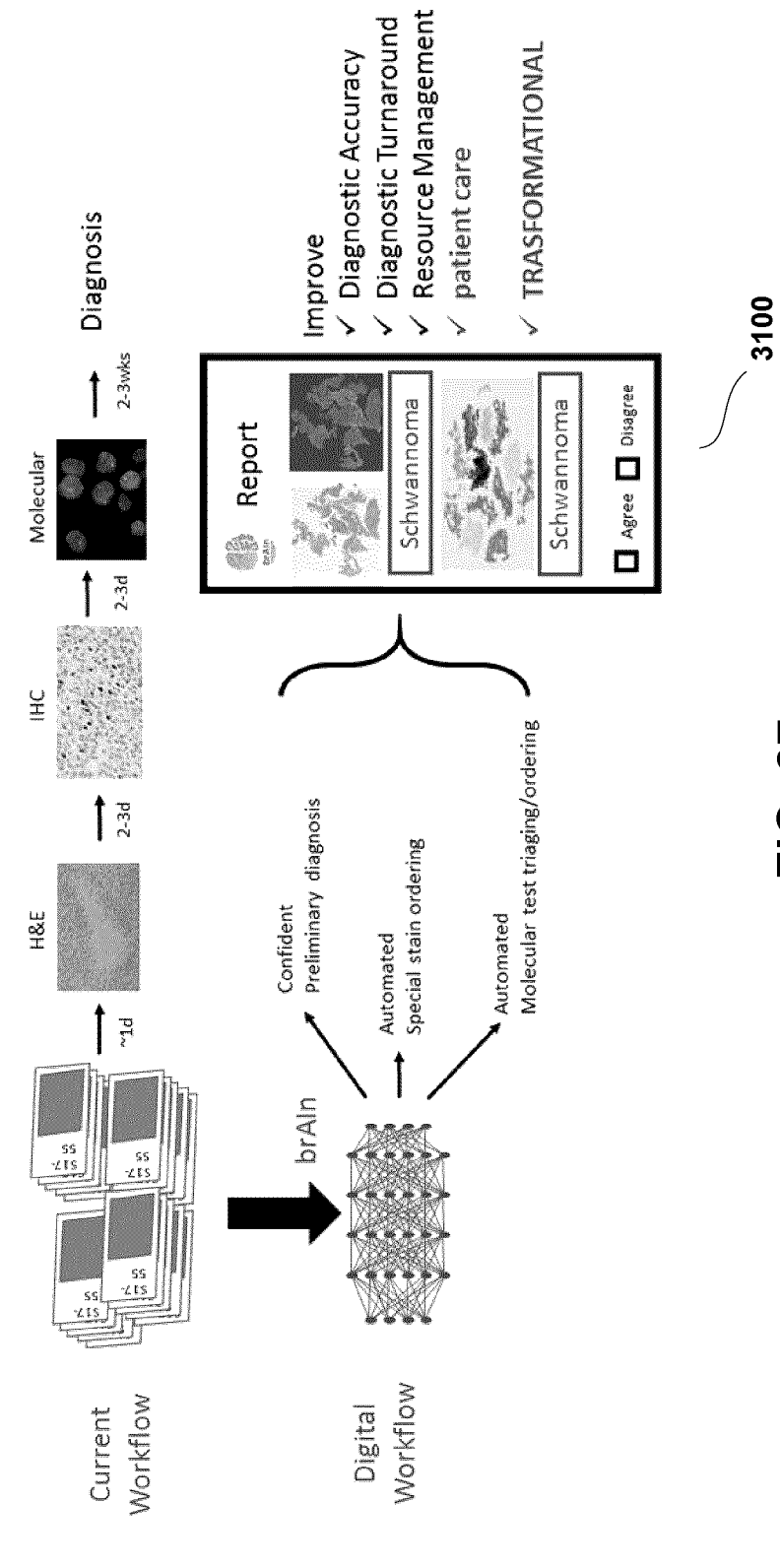
FIG. 27 depicts an example workflow of digital pathology system as well as a workflow not employing digital pathology system.

FIG. 27 at 3100 depicts an example conceptual workflow employing digital pathology system 100 as well as a lengthier workflow not employing digital pathology system 100. 3100 also depicts a view of an integrated report presented to a user engaged at interface application 130.

Figure 28:
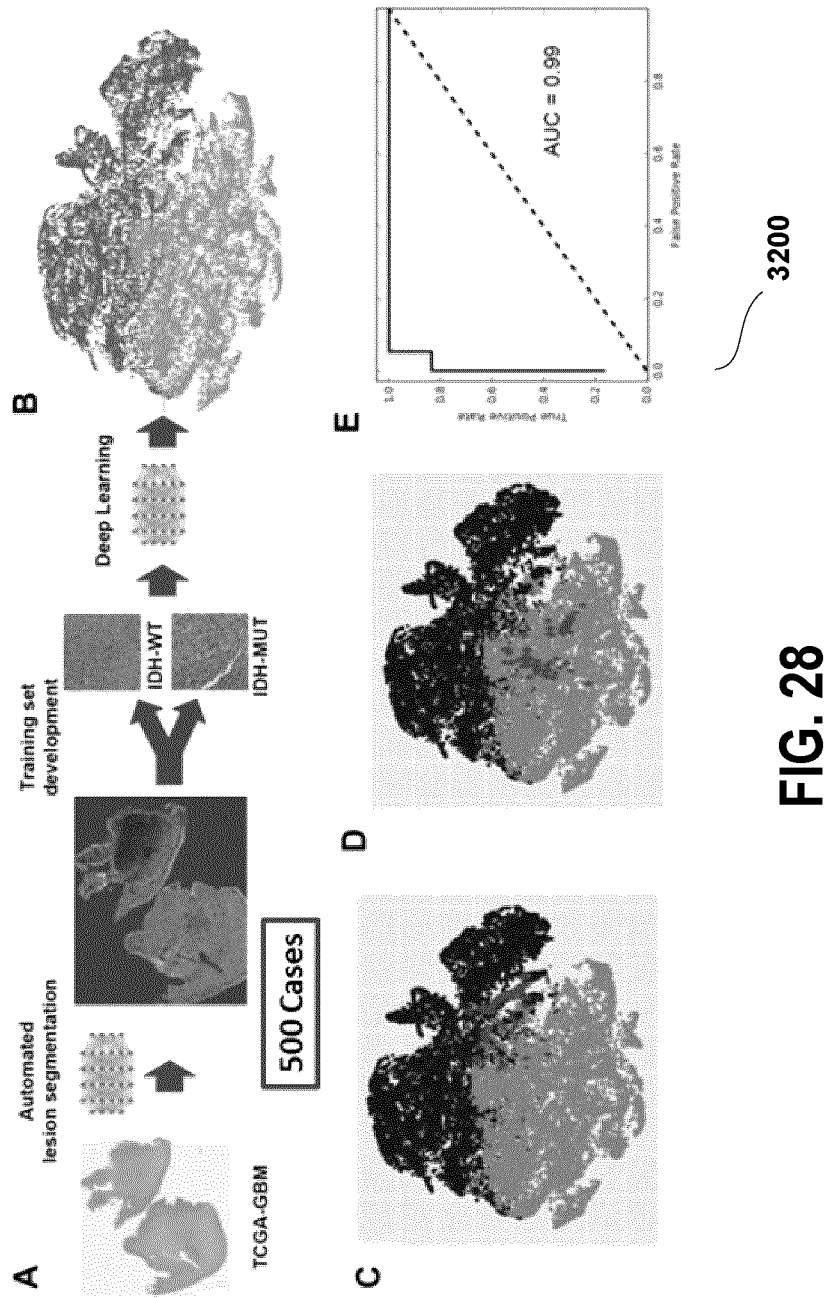
FIG. 28 depicts molecular-level histopathologic classification of GBMs using deep neural networks.

FIG. 28 at 3200 depicts molecular-level histopathologic classification of GBMs using deep neural networks. An approach was also developed that allows trained neural networks to automate segmentation and retaining themselves with different parameters linked to each image. In this particular case, image tiles containing glioblastoma were auto-segmented from surrounding normal brain tissue. These are used to train the neural network to differentiate between IDH-mut and IDH-wt glioblastoma. The resulting t-SNE may then be used to serve as a classifier for test cases by overlaying test tiles on the t-SNE plot. For this particular exercise, a preliminary validation sets highlight an ability to predict IDH status in new cases (e). An example of the area under the curve (AUC) is listed here.

Figure 29:
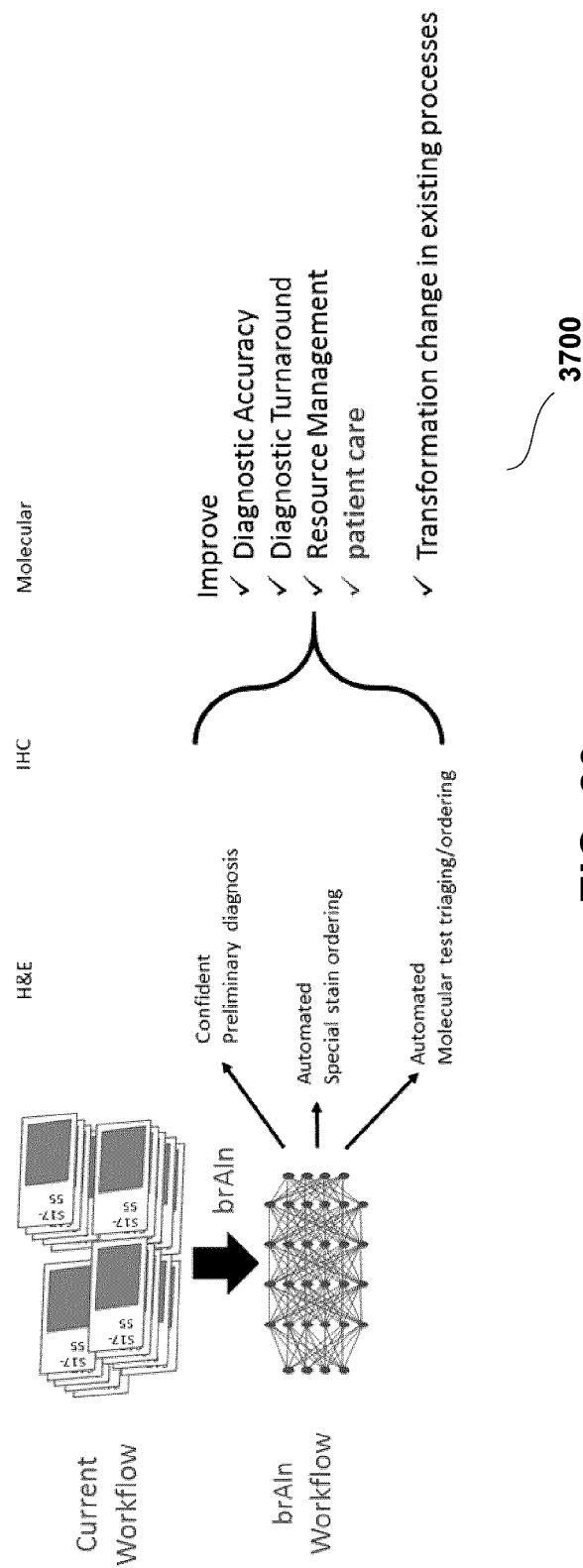
FIG. 29 depicts an example workflow using digital pathology system as well as a workflow not employing digital pathology system.
Figure 30:
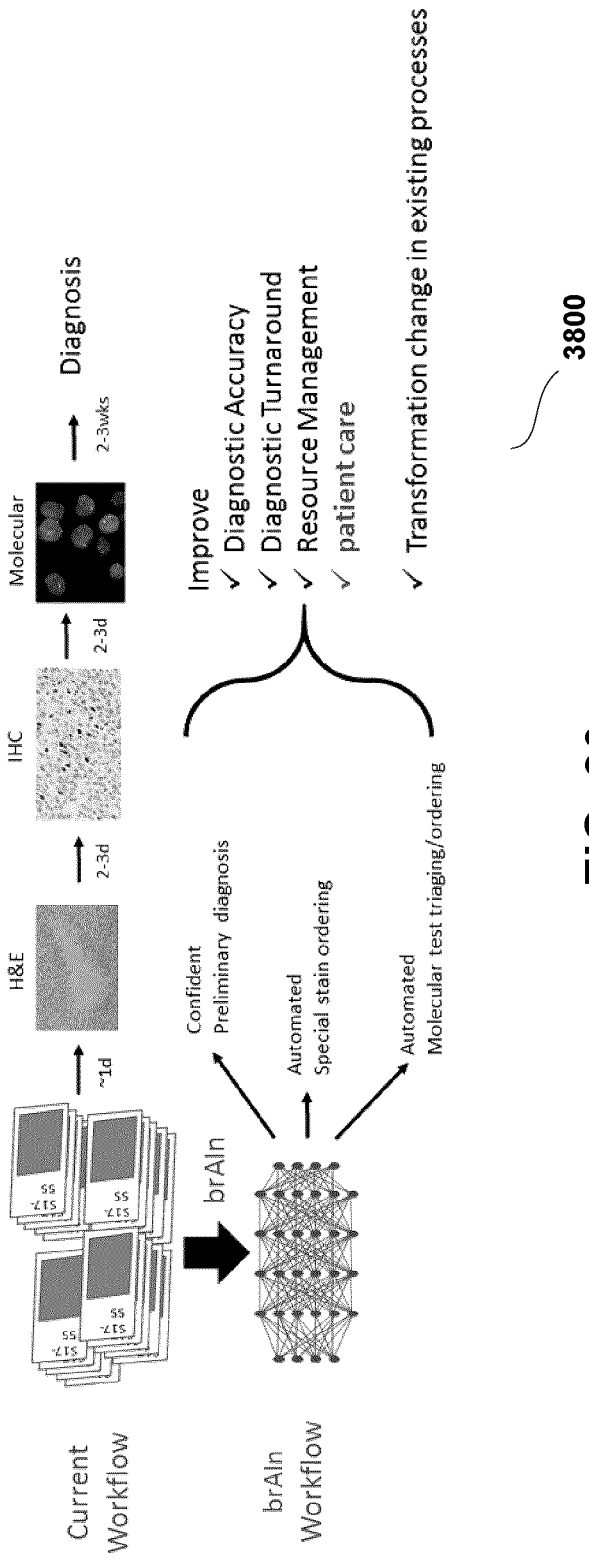
FIG. 30 depicts an example workflow using digital pathology system as well as a workflow not employing digital pathology system.

FIGS. 29 and 30 at 3700 and 3800, respectively, depicts an example conceptual workflow employing digital pathology system 100. Digital pathology system 100 can improve efficiency, safety, and precision in diagnostics and define new prognostic or predictive biomarkers.

Figure 31:
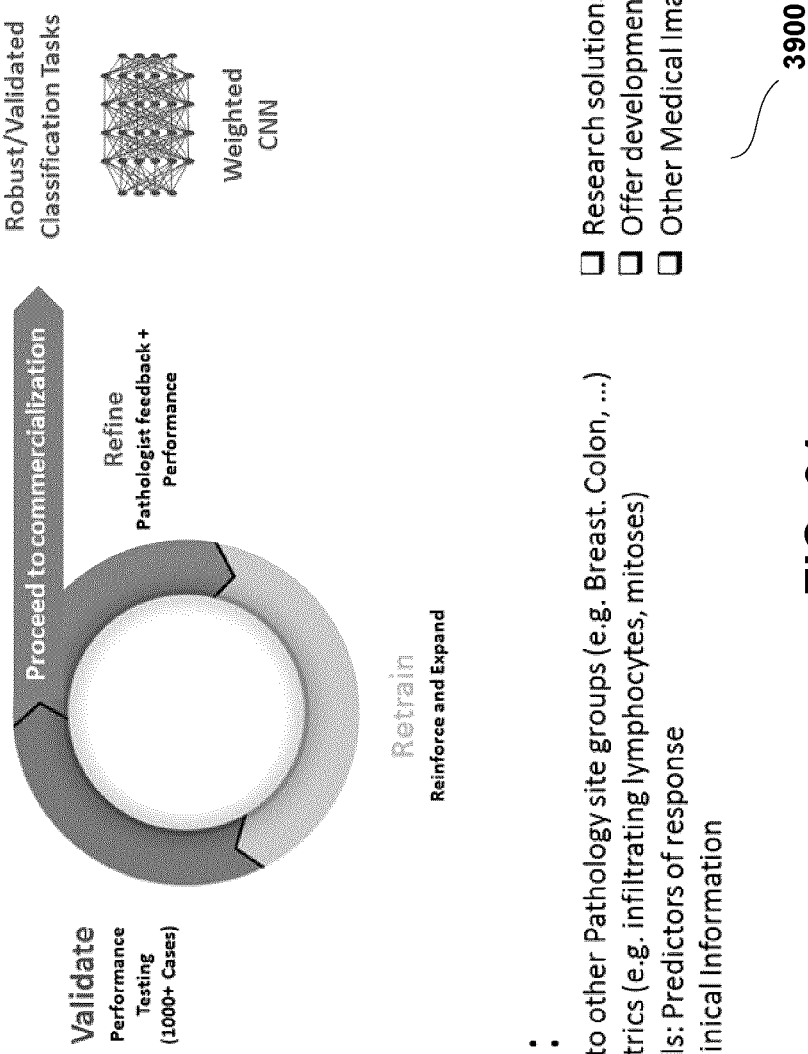
FIG. 31 depicts example applications of digital pathology platform.

FIG. 31 at 3900 depicts example applications of digital pathology platform 100, for example, to various pathology site groups or various metrics.

Figure 32:
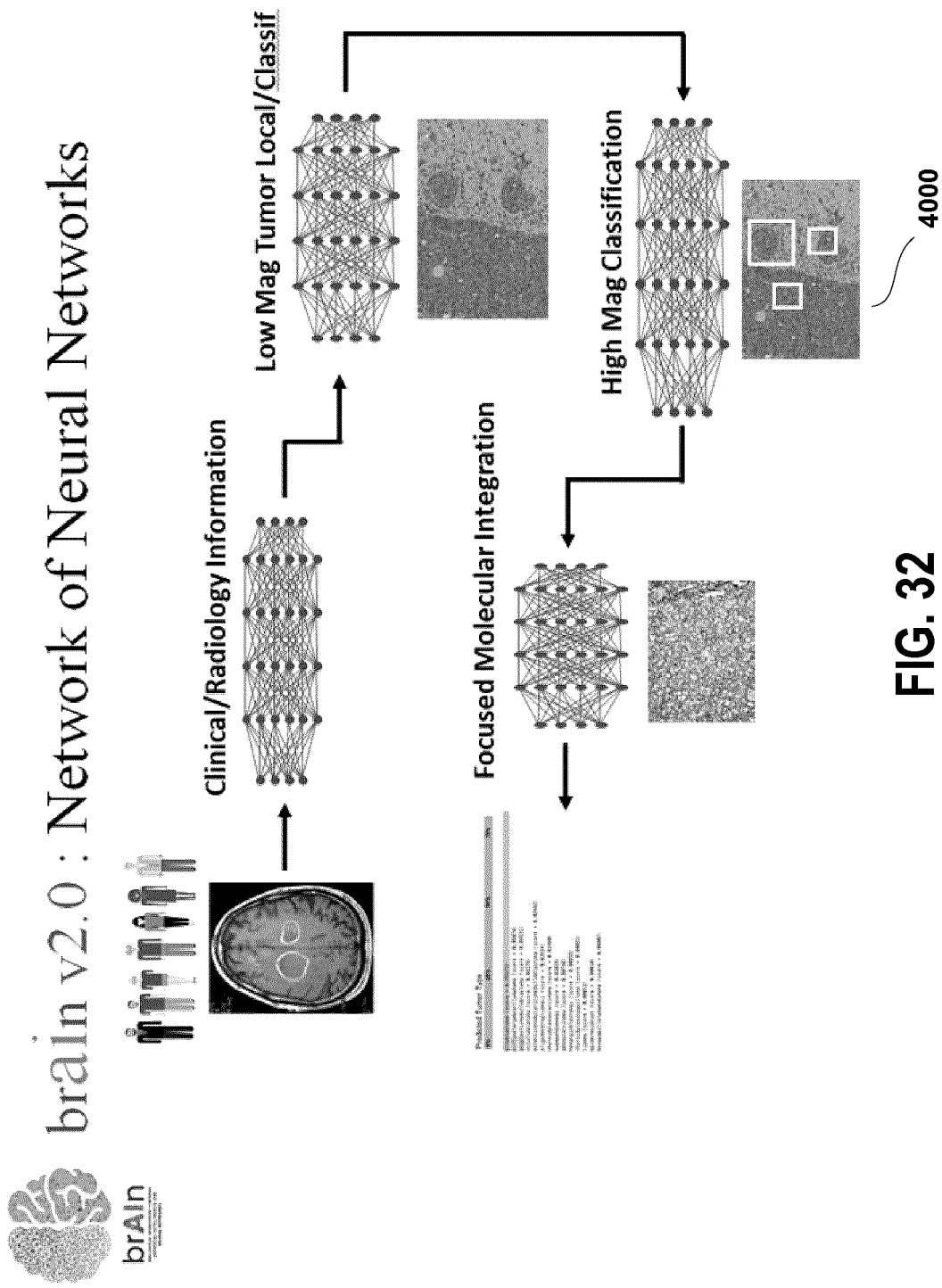
FIG. 32 depicts a modular or hierarchical arrangement of CNNs used by digital pathology system.

FIG. 32 at 4000 depicts a modular or hierarchical arrangement of CNNs used by digital pathology system 100. Neural networks may also be placed in tandem to carry out progressively more intricate tasks and benefit from integrating information from multiple sources. The final product is a probability score that uses input from demographic, H&E and molecular data to refine the diagnosis and provide an improved probability score.

FIG. 33 at 4100 depicts t-SNE plots of data stored in a CNN and multi-level classification. The majority of diamonds 814 in the oval 4106 on the t-SNE plot show that this test case (left panel 4102) matches the training images of a schwannoma on the t-SNE plot 4104. This case is therefore classified as a schwannoma.

Figure 34:
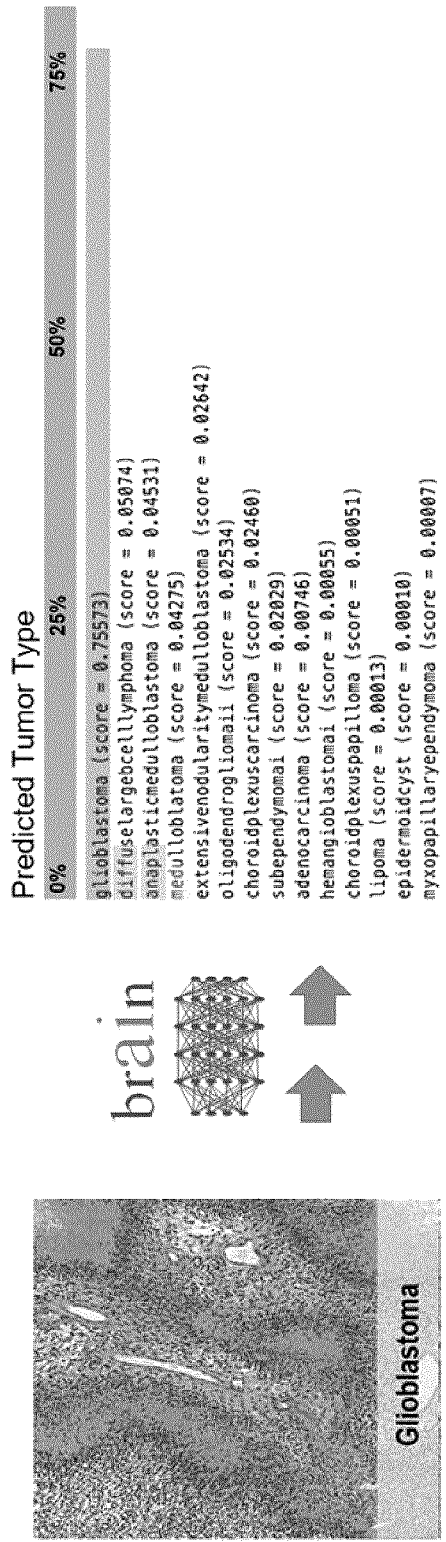
FIG. 34 depicts a workflow producing predicted tumour types by digital pathology platform.

FIG. 34 at 4200 depicts a workflow producing predicted tumour types by digital pathology platform 110.

Figure 35:
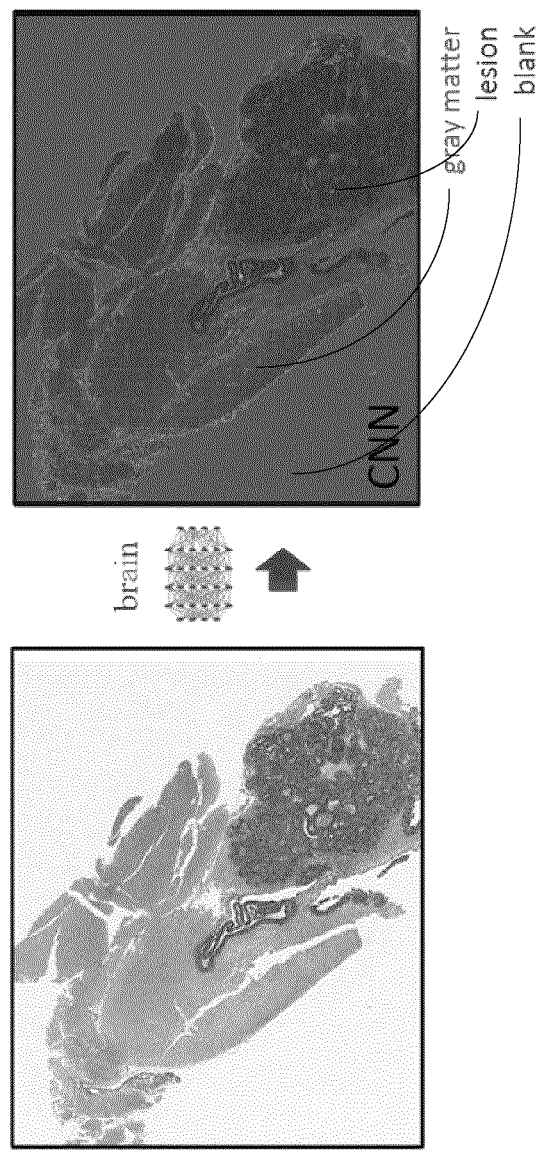
FIG. 35 depicts lesion segmentation.
Figure 36:
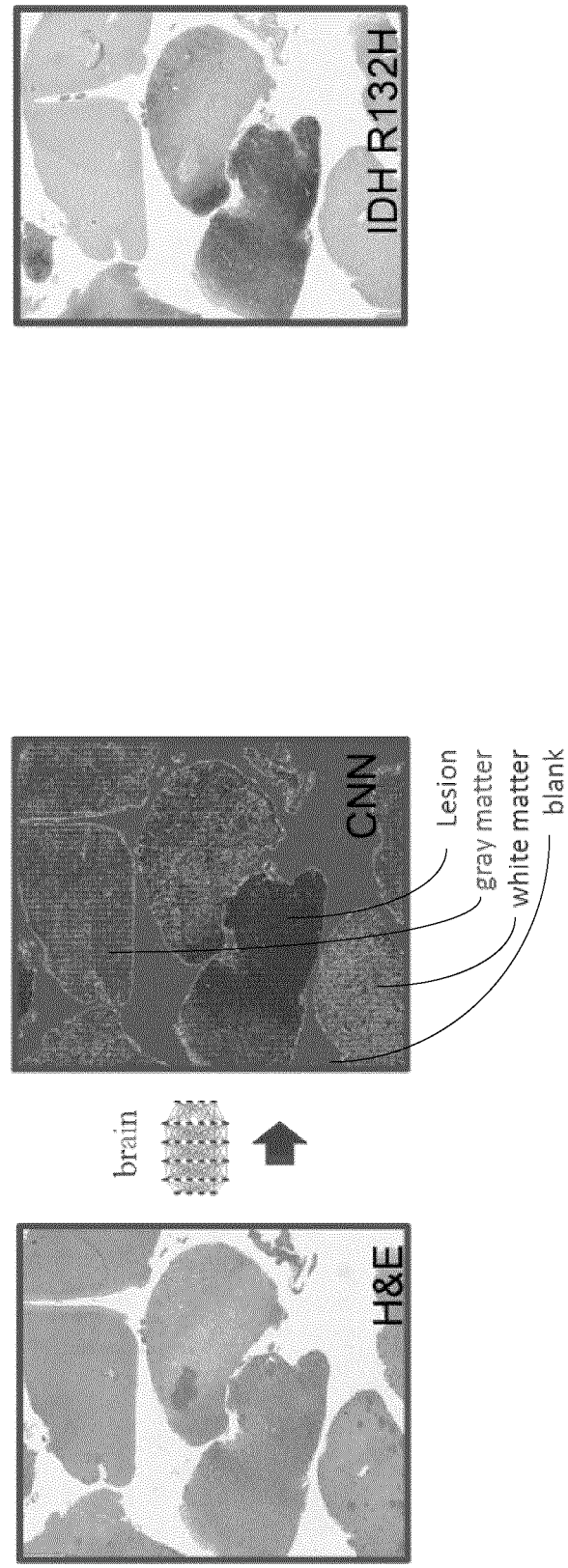
FIG. 36 depicts lesion segmentation.
Figure 37:
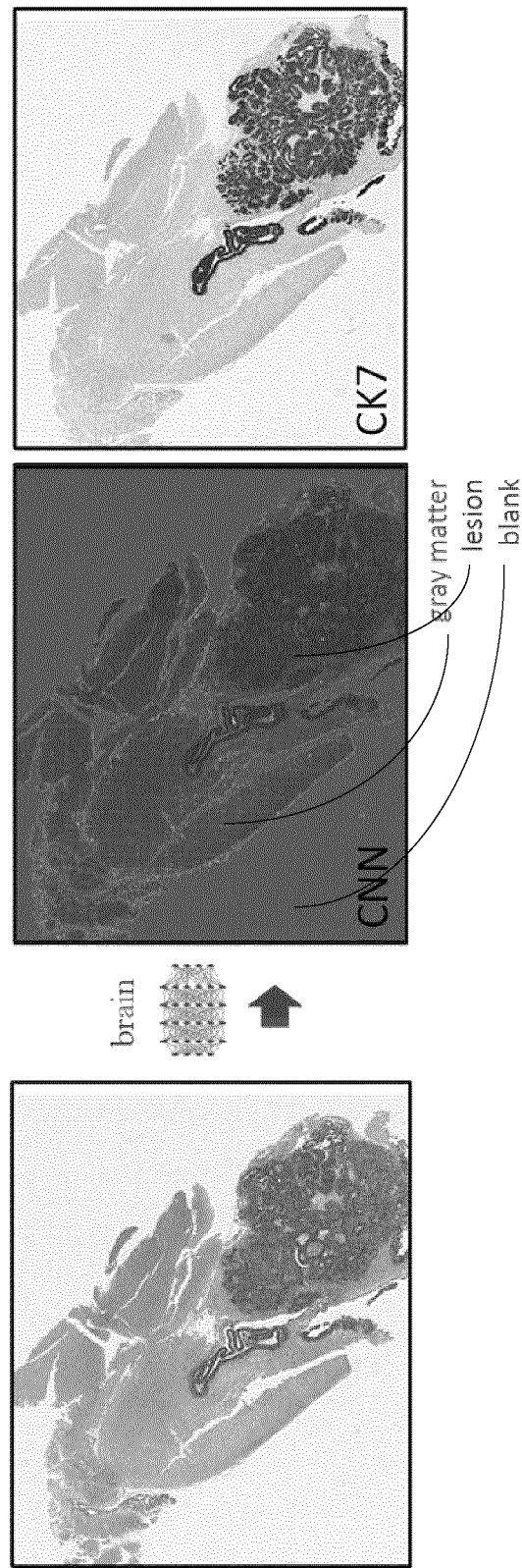
FIG. 37 depicts lesion segmentation.

FIGS. 35 to 37 at 4300, 4400, and 4500, respectively, depict CAMs or surface maps showing the basis of CNNs in digital pathology platform 110. This may mirror immunohistochemical staining.

Figure 38:
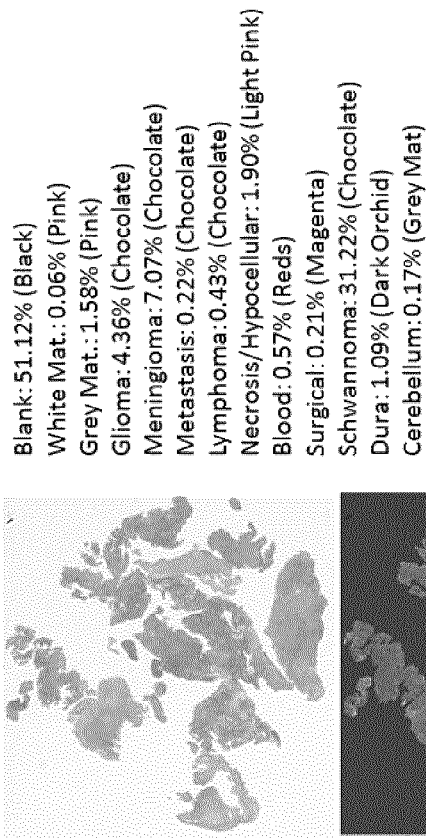
FIG. 38 depicts various views of an integrated report generated at or presented at an interface application.

FIG. 38 at 4600 depicts various views of an integrated report generated at or presented at an interface application 130.

FIG. 39 at 4700 depicts t-SNE plots of data stored in a CNN and multi-level visualization. The majority of black diamonds on t-SNE plot show that this test case (left panel) matches the training images of a glioma on the t-SNE plot. This case is therefore classified as a glioma.

Figure 40:
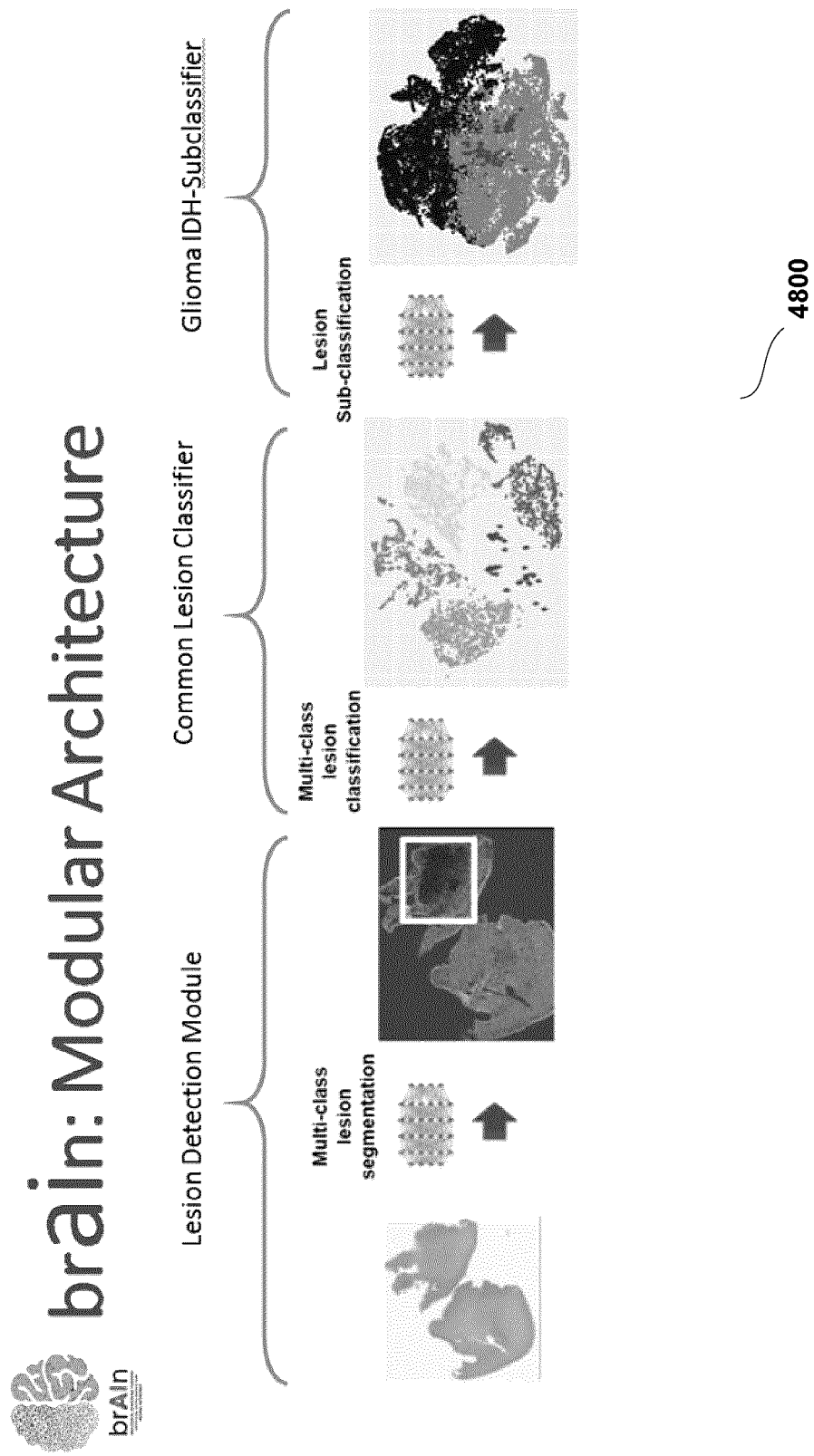
FIG. 40 depicts example workflows of an example digital pathology platform that uses a modular or hierarchical CNN classification, for example, a plurality of trained CNNs.
Figure 41:
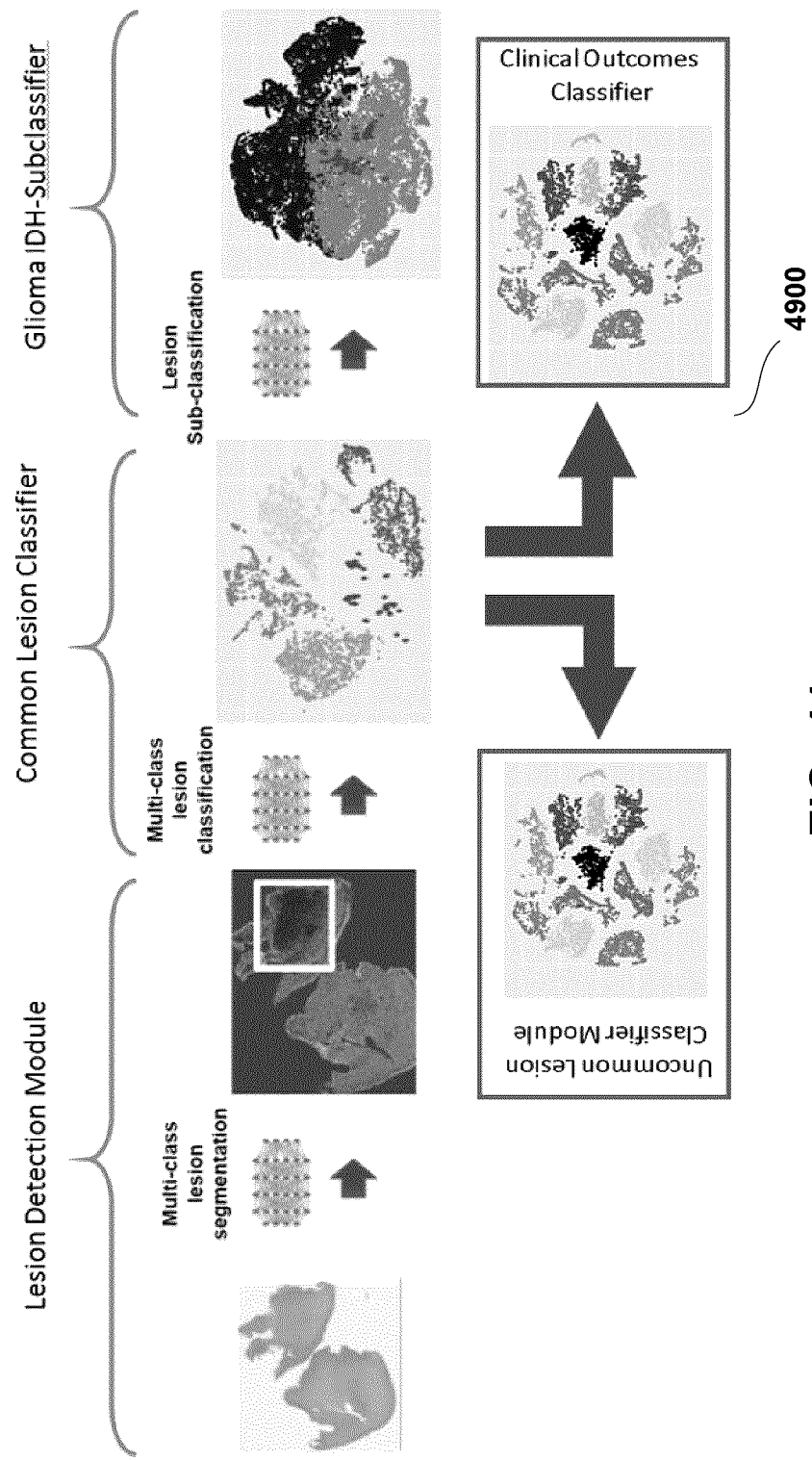
FIG. 41 depicts example workflows of an example digital pathology platform that uses a modular or hierarchical CNN classification, for example, a plurality of trained CNNs.

FIGS. 40 and 41 at 4800 and 4900, respectively, depict example workflows of an example digital pathology platform 110 that uses a modular or hierarchical CNN classification, for example, a plurality of trained CNNs.

FIG. 42 at 5000 depicts a view of a report presented at generated at or presented at an interface application 130 that shows prognostic outcome of various molecularly distinct pathologies. A Kaplan Meier curve is shown with a superior survival of IDH-mut Glioblastoma patients as compared to IDH-wt patients even though histologically they look very similar to humans.

Figure 43:
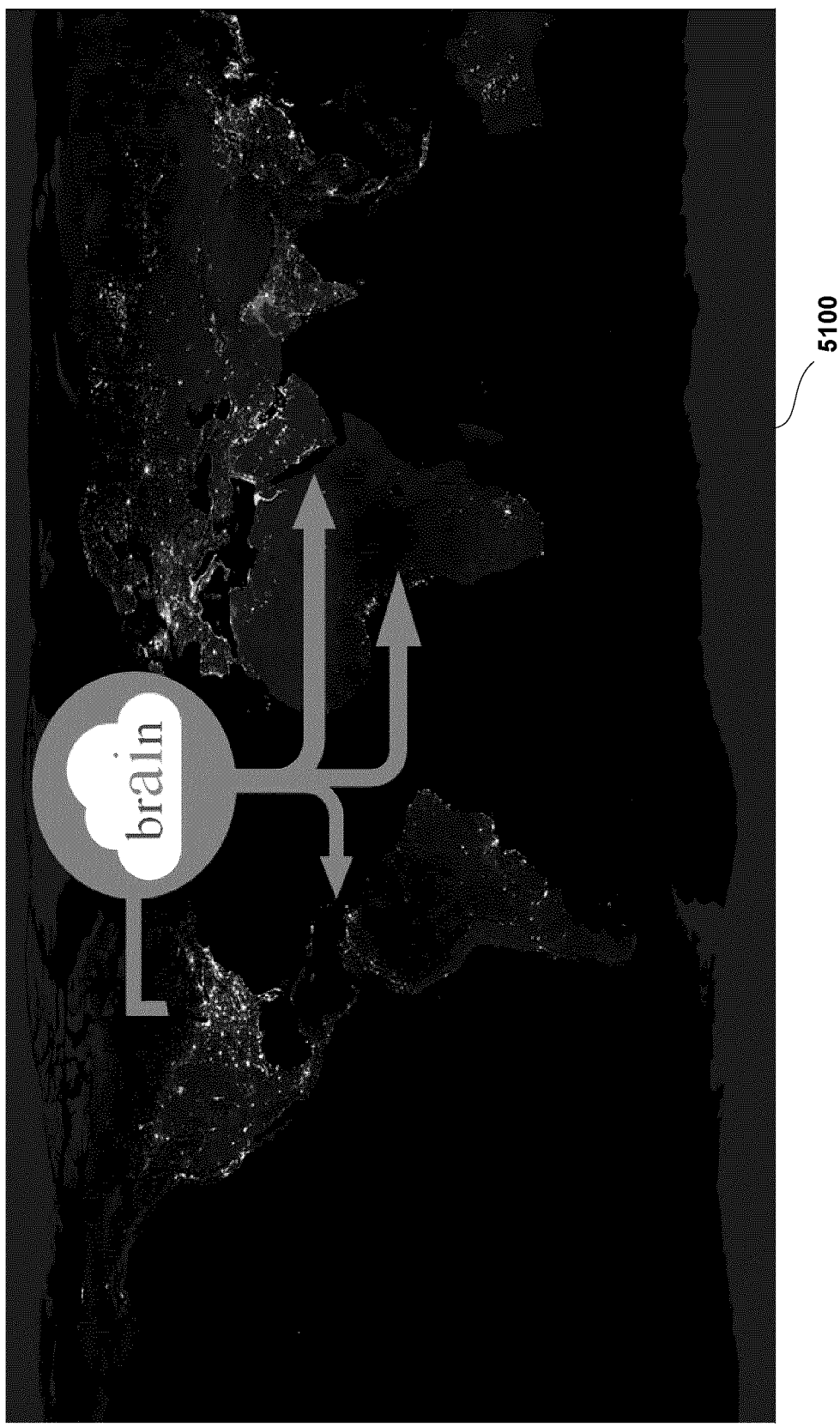
FIG. 43 depicts a concept diagram of digital pathology system housed in a cloud-based architecture.

FIG. 43 at 5100 depicts digital pathology system 100 housed in a cloud-based architecture. A world map is shown depicting that the methods herein can be used as a stand-alone cloud based tool that allows anyone in the world to upload a histological image and use it to generate an interpretation without the need of local software.

Figure 44:
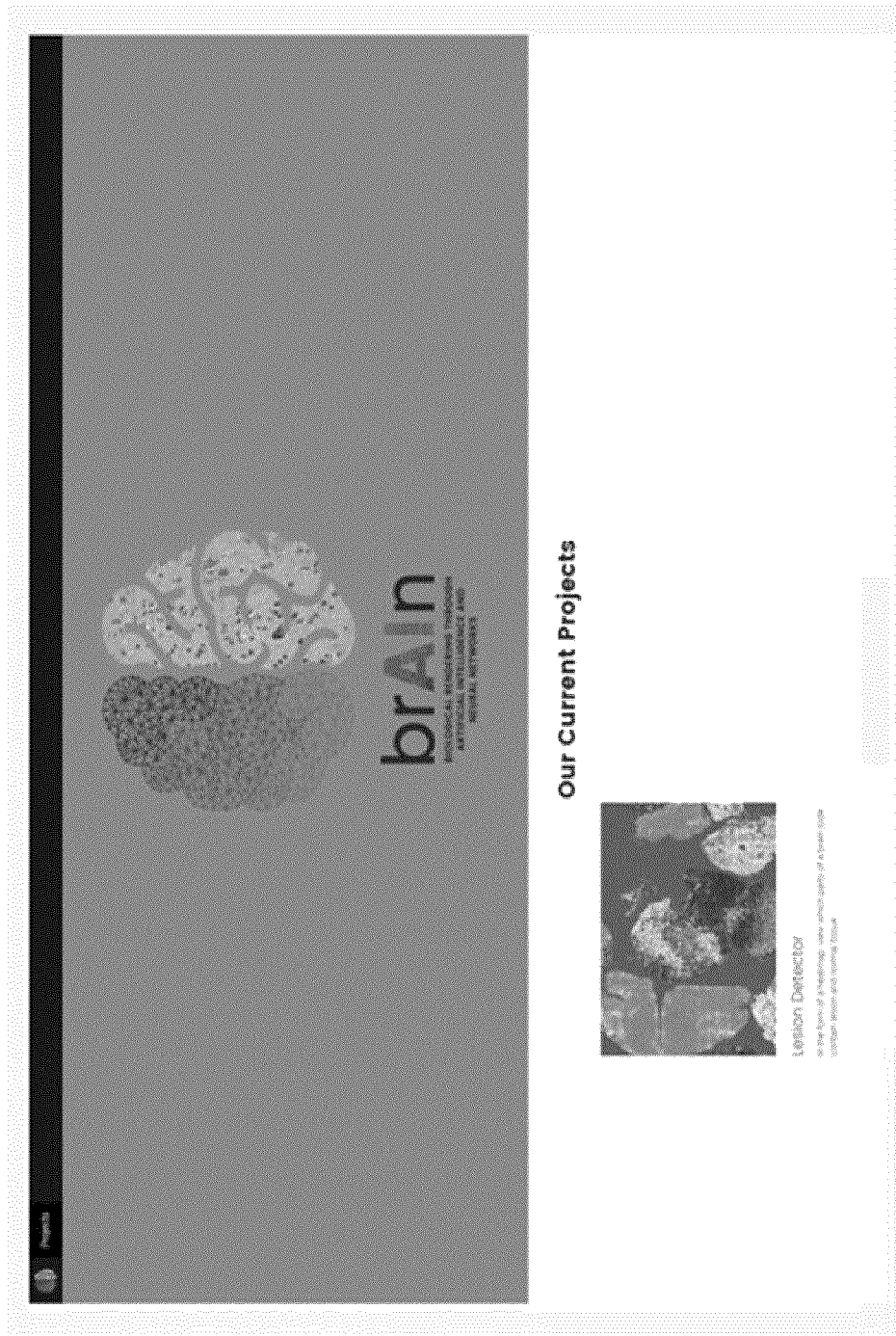
FIG. 44 depict views of an interface for engaging with an interface application.
Figure 45:
FIG. 45 depict views of an interface for engaging with an interface application.

FIGS. 44 and 45 at 5200 and 5300, respectively, depict views of an interface for engaging with an interface application 130. A user can select files, for example, pathology images, for digital pathology system 100 to use to learn pathology features or classify pathology images. Sample embodiments of screenshots of the user interface are shown. FIG. 44 highlights the home page where different "Apps" are listed. This current version has a "lesion detector" app shown. Once a user clicks on the available apps, the user is taken to another page (see FIG. 45) in which the user may upload your image of image for annotation and classification.

Figure 46B:
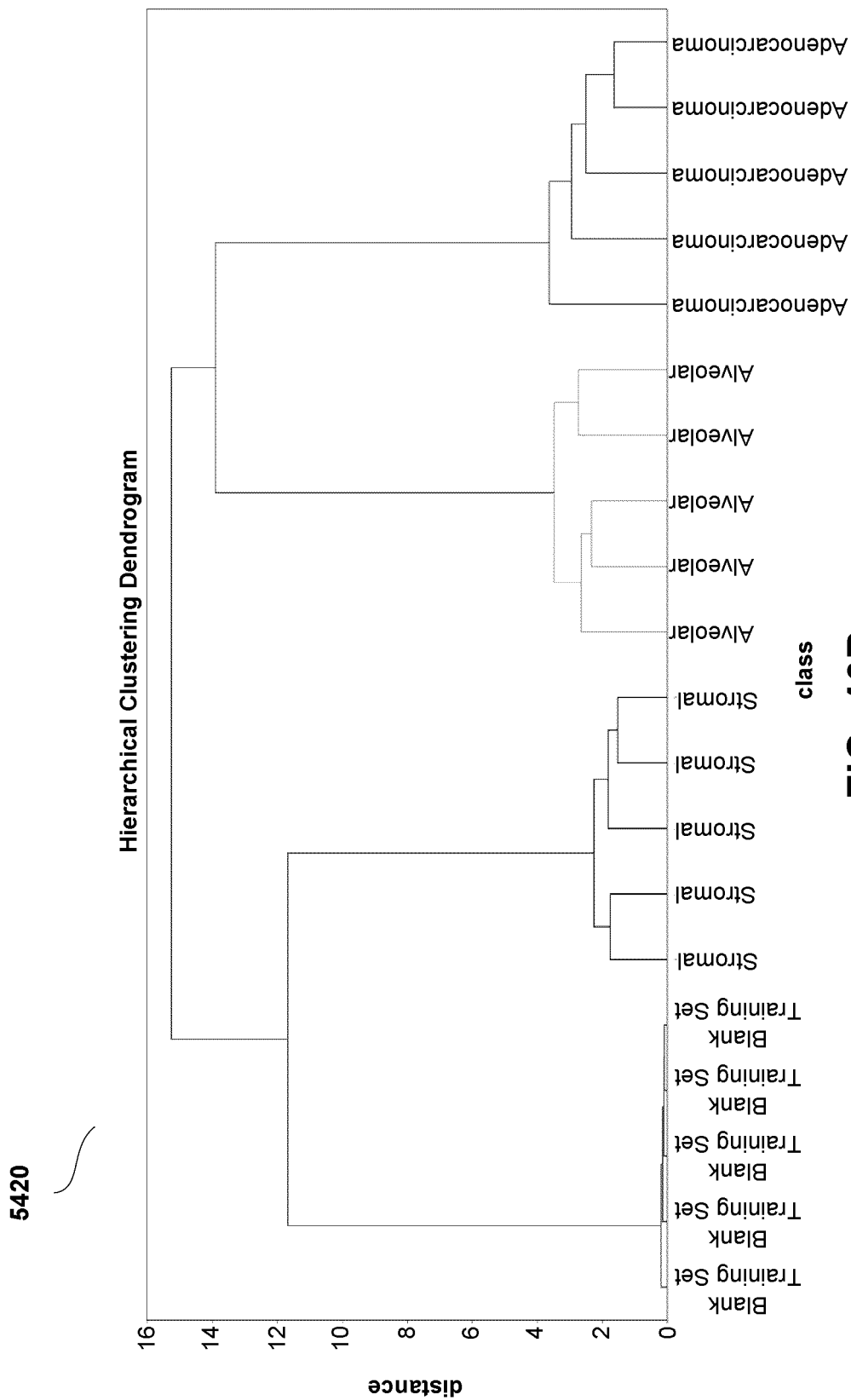
Figure 46C:
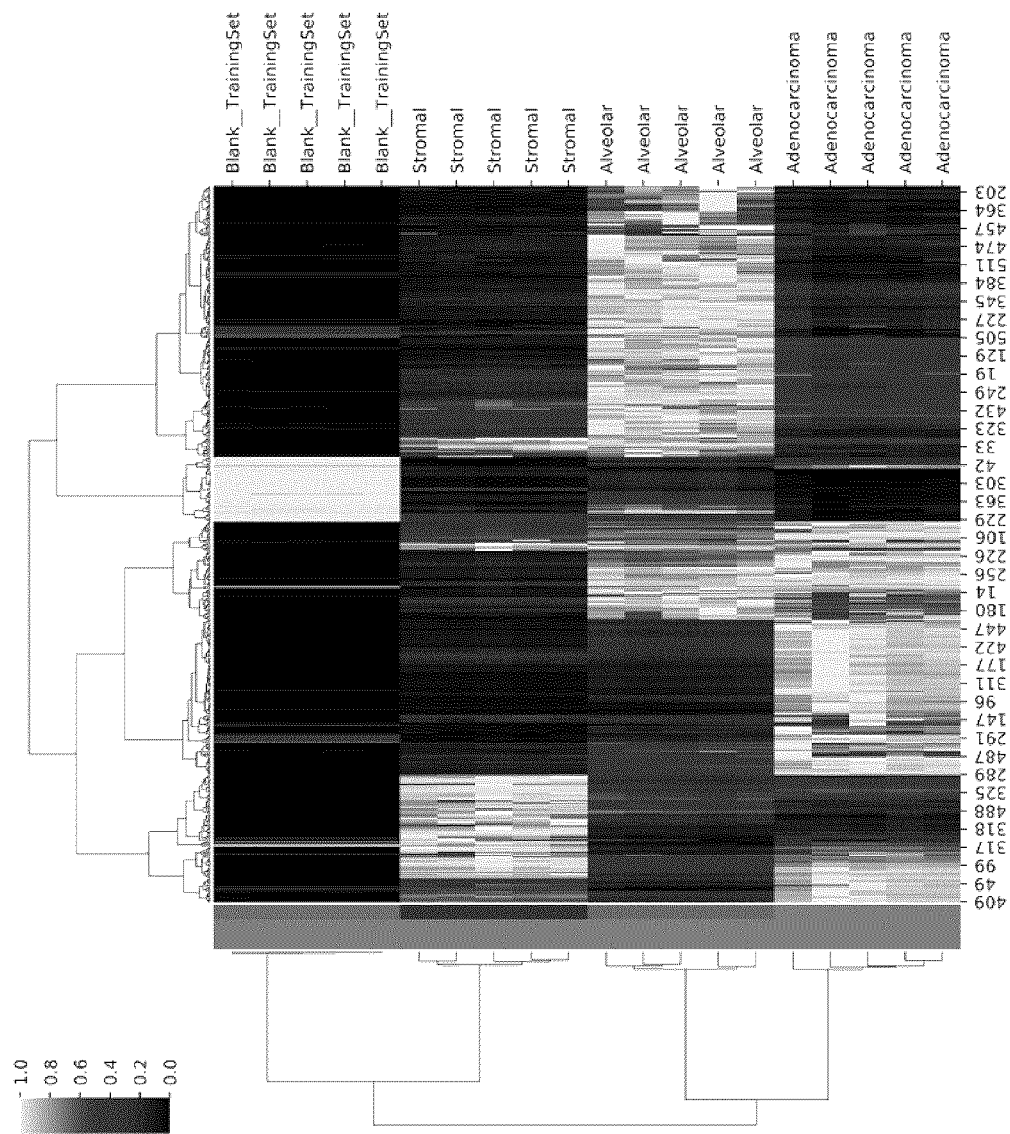

FIG. 46A depicts a classifier which was generated using 28 The Cancer Genome Atlas (TCGA) lung adenocarcinoma cases. Classes included 'adenocarcinoma' 5412, 'alveolar tissue' 5414, 'stromal tissue' 5418, and 'blank' 5416. Separation between individual tissue types is demonstrated on a clustered t-SNE plot, with performance characteristics listed just below plot (A) 5410. FIG. 46B depicts a dendrogram demonstrating hierarchical clustering of tissue images is depicted in (B) 5420. FIG. 46C depicts a heat map depicting clustering of 512 individual features (horizontal axis) for training classes (vertical axis) is shown in (C) 5430.

In FIG. 46A, a separation of different training images is shown. The bottom cluster represents blank tiles. The left cluster represent stromal tiles. The top cluster represents Alveolar tiles and the right cluster represents adenocarcinoma tiles. This highlights that the t-SNE visualization and classification tool is generalizable to other tumor types. Panels B and C show alternative clustering approaches (hierarchical clustering) that use the features shown within the t-SNE.

In FIG. 46B, separation of four clusters are shown in the following order from left to right: Blank, Stroma, Aveolar and Adenocarcinoma. In this example, the visualization technique allows a user to see that the system determined that stroma and blank are more similar to one another as compared to aveolar and adenocarcinoma. This provides a new tool to visualize learning within the neural network.

FIG. 46C shows a similar clustering approach shown in FIG. 46B. The cluster is rotated horizontally and includes a "heatmap" of the 512 features that the CNN uses in its final layers. Each feature is represented with a vertical line which allows a user to see how these features change through the different classes. The horizontal clustering also helps arrange the 512 features in groups that share similar patterns across classes. For example, features 303 and 362 have extremely high values in Blank tiles and are clustered together. There are 20 horizontal lines in this heatmap and correspond to five training images from: Blank, Stroma, Aveolar and Adenocarcinoma.

Digital pathology system 100 can improve diagnostic accuracy, diagnostic turnaround, resource management, and patient care, and create transformation change in existing processes.

For example, other approaches may be focused to using deep learning for very narrow classification tasks which are difficult to fully automated into a routine workflow. For example, they are focused on developing algorithms to a find specific type of cancer cell on a slide. This means, with just this set-up, the pathologist first needs to look at the case, make an interpretation and then decide if a case/slide is appropriate for additional AI-based analysis. An example digital pathology system 100 can be multi-class and modular to accept a wide variety of slides in neuropathology (e.g. and other organ sites in the future) and sub-classify it accordingly to the appropriate context.

In some embodiments, the digital pathology system 100 is multi-class in the sense that it does not just output "cancer" and "not cancer" or tumor A versus tumor B, and instead can use multiple classifiers (e.g., 10 classes, 13 classes, 15 classes, 18 classes, and so on). This makes it much more dynamic as it can recognize more features and diagnoses using the multiple classifications. In some embodiments, the digital pathology system 100 is modular in the sense that it does not use or expect to use a single classifier to diagnosis everything. There can be more than 100 tumor types, survival, molecular subgroup, and other features. For example, images can be taken from one high level CNN that classifies a tumor into cell type (e.g., metastasis, schwannoma and glioma). If it is a glioma then the digital pathology system 100 can send image tiles to the "IDH-module:" to determine IDH status.

Other approaches may use "binary" readouts ("normal" vs. "tumor", "positive" vs. "negative" or "benign" vs. "aggressive"). Such approaches may be prone to errors or difficult to tune when more than two classes are used. This is due to a need to determine a cut-off percentage below which the prediction may not be useful or accurate. This is challenging to do with other available tools for classifiers that use more than 2 classes.

Digital pathology system 100 provides an in-depth annotation of a slide including a variety of different normal and different tumor types (e.g., more than 20). This allows digital pathology system 100 to generate statistics for each slide such as the likelihood of a tumor on that slide being one type or another brain tumor type. This can make the process more versatile and give differential diagnosis based on the different tumor it learned and does not require the user to activate an algorithm specific to a specific tumor type (fully-automated). Furthermore, digital pathology system 100 can label all tissue types on a slide different colours and provides legends of all the different colours. This make the "annotated" slides very intuitive for the user to know where blood, necrosis, and normal tissues are without them needing to have pathology training. Similarly, digital pathology system 100 can use a 2-stage classification system where each class is analyzed using prediction scores and a t-SNE plot. The use of t-SNE plots for histology is quite unique in the sense that it does not force a classification and allows visualization of how the computer is "seeing" the tissue. This allows the computer to flag classes where the morphology does not match the previous cases as "uncertain". In that sense digital pathology system 100 can produce visual outputs (multi-colour heatmaps, t-SNE plots), multi-class statistics (gives you % of each class found on the slides), differential diagnosis (tells you the likelihood that a tumor belongs to all learned specific classes), and provides multiple readouts (heatmap and t-SNE) for all classes. Specifically, the t-SNE representation, can show blank space between learned groups and thus accommodates "uncertainty" when classes fall in between these tissue clusters.

Digital pathology system 100 can use an extensive collection of clinically annotated slides for training set development. CNN unit 123 can generate better trained CNNs for precise classification tasks (e.g., differentiating gliomas with and without IDH mutations).

The digital pathology system 100 also provides an improved determination when a diagnosis cannot be determined (i.e., there is a novel case or challenging case being analyzed). This is due to the fact that white spaces do not get classified (which could lead to errors). Thus, a "unknown" class is available with the digital pathology system 100, leading to fewer errors. While a similar approach can be generated using probability based scoring cutoffs, it is much more challenging and empirical with traditional methods.

Embodiments described herein provide a modular deep convolutional neural network (CNN) workflow that provides automated classification and multi-level visualization of whole pathology slide images (WSI). Importantly, this multi-class approach does not depend on pre-selected slide cohorts and effectively identifies difficult and poorly trained classes while minimizing misclassification. Moreover, the workflow can be leveraged to carry out large-scale morphogenomic correlations and discover novel morphologic predictors of IDH-mutated glioblastoma; a rare and actionable molecular subgroup considered largely "histologically indistinguishable" to the human observer. Generalization of this automated approach can revolutionize personalized medicine efforts by providing sub-specialist and molecular-level diagnostic information in a timely, accessible and cost-effective manner.

The personalization of medical care has substantially increased the diagnostic demands, workload, and subspecialty requirements in pathology. The growing need to sub-classify lesions into an expanding number of molecular subgroups and diminishing healthcare resources challenges the efficiencies of traditional diagnostic pathology, and risks physician burnout and diagnostic oversight. As a result, embodiments can leverage artificial intelligence (AI) to augment the ability of pathologists to efficiently and cost-effectively deliver on these mounting responsibilities.

Computer vision can be used in histopathologic image analysis. This can focus on a very narrow binary classification tasks and on pre-selected cases limiting scalability and generalization to routine pathology workflows. For example, in neuropathology, tissue specimens are often small and unoriented, and lesions need to be differentiated from varying amounts of intervening normal, hemorrhagic and necrotic brain tissue (FIG. 5). Lesions then require morphologic sub-classification to facilitate cost-effective triaging of ancillary molecular studies to their appropriate clinical context. This substantial inter- and intra-specimen heterogeneity can pose significant challenges to even sub-specialized pathologist and make automation difficult.

To address this, a specialized form of AI known as deep convolutional neural networks (CNNs) can be leveraged and shown to be capable of expert-level performance in a diverse array of pattern-recognition classification tasks. Importantly, CNNs are free of handcrafted features and are purely data-driven allowing subtle and complex features to be resolved with sufficiently large training images. To improve generalization, embodiments described herein use a brain-inspired hierarchical arrangement in which a series of CNN "modules" are connected and activated in a context specific manner to sequentially defining, classifying and further sub-classifying abnormalities on whole pathology slide images (WSI). This hierarchical arrangement allows "high-order" CNN modules, designed to excel at lesion detection, to autonomously generate training sets for "lower-order" sub-classification CNN-modules. To highlight this approach, over 580 glioblastoma (GBM) WSI from The Cancer Genome Atlas (TCGA) can be used to develop and validate a CNN-modules capable of predicting IDH-mutations in GBMs; an important molecular class considered morphologically indiscriminate to the human eye. Example embodiments can have the flexible performance of a CNN workflow on an unselected neuropathology case cohort from a local institution that includes a diverse array of case, tissue types and previously untrained cases. Integration of this generalizable AI approach aims to augment physician-led diagnostic decision making and accelerate the spread of sustainable precision-based tools for personalized medicine.

Development of a Multi-Class CNN-Driven Annotator for Histologic Features

Efforts applying machine learning to digital pathology have focused on extremely narrow classification tasks that limit automation. In addition to requiring initial human review and triaging of cases, regional intra- and inter-slide histologic heterogeneity, irrelevant to the narrow task, compromises machine-driven classification (FIG. 1). As an example experiment, to overcome this, a local cohort of 50,000 pathologist-annotated hematoxylin and eosin (H&E)-stained images was developed that span these diverse and common tissue types and used them to retrain the final layers of the image-based VGG19 neural network. This process, known as transfer learning, takes advantage of pre-learned features from 1.2 million images spanning 1000 categories from the ImageNet database. Additional images help finetune and customize classification categories to histopathologic features and allowed construction of a 13-class histologic image classifier. In addition to normal tissue types encountered in neurosurgical specimens, common tumor types can included that comprise the vast majority of those encountered in a clinical neuropathology practice. According to some example embodiments, training and classification can be carried out using image patches (tiles) comprised of 1024×1024 pixels (0.504 microns per pixel), a tile size over 10 times larger than most other approaches (e.g. 299×299). This larger size can excel at complex classification tasks by providing multiple levels of morphologic detail (single cell-level and overall tumor structure) without significantly affecting computation times. An example 13-class CNN model can reach a validation accuracy of over >96% after 300 EPOCH. Further pairwise validation of the classification performance of our network using test tiles shows strong discrimination potential. CNNs can generate extremely broad multi-class tissue classifier for histopathologic analysis.

Visualization of WSI Classification Tasks

Figure 6:
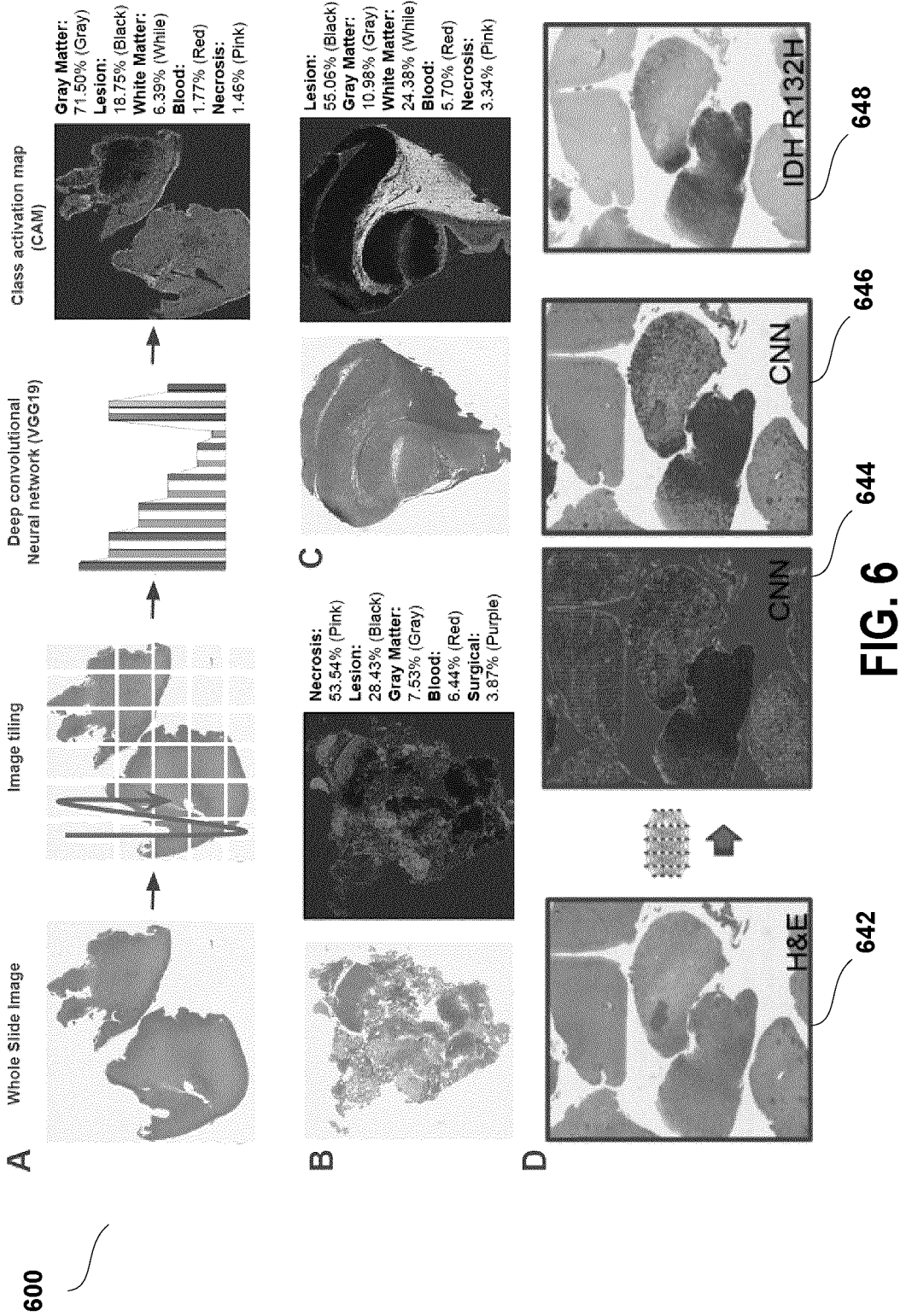
FIG. 6 is a view of example slide-level CNN tissue type classification.

To summarize machine-based classification decisions at the whole slide level for review, a series of global visualization tools can be integrated into the workflow. Histologic features found on each 1024×1024 pixel images can be used to generate a representative class activation map (CAM) that summarizes the simultaneous spatial distribution of the 13 trained classes. Embodiments can then reassemble these CAM tiles to generate a fully annotated multi-class WSI (FIG. 6). These maps provide a global overview of distribution of different tissue types (e.g., including lesions) identified and highly concordant with pathologist- and immunohistochemically defined "ground-truth" (see e.g., FIGS. 6 (D) and 7). Importantly, because feature activation occurs at the sub-tile level, these global maps help characterize biological features of disease at multiple levels of magnification (e.g., infiltrative versus circumscribed boards). Intriguingly, these multi-class CAM activation maps offer insight into deep learning histologic decision making, when the classifier is interrogated with previously unencountered cases. For example, the 13-class CNN can be presented with a rare epileptogenic lesion known as meningioangiomatosis characterized by a begin meningiovascular proliferation that extends into the cerebral cortex. Examination of its global CAM accurately depicts this extremely complex disease in a highly illustrative manner (e.g., FIGS. 6 (B) and (C)). In addition to routine mapping of WSI, such maps could thus help objectively characterize rare and previously unencountered lesions.

FIG. 6 shows slide-level CNN tissue type classification 600. Panel A illustrates an example of automated image tiling, generation of class activation maps (CAM), and reassembly of classified tiles to provide a global overview of tissue types and spatial coordinates on WSI. In some embodiments, the classes may be colour-coded for visual display. Panels B-C highlight some of the variety of cases seen in neuropathology. Panel B shows a biopsy of largely necrotic material with only small fragments of viable glioblastoma. Panel C highlights a complex case of meningioangiomatosis, a tumor type not trained in our CNN. Panel D shows original WSI of an infiltrating oligodendroglioma 642, class activation maps 644, 646 and the immunohistochemical "ground truth" (IDH-R132H) for comparison 648. The colour scheme of the CAM can be changed to fit the users preference. The CNN-generated images is highly concordant with the immunostained image.

Figure 7:
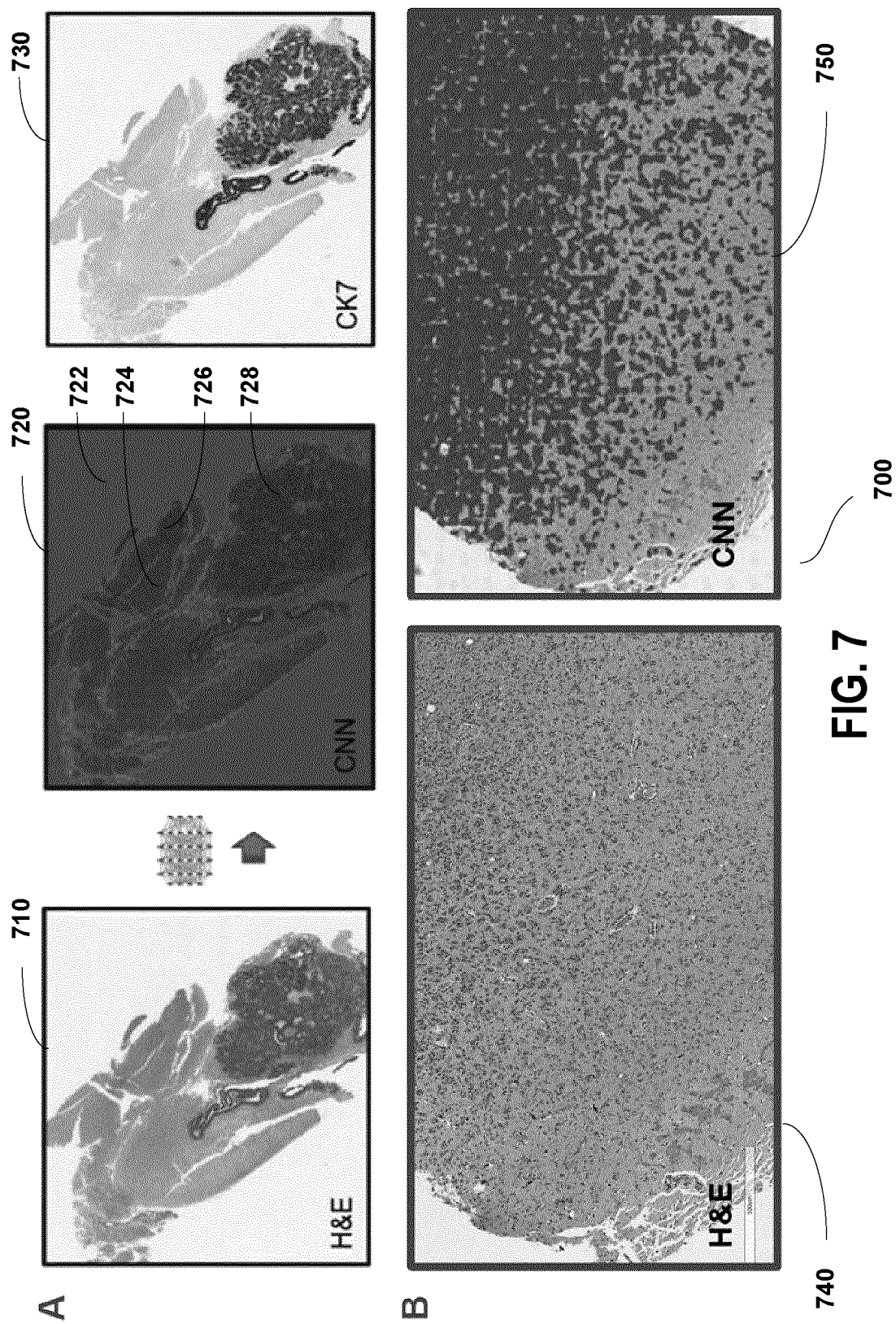
FIG. 7 is a view of example slide-level CNN tissue type classification.

FIG. 7 shows slide-level CNN tissue type classification Part II 700. Automated generation of class activation for WSI. Panel A shows a comparison of WSI of a lung metastasis to the brain generated by H&E staining 710, CNN-based classification of the H&E slide 720 and immunohistochemical staining 730. This particular class activation map (CAM) 720 highlights blank space 722, gray matter 724, white matter 726 and metastasis 728. This colour map shows a high concordance between the computer-generated map and the one based on immunostaining for cytokeratin 7 (CK7) 730 ("ground truth").

Panel B shows a high power view of a H&E-stained image of a diffusely infiltrating anaplastic oligodendroglioma, WHO grade III within brain tissue 740. CNN-based lesion segmentation (darker shaded region) and overlay on top of the original image 750 highlights the infiltrating nature of this neoplasm. Note the difference to the relatively well-circumscribed border seen in panel A.

Machine-based classification can use the probability scores generated for each class. Although convenient, averaging probability scores of images patches can lead to a loss of important tile-level information on how histologic classes are organized within a CNN architecture and can risk erroneous WSI-level classification.

Figure 8:
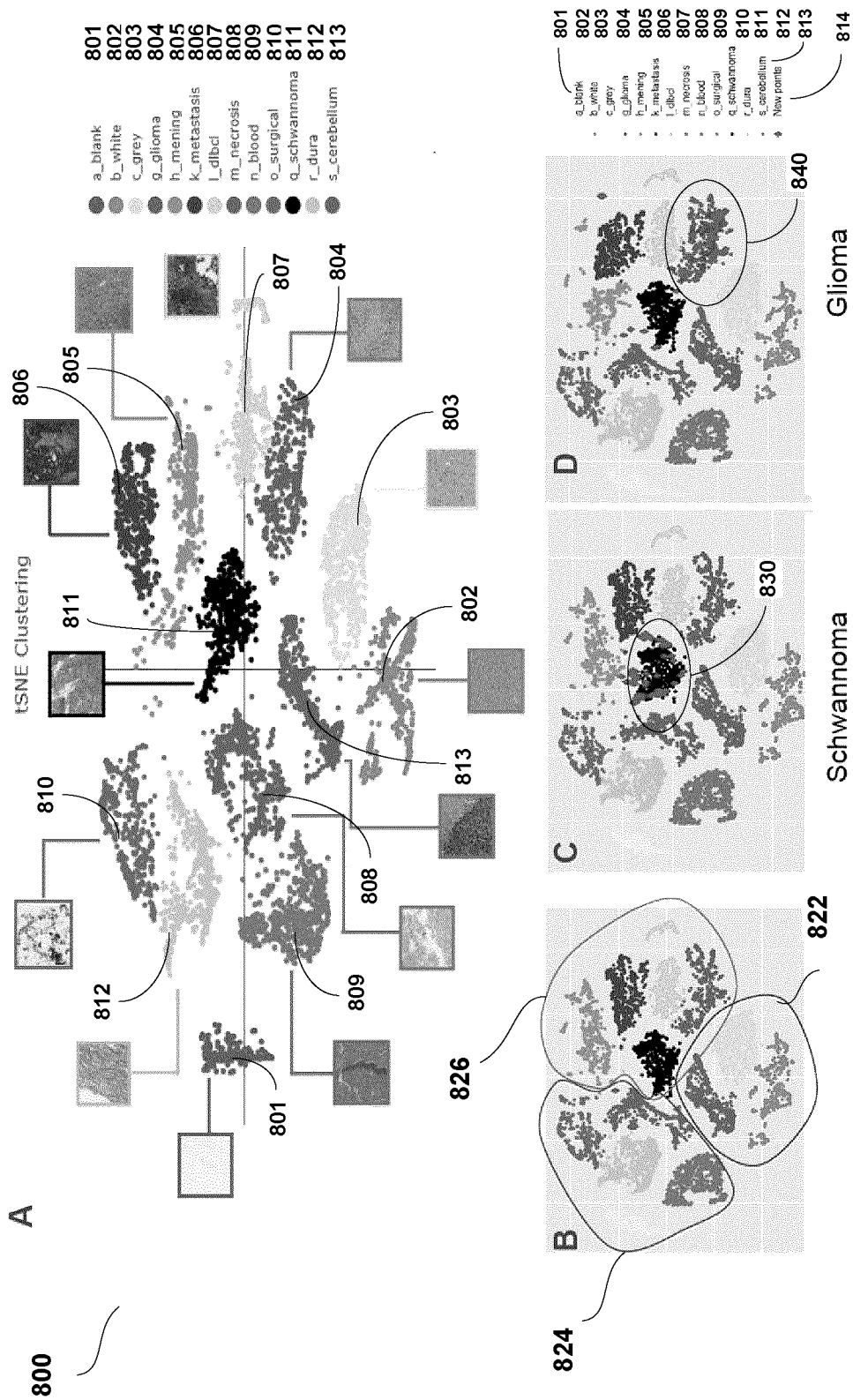
FIG. 8 is a view of example t-distributed stochastic neighbor embedding (t-SNE) visualization of a CNN final hidden layer.

FIG. 8 shows t-SNE visualization of the 13-class CNN's final hidden layer 800. A. Planar representations of the high-dimension data organized within the CNN trained on 13 classes (blank 801, white 802, grey 803, glioma 804, mening 805, metastasis 806, dlbcl 807, necrosis 808, blood 809, surgical 810, schwannoma 811, dura 812 and cerebellum 813). 200 representative pathologist-annotated tiles were plotted using the CNN weighting and the t-SNE method. These plots allow visualization of the internal organization of the training CNN. Each class is colour coded for convenience and randomly selected representative images from each cluster/class are shown. B. Intriguing, this data-driven map shows a non-random organization. In addition to anuclear (left circle, cluster 824), normal (bottom circle, cluster 822) and lesional (right circle, cluster 826) tissue clusters, there is a there is an additional trend towards non-neuroepithelial and cohesive epitheliod lesions as you move upwards within the red cluster. C. t-SNE-based classification using by overlaying lesional image tiles of test cases (dark diamonds 814). The diamonds 814 on the schwannoma (in oval 830 in C) and glioma (in oval 840 in D) test cases land correctly on the diagnostic region of the training images used to generate the t-SNE.

To better visualize global classification decisions, representative tiles from classes of interest (e.g., lesion) can be projected onto the planar representations of higher-dimensional coordinates of the different trained classes using t-distributed Stochastic Neighbour Embedding (t-SNE) (FIG. 8). These plots provide further insights into histology-based deep learning inferences and classification decisions and a strikingly biology-inspired and humanoid-like organization of tissue classes (FIG. 8 (A)-(B)). For example, there is a prominent "cluster of clusters" (cluster 822) to show the close proximity of normal tissue types to one another. This cluster appears to bisect the remaining tissue types with hypocellular tissue classes on the left (cluster 824) and hypercellular lesional classes forming a third distinct cluster on the right (cluster 826). Further examination of the clusters shows other dimension of pathologist-like organizational framework with dis-cohesive and intra-axial lesions such as lymphoma and most particularly gliomas showing a closer relationship to normal nervous tissue. Similarly, more cohesive intra-parenchymal (e.g., metastasis) and extra-parenchymal (e.g., meningioma) cluster together at a most distant site on the t-SNE plot. In addition to providing visual insights into machine-based classification decisions, these plots may be used to better assess computer-based diagnostic decision of both trained and previously un-encountered classes (FIGS. 8 (C)-(D), 9 and 10). By requiring a sample of at least fifteen, and a large bias towards one particular class, misclassification can be substantially reduced. For WSI that do not meet these parameters, a conservative approach can be taken where cases are labeled as "undefined" and signal review by a pathologist. These "flagged" cases also allow to identify classification weaknesses and future CNN class optimization. These optimized metrics thus provide new quantitative and generalizable tools for large-scale morphologic WSI analysis and quality control.

Development of a Modular CNN Workflow

Tumor classification schemes are continually undergoing revisions. Appending additional classes to a single omnipotent CNN can however have dramatic affect classification performance of an already well-optimized classes. A modular architecture can be used where smaller more manageable CNN components could be arranged to carry out sequentially more refined classification tasks (FIG. 41). This multi-level, brain-inspired approach, can reduce the need for continued revalidation of pre-learned classification task and allows new learning tasks to be integrated and activated in a context specific manner (FIG. 41).

CNN-Driven Morphogenomic Correlates of IDH-Mutations in Glioblastoma

As an example, a 13-class neural networks was trained exclusively using manually curated image tiles. Although effective, this process may be highly laborious and prone to human annotation error. It was thus next explored, if like human learning, previously learned tasks could be leveraged within a CNN workflow to coordinate learning of additional finer classification tasks. Specifically, embodiments use CNNs to automate retrieval of diagnostic areas from genomically-annotated WSI of glioblastomas (GBMs) found within the TCGA database. GBMs represent the most common primary brain tumor type, represent over 80% of malignant primary brain tumors and, as a group, carry a dismal prognosis. A small subset of histologically indistinguishable GBMs however, found to carry IDH-mutations, show a superior prognosis compared to GBMs without IDH mutations (IDH wildtype). This important molecular subdivision has led to a recent change in glioma classification where GBMs are subdivided into 2 distinct clinicopathological classes (GBM, IDH-mutated and GBM, IDH-wildtype). This new classification has created challenges for neuropathologists at remote cancer centers, as costly and inaccessibly sequencing technologies are often needed to definitively assess IDH status. If resolvable morphogenomic correlates exist, it would allow for more widespread sub-classification of GBMs. 580 H&E stained digital WSI were obtained from the TCGA database and the existing CNN was used to automate generation and selection of 179,470 lesional image patches (1024×1024 pixel) and they were used to train, validate and test a CNN classifier to distinguish the two genomically distinct GBM subtypes. Validation accuracy reached a maximum of 86%. Testing using the best performing CNN yielded a classification accuracy of 73.4% with an AUC of 0.80 for 5641 test image tiles.

To further validate the performance of the IDH-classifier on another independent cohort, a local collection of 14 IDH-wildtype GBMs and 11 IDH-mutated astrocytomas (1 Diffuse Astrocytoma, WHO grade II, 4 Anaplastic Astrocytoma, WHO III, and 6 Glioblastomas, WHO IV) were used. This validation yielded a tile-level accuracy of 84.8% and AUC of 0.93 using 13304 tiles. At the case level, an accuracy of 92% and an AUC of 0.98 was achieved. Visualization of the image features using t-SNE reveals that, in fact, CNN-driven morphologic analysis can objectively distinguish between these two genetic types of astrocytomas (FIG. 27). This achievement highlights the utility of CNNs at carrying out automated large-scale morphogenetic correlations and morphologically distinguish between molecular-defined GBM subtypes.

Automated Classification of an Unselected Cohort of WSI

Previous machine learning approaches in histology heavily rely on pre-selected cases which limits generalizability. Embodiments can show the performance of the workflow on a prospective set of 48 unselected routine H&E neuropathology cases, as an example test. To maximize sampling of the inter- and intra-case diversity, when available, up to 5 slides of any single case were included. Diagnoses and slide descriptions rendered by a CNN are compared to a consensus diagnosis provided by 3 board-certified pathologist with extensive neuropathology training. Where possible, immunostaining was also used as an additional measure of the "ground truth". For each slide, a classifier generates three possible outputs: (i) a list of the amounts and types of normal tissue types present, (ii) lesion type (e.g. if present) or (iii) signals uncertainty ("undefined"). The classifier concurred with the pathologist final diagnosis in 70% of cases. There was an error rate of 6% and a "undefined" class prediction of 24%. Importantly, many of the slides classified as "undefined" represented tumor types that have not yet been included in the CNN (e.g., Hemangioblastoma).

Embodiments described herein can provide an integrated and generalizable tool for automated multi-class annotation of unselected WSI. Embodiments described herein do not require initial pathologist triaging or pre-selection of cases and carries out classification on a diverse set of normal and lesional tissue types. Embodiments described herein can integrate several visualization tools throughout training and classification to illustrate how histology-based learning is stored and retrieved within CNNs. Embodiments described herein can also incorporate measures of uncertainty to reduce misclassification of challenging and untrained classes.

Embodiments described herein can provide a model in which autonomous learning can occur in which higher-level CNNs form the basis to select training images for more refined morphologic classification tasks. This approach proved effective at uncovering morphologic features that distinguish GBMs with and without IDH-mutations; a morphologic exercise largely considered futile to the human eye. Similar large-scale initiatives may offer mechanism to discover additional cost-effective and timely morphologic surrogates for costly and laborious molecular studies. The modular nature of the classification architecture simplified integration of these novel classifiers.

Embodiments described herein can be expanded to include hundreds of tumors classes and thus offers a highly generalizable approach to computer augmented pathological workflows. Migration of these robust classifiers to a cloud based environment could help provide subspecialist level neuropathology support to remote clinical and research cancer centers could help reduce workload of pathologist and accelerate the spread of precision and personalized medicine.

Example embodiments were tested using an example experiment.

Development of an image training set. Slides from a neuropathology service were digitized on the Aperio AT2 whole slide scanner at an apparent magnification of 20× and a compression quality of 0.70. A collection of 100 slides were reviewed to generate a growing list of common tissue types and lesions encountered in practice (FIG. 5). For each tissue class, based on availability, a collection of 200-5,000 1024×1024 pixel image patches were manually generated. For some classes, such as surgical material, the small number of examples encountered did not allow us to reach this tile number. For other more abundant classes, tile numbers were limited to 5,000 to avoid skewed representation of specific groups that would lead to overfitting during training. As an example, the focus was on lesional categories on the most common and important nervous system neoplasm, including gliomas, metastatic carcinomas, meningiomas, lymphoma, and schwannomas. A tile size of 1024× 1024 pixels was chosen, to balance computational efficiency while maximizing preveration of microscopic spatial architecture. All tile annotations were carried out by board-certified pathologists.

FIG. 5 shows Inter- and Intra-slide tissue class variability in surgical neuropathology challenging automation 500. The left most panel 510 shows whole slide H&E-stained image of a glioblastoma containing a heterogenous mixture of tumor, necrosis, normal brain tissue, blood and surgical material. The tumor comprises <30% of the slide's surface. Remaining smaller panels show common tissue classes often encountered in routine pathology specimens. In this example, the common tissue classes include normal tissue 520 (e.g., white matter, gray matter, cerebellar cortex, and dura), nonlesional tissue 530 (e.g., necrosis, surgical material and blood) and lesional tissue 540 (CNS lesion types). This diversity, if not accounted for, can result in erroneously classification errors (e.g., mistaking dura for schwannoma). Inclusion of these classes allows for more accurate annotation of slides and improved lesion segmentation for future classification tasks.

Convolutional neural network (CNN). The pre-trained VGG19 convolutional neural network was used for lesion segmentation and classification. VGG19 is a 19-layer neural network comprised of a number of repetitive 3×3 convolutional layers previously trained on over 1.2 million images in the ImageNet database. This network architecture, similar to other convolutional neural networks, outperforms other machine learning algorithms at computer vision tasks such as classifying images containing 1,000 common object classes. Importantly, VGG19 has a strong generalizability with ability to transfer learned image features to other image classification tasks through fine-tuning with additional task-specific images. To carry out this process, VGG19 was loaded into Keras with a Tensorflow backend and retrained final three layers of the network using a collection of annotated pathology images, 1024×1024 pixels in size. VGG19 was thus retrained using 8 "non-lesional" object classes commonly found on neuropathology tissue slides: hemorrhage, surgical material, dura, necrosis, blank slide space and normal cortical gray, white and cerebellar brain tissue. In addition to this, images tiles of the most common nervous system tumor types (gliomas, meningiomas, schwanommas, metastasis and lymphomas) were included either separately (13 class model) or as a single common lesion class (for 9 class model). Both these 9- and 13-class models were extremely robust at differentiating lesional image tiles from those containing "non-lesional" tissue types. The respective training set was used to retrain and optimize final three layers of VGG19 neural network and create tumor classifiers. In all cases, the best preforming model was achieved after 300 EPOCHS and was applied to independent test image tiles to evaluate performance. These CNN with training images, partitioned into training and testing set in a 4.7:1 ratio, undergoes optimization through back-propagation over a series of 300 potential epochs. The best performing model was selected for further testing and validation. All steps including tile selection, annotation, training and validation were automated using the Python programming environment using the NVIDIA geforce 1080 titan Xp graphic processing unit (GPU).

Selection and training using molecularly-annotated glioblastoma image cohorts. 862 whole slide H&E stained images spanning over 500 GBM whole slide images were obtained from the TCGA database. For consistency, only images scanned at 20× magnification with a compression quality of 0.70 were included in the analysis. Each image was partitioned into non-overlapping image tiles (dimensions: 1024×1024 pixels) and lesional tiles were automatically selected using the previously optimized CNN and a cutoff confidence score of >85% to avoid other tissue constituents such as blood, normal brain and necrosis. Corresponding molecular information within the TCGA dataset was then used to assign appropriate IDH-mutation status to each image. All cases missing IDH information were excluded from the analysis. For simplicity, training to discover morphologic features specific for IDH mutations was carried out at the tile-level. A formal performance analysis was performed on an independent cohort of WSI, both from remaining unused TCGA images and a smaller locally assembled image cohort (n=25). IDH-mutation status of local cases was confirmed by immunohistochemistry and, where appropriate, additional genomic sequencing.

To test the performance of a lesion classifier, a number of approaches were used. Class annotations by CNN were compared to ones by a board-certified pathologists. In addition to this, when possible, the microscopic distribution of IDH-mutated gliomas, B-cell lymphomas and metastatic carcinomas predicted by CNNs were compared to corresponding immunohistochemical stains. 200 randomly selected negative and positive areas were selected for ROC testing based on "gold standards" of either pathological or immunohistochemical based annotations of lesions. The area under the receiver operator curve (AUC) was calculated for the different tumor types. Validation accuracy for this exercise reached 96% percent after 300 epoches. These results show area under the curve of at least 0.96 for all tested classes.

t-SNE Visualization. In order to visualize image features distinguishing tumor classes on a 2d plane, t-distributed Stochastic Neighbour Embedding (t-SNE) was used. This was done for all classes (13-class model), lesion classes (5-class mode) or IDH-mutation classes (IDH-class model). For an example 5-class, 13-class and IDH-mutation t-SNEs, embodiments plotted a random selection of approximately 500, 1000 and 10000 image tiles for each class, respectively. However, within some of these selected tiles were tiles incorrectly labelled or contained features of multiple classes, resulting in points being placed in incorrect or sub-optimal locations. To remove these anomalous points, for each point in the t-SNE, the nearest 300 points are reviewed to determine if the point is in the correct class cluster. Unlike 5-class and 13-class t-SNE's, spacing between IDH-mutant and -WT clusters was non-existent. As a result, removal of anomalous points was not performed as it would lead to a loss of information.

t-SNE Tile and Slide Classification. The spatial distribution of new tiles was used to carry out classification at the tile and WSI level. Specifically, the generated t-SNE was leveraged to visualize where new image tiles lies. This allowed the ability to determine what cluster (class) a tile belongs to or whether it is anomalous. Using the tile images that were fed into the earlier t-SNE, the new tiles are added and the t-SNE is regenerated. Although the resulting t-SNE is slightly altered with the addition of new data, the spatial structure and clustering of classes remains consistent. To classify one of these new tile points, it was first determined if it is an automatic anomaly if it satisfies that there are no surrounding points in a radius of 0.5 units. Its closest 25 neighbouring points were inspected to determine if at least 85% of them fall into a single class. If condition is met, this majority class ends up being the final classification otherwise it is labelled as an anomaly. This ensures that there is a high chance that the tile truly belongs to said cluster.

For t-SNE classification on the slide-level, up to 100 random lesional tiles are extracted. As a slide may be non-lesional, if less than 15 tiles are obtained, the slide was flagged and the tiles were saved for manual inspection by a neuropathologist. Otherwise, using the above approach, the classes of each image tile was determined and if a specific threshold distribution was achieved, that final classification was assigned to the slide. In the event where such condition is not met, the most dominant class was provided as a likely alternative if it contains at least twice as many associated tile points compared to the next dominant class. If no suitable alternative is appropriate, the slide was classified as "undefined". These cutoff score were objectively set using a chi-square statistical test.

As an illustrative example, brain tumors represent a diverse group of diseases with highly variable therapies and outcomes. A key way to predict how a tumor will behave is by analyzing its specific morphologic features under the microscope. The human eye, however, cannot reliably detect subtle differences and this qualitative approach can lead to subjective disagreements among pathologists. This may also explain why patients with the same diagnoses can experience dramatically different outcomes. Although new "molecular" technologies can better differentiate between tumor types, molecular testing is costly and oftentimes unavailable leaving doctors still reliant on microscopic findings to make important clinical decisions.

Artificial Intelligence (AI) can allow computers to excel at analyzing images to identify extremely subtle morphologic differences. A platform is proposed that takes advantage of AI, and trains computers to objectively and quantitatively differentiate between the microscopic features of different brain tumors.

Training involves exposing computers to a large series of images with known clinical outcomes (diagnoses, survival, therapy response) to allow AI to "learn" microscopic patterns associated with these specific clinical events. Because computers can process larger amounts of information than humans, they will be better able to predict tumor behavior from their microscopic appearance. This AI-assisted approach can allow improved differentiation of brain tumor types and offer more accurate predictors of outcome and treatment response to patients. Such automated approaches are poised to revolutionize personalized medicine efforts by providing accurate, cost-effective and timely diagnoses that can guide further molecular testing and care. Importantly, these computer algorithms can be shared across the internet, allowing patients even at remote cancer centers to also benefit from the precision of computer-aided diagnostics.

There is growing interest in utilizing artificial intelligence (AI) to improve efficiency and objectivity in pathology. Studies thus far have however largely focused on relatively narrow classification tasks and pre-defined tissue specimens limiting generalization. To address this, a form of AI was leveraged, known as deep convolutional neural network (CNN), to develop a workflow capable of handling the immense intra- and inter-slide heterogeneity encountered in surgical neuropathology practice. The proposed platform expands, improves and validates the performance of the annotation tool for routine histomorphologic analysis of digital whole slide images (WSI).

The digital pathology platform 110 can leverage access to vast amounts of well-annotated tissue specimens and digital pathology expertise to develop an automated CNN-driven solution for surgical neuropathology. The digital pathology system 100 can include a CNN-based hematoxylin and eosin (H&E)-slide classifier for neuropathology, a CNN-based immunohistochemical stain classifier for neuropathology, integrated AI-generated reports through combinatorial analysis of H&E and immunohistochemistry classifications, and allow for the performance of this CNN-driven workflow to be evaluated in a routine clinical setting.

An archival collection of clinically and genomically annotated brain tumor cases can be converted into digital WSIs and used them to train a morphology-drive image classifier. The optimized CNN-workflow can provide a dynamic solution capable of recognizing a wide variety of lesion and normal tissue types at a speed of 5-20 minutes/slide. It can make robust predictions of molecular-level features (e.g., IDH-mutations, 1p19q co-deletions in gliomas) and tumor subtypes considered indistinguishable to humans. This strategy can be expanded to further train the CNN workflow on additional tumor types and immunohistochemical staining patterns.

The CNN-workflow can be trained on many images, for example, >1 million images, spanning the most common brain tumor classes. In addition to these classes, quality control measures can be incorporated to avoid classification errors of previously unencountered cases. This approach already yields robust results with >70% correct diagnoses, <6% errors, and prioritizes currently "undefined" cases (24%) for human review. The training set can be scaled to many more images, for example, >10,000,000 images, spanning >100 brain tumor classes to further improve performance.

Embodiments described herein exemplify a computerized platform capable of providing early and objective preliminary diagnoses and triaging tumor cases for subsequent molecular analysis. Acutely, this compact tool could begin to provide prompt, intra-operative information to help tailor surgical resections and personalized therapies. In the sub-acute setting, this efficient CNN-workflow will help relieve clinician workloads, reduce diagnostic work-up times, costs and subjective qualitative interpretative errors. Migration of the generalizable and automated tool to a web-based platform aims to revolutionize personalized medicine efforts by globally providing sub-specialist expertise and molecular-level morphologic correlates in a timely, accessible and cost-effective manner.

The personalization of medical care has substantially increased the diagnostic demands, workload, and subspecialty requirements in pathology. The growing need to sub-classify lesions into an expanding number of molecular subgroups and diminishing healthcare resources challenges the efficiencies of traditional diagnostic pathology, and risks physician burnout and diagnostic oversight. As a result, there is a growing interest in leveraging artificial intelligence (AI) to augment the ability of pathologists to efficiently and cost-effectively deliver on these mounting responsibilities.

Computer vision can be used in histopathologic image analysis. This can focus on a narrow binary classification tasks late in the diagnostic work-up. Such focused applications require pathologists to pre-select cases and specific slides for analysis and thus limiting efficiency, scalability and generalization of AI-assisted diagnostics into routine pathology workflows. Earlier introduction of AI-tools could however allow prompt an autonomous initiation of appropriate ancillary studies and enable pathologists to focus on reviewing and approving finalized and integrated interpretations. This exciting prospect is however challenged by tissue specimens, such as those from neurosurgical resections, that are often small, unoriented, and intermixed with varying amounts of intervening normal, hemorrhagic and necrotic brain tissue (FIG. 5). Once lesions are identified, further challenges arise, such as the need for prompt morphologic sub-classification to facilitate cost-effective triaging of ancillary molecular studies to their appropriate clinical context. This substantial inter- and intra-specimen heterogeneity can pose significant challenges to even sub-specialized pathologists and make automation early in the diagnostic process, especially using fairly narrow AI-approaches, difficult.

A form of AI known as deep convolutional neural networks (CNNs) can proving capable of expert-level performance in a diverse array of pattern-recognition tasks. Importantly, CNNs are free of handcrafted features and are purely data-driven allowing an array of subtle and complex features to be resolved when sufficiently large training image sets are assembled. Moreover, when given enough clinically and genomically well-annotated training images, CNNs can learn to resolve subtle features, not reliably discernible to the human eye. For example, AI-based tools can identify previously unappreciated morphologic features of non-small cell lung cancers that predicted survival. More recently, CNN-based scanning for metastatic tumor foci in lymph nodes achieved substantially lower false-negative rates than pathologists (26.8% vs 7.6%). With sufficient training, CNN may similarly offer complementary, prompt and cost-effective surrogates of molecular biomarkers in neuropathology (e.g., IDH1/2, 1p19q and MGMT status). Similarly, they may provide novel predictors of response and help stratify patients to personalized regimens (e.g., immunotherapy). Lastly, CNNs may offer cost-effective quality assurance, consensus or a timely second opinion to facility safe medical practice at smaller community centers.

Digital and computation pathology can be improved by leveraging clinical resources and computational workflow to develop CNN-driven diagnostic tools for neuropathology. If successful, this workflow could also expand to include other organ sites. Integration of this generalizable AI approach aims to augment physician-led diagnostic decision making and accelerate the spread of sustainable precision-based tools for personalized medicine.

There is a clinical need to improve the efficiency, objectivity and cost-effectiveness of the histomorphologic exam. Early integration and utilization of CNN-driven classifiers will contribute to this need by providing prompt complementary analysis and automated triaging of molecular testing in neuropathology. Digital pathology system 100 can provide improvements, including a CNN-based hematoxylin and eosin (H&E)-slide classifier for neuropathology, a CNN-based immunohistochemical stain classifier for neuropathology, integrated AI-generated reports through combinatorial analysis of H&E and immunohistochemistry classifications, and allow for the evaluation of the performance of this CNN-driven workflow in a routine clinical setting.

A CNN-Based Hematoxylin and Eosin (H&E)-Slide Classifier for Neuropathology

Histologic analysis lags behind more contemporary molecular tools in precision-based diagnostics. Molecular tools are, however, not always readily available and thus clinicians still often rely on histomorphology for clinical decision making. Advances in a form of AI, known as CNNs, allow computers to excel at complex image-based tasks. Early application of CNNs to the H&E exam could serve as an cost-effective classification tool to facilitate prompt diagnostic interpretations and objective triaging of follow-up immunohistochemical and molecular studies. This could revolutionize morphology-based classification by rendering refined, rapid, objective and cost-effective interpretations.

A CNN-Based Immunohistochemical Stain Classifier for Neuropathology

Many lesions cannot be resolved solely using H&E-stained tissue and require ancillary immunohistochemical workup to reach a diagnosis. Downstream CNN classifiers can be capable of interpreting common immunostains in neuropathology (i.e., IDH-R132H, p53 and Ki67).

An Integrated AI-Generated Reports Through Combinatorial Analysis of H&E and Immunohistochemistry Classifications The efficiency of diagnostic workflows can be improved. Diagnostic information extracted from H&E and immunostained sections can be integrated to generate an AI-driven interpretive summary. These reports will allow efficient review, approval, and if necessary, revision by the pathologist. This pathologist-lead AI-augmented workflow also adds layers of quality assurance and is poised to not only improve efficiency, but also reduce medical errors. These intuitive microscopic reports, capable of being generated on each and every slide, also provide key information for researchers using clinical samples for translational research.

Evaluate Performance of this CNN-Driven Workflow in a Routine Clinical Setting

Machine learning can be prone to systemic error ("overfitting"). This occurs when learning is confined to a limited number of cases that are not representative of "real-world" examples. The performance and utility of digital pathology system 100 or workflow can be validated as to its performance and utility using additional neuro-oncology cases, whole slide image (WSI) sets from The Cancer Genome Atlas (TCGA), and independent cancer centers.

Quantitative approaches can be developed to improve the yields of morphologic analysis. This could eventually allow for histologic correlates of specific molecular changes, patient outcomes and treatment response. Toward this, automated AI-based diagnostic workflows compatible with H&E slides can be developed as described in example embodiments. A local cohort of 100,000 pathologist-annotated image patches (1024×1024 pixels) that span a diverse array of 8 common tissue types encountered in neurosurgical tissue specimens can be developed (FIG. 5). In addition to these non-neoplastic tissue types, 5 common CNS tumors types can be included (gliomas, schwannomas, meningiomas, lymphomas, metastases) that comprise >80% of those encountered in a clinical neuropathology practice. These 13 classes can be used to retrain the final layers of the image-based VGG19 deep convolutional neural network and create a brain tumor classifier. This 13-class CNN model reaches a validation accuracy of over >96% on non-overlapping test image tiles demonstrating the potential of CNNs to carry out extremely broad multi-class histopathologic classification tasks (FIGS. 6 to 9). Automated tiling and annotation approaches can be used to rapidly expand the train image set to >1,000,000 images. Additional classes and common immunohistochemical stains can be included.

In an example embodiment, to summarize machine-based classification decisions to the whole slide image level (WSI), a series of global visualization tools can be integrated into digital pathology system 100 and workflow. Test WSI are first automatically divided into a set of 1024×1024 pixel images. Histologic features detected by the computer on each 1024×1024 pixel image are converted and displayed onto a digital class activation map (CAM) summarizing the simultaneous spatial distribution of the 13 trained classes. These tiles are then reassembled to generate a fully annotated multi-class WSI (FIG. 6). These maps provide a global overview of distribution of different tissue types (e.g., including lesions) identified and highly concordant with pathologist- and immunohistochemically defined "ground-truth" (FIG. 6 (D), FIG. 7). Importantly, because feature activation occurs at the "sub-tile" level, disease features at multiple levels of magnification are produced (e.g., infiltrative vs. circumscribed boards).

Figure 9:
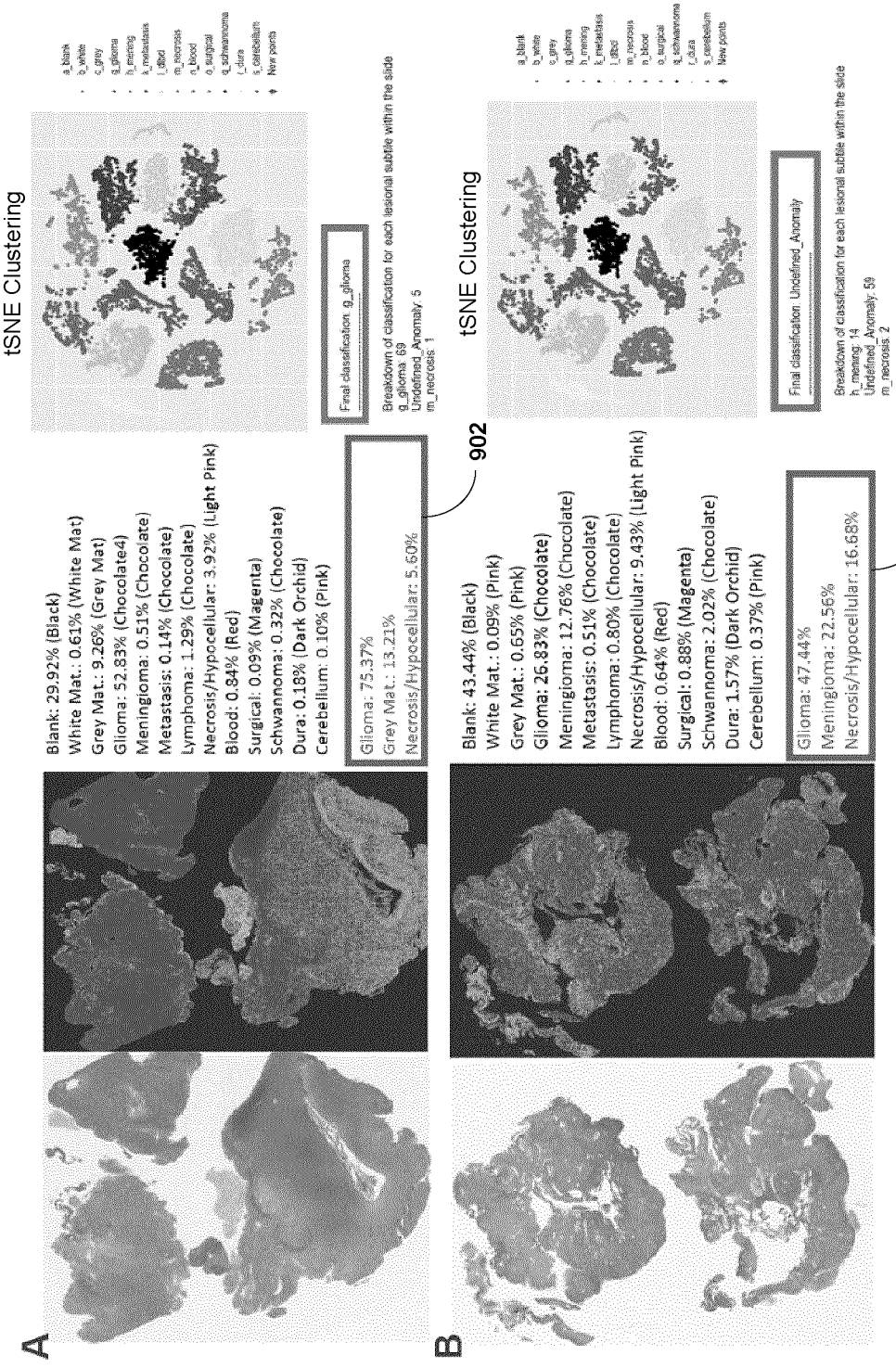
FIG. 9 is a view of example integrated summary reports generated using deep neural networks.

FIG. 9 shows examples of integrated summary reports for WSI generated using deep neural networks 900. Panels A-B show integrated reports for a glioblastoma (A) and hemangioblastoma (B). For each WSI (left most panel), a class activation map is generated showing the location and relative prediction scores for all trained classes. The highest scored classes (minus blank space) are ranked in box 902. Lesional areas are also classified based on their distribution on a t-SNE plot (as shown in FIG. 8 (A)). Unlike the predictions scores that force classification based on the trained classes, the t-SNE classification allows unknown cases (e.g., B—Hemnagioblasotma) to be classified as "undefined" and alert the physician or researcher to more careful examine the case.

Machine-based classification can use the average probability scores generated from each class to assign a class (e.g., diagnosis). Although convenient, this approach risks erroneous classification when untrained classes (e.g., tumor types) are encountered (FIG. 9 (B)). To overcome this, a secondary classification system can be used that analyzes the planar distribution of test image tiles on the t-distributed Stochastic Neighbour Embedding (t-SNE) plot of the trained CNN classifier (FIG. 8). By using the "undefined" space in between tissue classes, an "undefined" label can be conveniently assigned to tumor and lesion types that are atypical or not yet including in CNN training. This 2-tiered approach to lesion classification substantially reduces erroneous misclassifications. These different visualization tools and statistics can be integrated to generate the framework of an integrated report for pathologist review (FIG. 9).

The preliminary performance of an example embodiment of digital pathology system 100 can be evaluated on a prospective set of 50 randomly selected H&E slides from neuropathology service. Comparing integrative classifications outputs to consensus diagnoses reached by 3 board-certified neuropathologists at an example institution found concordance in 70% of slides analyzed. In an example, there may be an error rate of 6%, with the remaining cases (24%) flagged as "undefined" class prediction. Some of the slides classified as "undefined" represented tumor types that were not yet included in an example CNN (e.g. hemangioblastoma, FIG. 9(B)). Together these milestones represent baseline metrics to monitor further refinements and improvements during the course of the project.

Digital Slide Scanning and Image Set Development.

H&E and immunohistochemistry stained slides can be digitized on the Aperio AT2 400-slide whole slide scanner at an apparent magnification of 20× and a compression quality of 0.70. All slides were anonymized and only identifiable by a study identifier that is linked to diagnoses, demographic, clinical and molecular information stored in a password-protected file. Immunohistochemical slide analysis can focus on the most common stains (e.g., IDH-R132H, p53, Ki-67, ATRX, CD20, cytokeratins (CK7, CK20), carcinoma transcription factors (TTF-1, CDX-2), Stat6, PR, and melanoma panel). The majority of slides for training set development will be obtained for local archival collections. To obtain 10,000,000 images, 10,000-15,00 slides can be scanned that span 5000 cases and >100 brain tumor classes. For more subtle "morphogenomic" correlates (e.g., morophologic predictors of IDH-mutations and 1p19q codeletions), additional cases can be retrieved from The Cancer Genome Atlas (FIG. 10).

Figure 10:
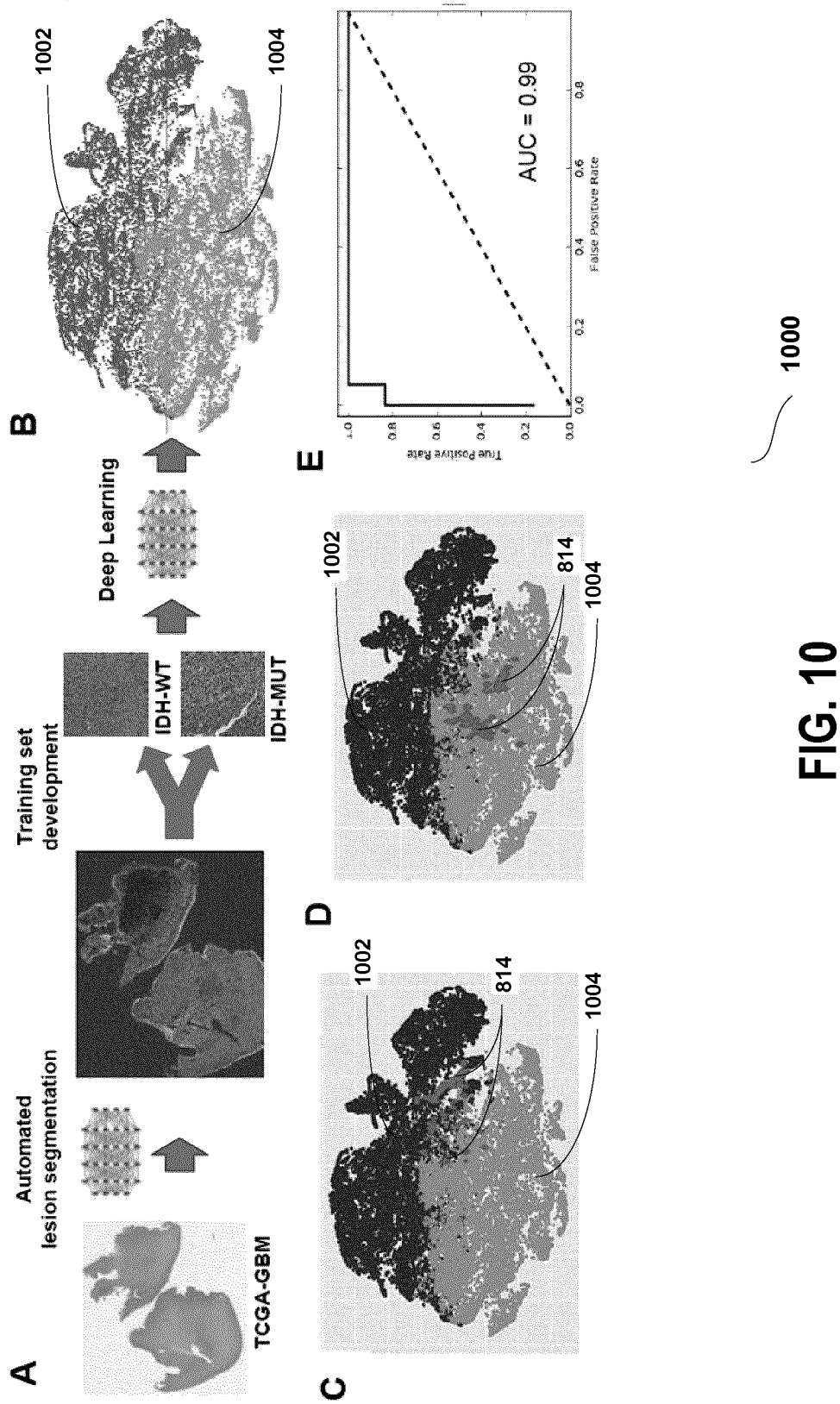
FIG. 10 is a view of example molecular-level histopathologic classification using deep neural networks.

FIG. 10 shows Molecular-level histopathologic classification of GBMs using deep neural networks 1000. In panel A, the trained CNN may be used to automate lesion detection and tile extraction from 580 WSI found within the TCGA-GBM database 1002. Tiles are then annotated with their appropriate IDH-status (or other feature of interest) and used to train a new neural network to histologically distinguish between the two molecular entities. In panel B, the t-SNE plot shows the planar representation of the final CNN layer that was trained on cohorts of IDH-mutated (upper area of plot 1002) and IDH-wildtype GBMs (lower area of t-SNE plot 1004). Indeed deep learning approaches can uncover reliable morphologic features that distinguish between these two molecular GBM subtypes. Panels C-D show IDH predictions for new (test) cases carried out by overlaying 100 representative test tiles (dark diamonds 814) and assessing the distribution within the trained t-SNE space (upper area of t-SNE plot=IDH-mutant 1002, lower area of t-SNE plot=IDH-wildtype 1004). Examples of a IDH mutant (C) and IDH wildtype (D) test GBM are shown. Note the consistency at the tile level within the same case. Panel E show ROC curves displaying the sensitivity and specificity of this approach on 31 local and independent GBM cases. Convolutional Neural Network (CNN).

In an example embodiment, the pre-trained VGG19 convolutional neural network can be used for lesion segmentation and classification (FIGS. 6 to 10). VGG19 is a neural network comprised of a number of repetitive 3×3 convolutional layers previously trained on over 1.2 million images in the ImageNet database. This network architecture, similar to other convolutional neural networks, outperforms other machine learning algorithms at computer vision tasks such as classifying images containing 1,000 common object classes. Keras with a Tensorflow backend can be used to initially retrained the final three layers of the WG19 network using a collection of manually pathologist-annotated collection of 100,000 neuropathology images. This process, known as transfer learning, takes advantage of pre-learned features and finetunes node weightings within the network to optimize classification of histopatholoic features. Training and classification can be performed using image patches (tiles) comprised of 1024×1024 pixels (0.504 microns per pixel), a tile size that is large (e.g., larger than 299×299). In some embodiments, this larger size excels at complex classification tasks by providing multiple levels of morphologic detail (single cell-level and overall tumor structure) without significantly affecting computation times (FIG. 7 (B)). There are other pre-trained CNN architectures that can implement the classification, such as Inception V3, ImageNet (with optimize weightings with new images), AlexNet, and so on.

This re-trained VGG19 reaches a validation accuracy of >0.96% when trained to differentiate between 13 different tissue classes commonly found on neuropathology tissue slides including hemorrhage, surgical material, dura, necrosis, blank slide space and normal cortical gray, white and cerebellar brain tissue (FIG. 5, 6). In addition to this, images tiles of the most common nervous system tumor types (glioma, meningioma, schwanomma, metastasis and lymphoma) were included. Training images are specifically partitioned into training and testing set in a 4.7:1 ratio and training undergoes optimization through back-propagation over a series of 300 potential epochs. The best performing model is selected for further testing and validation. All steps including tile selection, annotation, training and validation were automated using the Python programming environment and accelerated using the NVIDIA geforce 1080 titan Xp graphic processing unit (GPU).

Expansion of CNN Workflow to Accommodate Additional Classes.

In addition to annotating and classifying new slides, the diagnostic capabilities of the system and workflow can be expanded using a fully automated training approach. This process, which allows for automated extraction and annotation of lesional tiles, can generate 100,000's of image tiles for existing and new class types using previously learned features and annotations found in accompanying pathology reports. Specifically, the CNN can automate retrieval of diagnostic ("lesional") areas and use these tiles incorporate new classes into a workflow. For example, this can be used to automate training of a CNN capable of differentiating between different molecular GBM subtypes (IDH-mutant/wildtype). GBMs represent the most common primary brain tumor type and as a group carry a dismal prognosis. A small subset of histologically indistinguishable GBMs however, found to carry IDH-mutations, show a superior prognosis compared to GBMs without IDH mutations (IDH wildtype). This important molecular subdivision has led to a recent change in glioma classification where GBMs are subdivided into two distinct clinicopathological classes (GBM, IDH-mutated and GBM, IDH-wildtype). To investigate if these molecular subtypes could be differentiated using CNNs, 580 H&E stained digital WSI from the TCGA database may be used to automate generation and selection of 179,470 lesional image patches (1024×1024 pixel) and used them to train, validate and test a CNN classifier optimized at distinguishing between these two genomically distinct GBM subtypes. Indeed, this approach yielded a test accuracy of 86% with an AUC>0.97 on 31 independent local test cases (FIG. 10). A similarly high testing accuracy of 84% and an AUC of 0.98 can be reached for a local set of gliomas for a 1p19q co-deletion classifier using a training set of 76,000 genomically-annotated images from the TCGA low grade glioma dataset. The described automated approach can be used to rapidly expand the CNN to resolve distinct tumor classes that are even indistinguishable to the human observer. A resource housing a comprehensive slide cohort that spans the vast majority of tumor types and classes with full genomic annotations and near complete clinical follow-up as well as the automated approach to expand train images to reach over 10,000,000 image tiles that span the vast majority of diagnostic tumor classes in neuropathology. A similar approach where initial manual annotation are eventually transitioned to an automated workflow can be used to train additional CNNs on the array of immunostains used by neuropathologists.

The 9- and 13-class image classifier can be used to identify areas classified as lesion (not normal) in the TCGA images and generate a separate 2-class IDH-classifier CNN. The 9- and 13-class CNN are used to generate new "lesional/tumor" tiles that reach a prediction score of 85% (an example high cut-off), are taken to represent an area of the slide with tumor. Diagnosis information (or molecular information or clinical information) can be used to make new training classes and digital pathology platform 110 can use deep learning to differentiate between the different tumor types/molecular subclasses in TCGA. As an example, images can be used to develop a new CNN that can be incorporated into the modular or hierarchical CNN approach. This means that the "IDH-classifier" CNN is only activated if the previous CNN in the hierarchy classified the particular slide a "glioma". IDH mutations only really make sense in the context of gliomas, so this CNN is only activated in a context specific manner. This same approach could also be used to generate news images of new tumor class that can then be incorporated into the 13-class CNN to make it 14-classes and so on.

Integrated Summary Outputs

To provide intuitive display output for pathologists and researchers, an automated generation of a summary report for each slide analyzed can be provided. For example, this can display the original WSI, an accompanying class activation map ("heatmap") showing where lesional tissue was identified, and summary statistics for each identified class. The mostly likely diagnosis based on these prediction scores can be displayed separately as a percentage (red box in FIG. 9). To reduce misclassification, a second classifier which uses the distribution of lesion tiles on a t-SNE plot was also developed. Cases where there is disagreement between the two methods are deemed "undefined" and signal the human interpreter to closely review the case. Immunohistochemically interpretation for each immunostain associated with each slide can be further integrated and can further refine the diagnosis. These integrated reports can serve as a "second opinion" and as a preliminary report that can be reviewed and approved by the pathologists. For researchers without formal pathology training, these intuitive reports, provide key microscopic quality metrics (% tumor & necrosis) for downstream molecular analysis.

t-SNE Visualization and Classification.

In order to intuitively visualize computer vision and classification, training and test images can be plotted on a 2-dimensional representation (t-distributed Stochastic Neighbour Embedding (t-SNE)) derived from the high-dimensional data stored within the trained CNN. In an example experiment, this was done for either all classes (13-class model), or the IDH-mutation classes (IDH-class model). For the 13-class and IDH-mutation t-SNE, a random selection of approximately 500 and 10000 image tiles can be plotted for each class, respectively.

For classification of new test WSI, the spatial distribution of a random selection of 100 test tiles were used. This allowed the ability to determine what cluster (class) a tile belongs to or whether it is anomalous (falls in between class clusters). The cumulative distribution of up to 100 lesional tiles were used to provide an alternative diagnostic readout for each WSI.

Biostatistics and Bioinformatics Analysis:

The performance of the CNN associated with digital pathology system 100 can be continually assessed by several methods. For each new training experiment, new tile sets are divided into non-overlapping training (70%), validation (15%) and test (15%) sets. Training is optimized through back-propagation over a series of 300 potential epochs and the best performing model then undergoes further testing on the test image set. Only CNNs that achieve an area under the curves (AUC) of 0.9 and a tile-level classification accuracy of 80% may be included into the workflow. These CNN classifiers can then be further tested and validated on a completely new set of WSI from a diagnostic neuropathology practice. Performance usually improves when it is assessed and averaged over the WSI as compared to individual tile-level scoring. A similar approach can be used to include and test additional morphologic, survival and molecular sub-classes into a growing classification workflow (FIG. 10).

The external ("real world") validity of a classifier may be tested continually on perspective unselected cohorts of cases from an example diagnostic neuropathology practice. This has been carried this out on 50 slides spanning 20 cases with good results. Classification performance will be assessed with both classification accuracies (% cases correct), and for common tumor types, where sufficient new cases can be accumulated, using the area under the receiver operator curve (AUC) statistic (example: FIG. 10 (E)). For more rare tumors, performance testing will be carried out at the tile level, sampled from available non-overlapping cases. This performance metrics will be assessed for each 100 slides with previous test slide sets being incorporated into training image repository to retain the CNNs and improve the accuracy and versatility of the workflow to additional tumor types. To maximize sampling of the inter- and intra-case diversity, when available, a maximum of up to 5 slides of any single case is included. Diagnoses and slide descriptions rendered by the CNN are compared to a consensus diagnosis provided by 3 board-certified neuropathologists. Confusion matrixes will also be generated to understand, refine, and reduce specific mis-classifications. External validation of the CNN's performance through collaborations with independent cancer center may be sought. To maximize generalization of the workflow to global centers, this will be carried out remotely using a web-based classification tool (see e.g., FIGS. 43 to 45).

Appending additional classes to a single omnipotent CNN can dramatically affect training and classification performance of already well-optimized classes. Anticipating this, a modular architecture can be used where smaller more manageable CNN components (e.g., IDH-mutation and 1p19q codeletion classifiers, FIG. 10) can be arranged in a hierarchy to carry out sequentially more refined classification tasks in the appropriate setting (e.g., following classification of a glioma). This multi-level, brain-inspired approach, reduced the need for continual revalidation of robust and pre-learned classification tasks and allows new learning tasks to be integrated and activated in a context specific manner.

Digital pathology system 100 can incorporate critical context specific clinical information (e.g., patient age, tumor location) into its classification algorithm. A more multidisciplinary and integrated workflow coupled with good human-based clinical judgement can further improve classification scores. The system can serve to augment or replace human-based clinical decision making in neuro-oncology. In some embodiments, a pathologist can engage with system 100 to give final approval to create an effective workflow that benefits from the high sensitivity of machine-based classifiers with the high specificity of the sub-specialized and experienced human observer. At the level of automation, the integration of multiple classification strategies have been found to further help to resolve machine-based diagnostic discrepancies by allowing only the most robust classifications to survive the multistep analysis (FIG. 9).

The CNNs and system can be housed on a web-based environment to allow for future trans-Canada and international collaborate validation efforts of the classification tools. This can mitigate any systematic errors arising from training on limited datasets. The performance of the classifier can be further evaluated on the large and diverse datasets of TCGA.

Even in the molecular era, histopathologic analysis continues to play an important role in optimizing care for the majority of brain tumor patients. Histopathology is, however, long overdue for innovations that can yield more objective, timely, and personalized diagnostic information. To address this gap, digital pathology system 100 can be used and the system 100 does not require initial pathologist triaging or pre-selection of cases and carries out classification on a diverse set of normal and lesional tissue types with extremely rare misclassifications. Several visualization tools are integrated to allow final human review and approval of computer driven decision making. These outputs also provide intuitive detailed analysis of tissue specimens that could also allow researcher to ask novel basic and translational research questions. For example, in addition to classic morphology-based classification of brain tumors, the automated approach allows for morphogenomic correlations and training on clinically annotated and actionable variables (e.g., response to specific treatments). The system 100 can leverages existing diagnostic material and stand to provide a tangible and sustainable impact to personalized medicine with minimal changes to clinical workflow or additional financial investment. For example, the system 100 may can allow for the discovery of novel cost-effective and timely morphologic surrogates of molecular biomarkers. This offers a highly practical way to manage the rising cost of molecular testing. The system 100, including CNNs, be expanded to other tumor types and thus offers a highly generalizable approach to large-scale morphologic (phenotypic) analysis of cancer for both basic and translational research. Migration of these robust classifiers to a cloud based environment could help provide subspecialist level neuropathology support to remote clinical and research cancer centers that may not have dedicated neuropathologists. Lastly, the system 100 and CNNs may also act as a generalizable tool that can be used to help reduce pathologists' heavy workloads and errors while also outputting novel morphologic correlates that can accelerate stratification of patents to personalized therapies.

Diffuse gliomas, as a group, represent the most common brain tumours and carry a remarkably variable clinical course. Some rapidly evolve, while others remain relatively stable for years before progression. Precise risk stratification is thus essential for personalized management. Historically, diffuse gliomas have been classified using a defined set of histologic criteria, focused on cell morphology and features of malignancy. First, they are subdivided into tumors resembling native astrocytes (astrocytomas), oligodendrocytes (oligodendrogliomas) or both (oligoastrocytomas). Low and intermediate grade lesions (World Health Organization (WHO) grade II-III) show nuclear atypia and mitotic activity, respectively. Histologically higher grade tumors show necrosis and/or microvascular proliferation (WHO grade III-IV). Unfortunately, this classification system suffers from documented subjective inter-observer variability.

More recently, large-scale genomic efforts have recovered biomarkers that more precisely differentiate between prognostic classes of gliomas. As a result, gliomas are now defined based on mutations in isocitrate dehydrogenase genes (IDH1/2) and presence of 1p/19q co-deletions, to include: (i) IDH-wildtype (IDH-wt) astrocytomas, (ii) IDH-mutated (IDH-mut) astrocytomas, and (iii) IDH-mut, 1p19q co-deleted oligodendrogliomas. This classification system better predicts clinical outcomes and treatment response than traditional histologic assessment. For example, among high grade astrocytomas, anaplastic astrocytoma (WHO grade III) and glioblastoma (GBMs, WHO grade IV), IDH mutations are favorable and stronger predictors of prognosis than WHO grading. Similarly, the clinical behavior of "oligoastrocytomas" is more precisely defined based on their IDH1/2 and 1p/19q co-deletion status. These findings have led to a recent revision in the WHO glioma classification system.

This new classification system is not without challenges. IDH-mut gliomas are relatively rare (5-10%) and not all captured by immunostaining (α-IDH1-R132H). This, therefore, necessitates IDH1/2 sequencing in a large number of negative cases. Similarly, due to potential false positives, assessment of 1p19q co-deletion by florescence in situ hybridization (FISH) is now being replaced by more costly technologies (e.g., array CGH). As the number of personalized biomarkers rise (e.g., MGMT promoter hypermethylation), the financial constraints of healthcare, make routine multi-OMICS testing difficult.

Another remaining challenge is the need for improved risk stratification among the most common glioma subtype, IDH-wt GBMs. The clinical heterogeneity of GBMs cannot yet be well accounted for with genomic biomarkers. For example, while most IDH-wt GBMs follow an aggressive course (baseline survival (IDH-wt GBMs-BS): <12 months), a clinically relevant subset, comprising ~20% and 7% of patients, will survive beyond 3 and 5 years, respectively. This latter group, collectively defined as long-term survivors (IDH-wt GBMs-LTS), however are not yet accurately resolved by a current clinical (e.g. tumor location, extent of resection, age, sex), histologic and genomic classification systems. Given the similar frequency and favorable outlook these patients share with IDH-mut GBMs, analytical models to predict long-term survivors (LTS) in IDH-wt GBMs would represent a significant milestone for personalized care.

Need for Protein-Based Glioma Biomarkers.

The following is an example application. One challenge facing gene-based biomarker discovery is the assumption that the genomic landscapes of tumors closely mirror their proteomic (and functional) phenotypes. Proteogenomic studies in colorectal, breast and ovarian cancer, that superimpose proteomic and genomic data, now show that protein abundance cannot as yet be accurately inferred from DNA- or RNA measurements (r=0.23-0.45). For example, although copy number alterations (CNA) drive local ("cis") mRNA changes, relatively few translate to protein abundance changes. In ovarian cancer, >200 protein aberrations can be detected from genes at distant ("trans") loci of CNA and are discordant with mRNA levels. These discrepancies are ominous, as KEGG pathway analysis reveals that these changes are involved in invasion, cell migration and immune regulation. Consequently, it is perhaps not surprising that these proteomic signatures outperformed transcriptomics for risk stratification between short (<3 yr) and long term survivors (>5 yr). There is a strong need for more proteomic approaches in precision and personalized medicine.

There is promise in protein-based sub-classification of GBMs. For example, the levels of 171 proteins can be analyzed by reverse phase protein arrays (RPPA) in 203 IDH-wt GBMs from The Cancer Genome Atlas (TCGA) dataset. Using this data, a 13 protein panel can be developed that can define a novel cohort of patients with a significantly more favorable outcome, not identified by TCGA's concurrent genomic efforts. Focused RPPA-based panels suggest that additional protein-based biomarkers exist and await discovery. For example, more global protein-based analysis using liquid chromatography tandem mass spectrometry (LC-MS/MS) of a small number of GBMs (n=10) can highlight a much larger proteomic landscape (4,576 proteins) in GBMs. Extension of such MS-based approaches to a larger set of GBMs offers an attractive avenue to uncover novel prognostic predictors in diffuse gliomas, and specifically in IDH-wt GBMs-LTS.

MS-based proteomic analysis is however also not without limitations. Relying on frozen tissue may often be limited from small GBM biopsy specimens. This presents a unique challenge and a significant bottleneck for largescale MS-based studies of less common glioma subgroups. Furthermore, laborious fractionation steps, to improve proteomic coverage, considerably compromise sample throughput and limit clinical utility, with leading consortiums needing 10 months of machine time to run ~100 samples. Proteomic efforts thus need to be re-examined in the context of protocols that can produce timely results, and are compatible with readily available formalin fixed paraffin embedded (FFPE) tissue. To overcome this, an abbreviated FFPE-based liquid chromatography tandem mass spectrometry (LC-MS/MS) proteomic protocol can be used. This optimized assay can potentially generate clinically relevant signatures from minute amounts of microscopically defined tissue with turnaround times of <48-72 hours. This provides a substantially improved throughput and a less resource-intensive alternative to other molecular approaches. This approach, therefore, also has significant and immediate translational potential as a novel tool for precision and personalized medicine. This is an example application and embodiments described herein are not limited to this example application.

Refining Histologic Classification of Diffuse Gliomas.

Morphologic classification of gliomas remains a valuable tool when molecular testing is not available or financially feasible. In the acute setting, surgeons often need urgent (~5-10 min) intra-operative tissue diagnoses with significant implications for the remaining surgery (e.g., extent of resection). Sub-acutely, histologic analysis is a vital time and cost-saving tool to triage molecular assays (e.g., FISH) to appropriate clinical contexts. In these scenarios, morphologic interpretation also offers timely information, with which the neuro-oncology team can begin therapeutic planning. Similarly, when only minute amounts of tissue can be safely biopsied, accurate histologic interpretation becomes the chief tool to guide patient care. The emergence of data-rich molecular studies has, however, diminished the perceived value of morphologic analysis. As a result, innovative applications of morphology to precision medicine significantly lag behind their molecular counterparts.

To resolve this disparity, artificial intelligence (AI)-based algorithms can be used to define robust histologic correlates of molecular alterations and biological behavior in diffuse gliomas. Specifically, a form of AI known as convolutional neural networks (CNNs) is proving capable of complex expert-level decision making such as diagnosing skin lesions with dermatologist-level accuracy. Unlike the simplified diagnostic algorithms used by pathologists to minimize inter-observer variability, CNNs deconstruct images into pixels and then sequentially aggregate them to form shapes (e.g., lines) and specific features (e.g. nuclei) for objective classification (FIG. 18). When given enough clinically and genomically well-annotated training images, CNNs can learn to resolve subtle features, not reliably discernible to the human eye. For example, AI-based tools, when trained with images of non-small cell lung cancers found in The Cancer Genome Atlas (TCGA), can identify novel morphologic features that predict survival. CNN-based scanning for metastatic tumor foci in lymph nodes achieved substantially lower false-negative rates than pathologists (26.8% vs 7.6%). With sufficient training, CNN may even offer complementary timely and cost-effective surrogates of molecular biomarkers (e.g., IDH1/2, 1p19q and MGMT status) for certain cases. Similarly, CNNs may help identify predictive histologic features of responders and help stratify patients to personalized regimens (e.g., immunotherapy). Lastly, CNNs offer a cost-effective quality assurance, consensus or a timely second opinion to smaller community centers. CNN-aided pathologic analysis thus offers a promising tool for global implementation of a sustainable personalized medicine program.

There is a clinical need for novel, cost-effective approaches to routinely prognosticate and predict biological behavior in GBMs. As an example, defining the downstream phenotypic landscape (proteomics and histomics) of gliomas will contribute to this need. LC-MS/MS and CNNs can be used to identify proteomic and morphometric ("histomic") glioma biomarkers. Given the direct role that proteins play in biological function, this analysis also aims to offer insight into novel and effective therapeutic targets in subgroups of GBMs.

A clinically relevant LC-MS/MS tool for risk stratification in GBMs can be developed. Risk stratification in GBMs can include prognostic significance or clinical outcomes that correspond to the different molecular signatures of subgroups and the proteomically distinct sub-classes of those sub-groups. LC-MS/MS is well-suited for this risk stratification in GBMs. Machine learning can be used to identify glioma subgroups. Machine learning can also be used to uncover new molecular as well as proteomic signatures that correspond to given clinical outcomes of interest and biologically distinct or genomically defined glioma subgroups (e.g., IDH-wt GBMs-BS, IDH-wt GBMs-LTS, IDH-mut, etc.).

Proteomics is used as a tool to understand the molecular biology of GBMs better. As an example, AI and machine learning is used to correlate molecular signatures (e.g., proteins) to clinical outcomes.

A CNN-based histologic classification tool for diffuse gliomas can be developed. This classifier can predict clinical outcome as well as identify genomically defined glioma types (e.g., IDH-wt GBMs-BS, IDH-wt GBMs-LTS, IDH-mut, etc.) given images of digital slides. In an example, deep learning is used to predict clinical outcome and glioma subtypes from digital images.

A clinically relevant LC-MS/MS tool for risk stratification in GBMs can be developed. There is a current dearth of biomarkers for the common IDH-wt GBMs. Emerging proteogenomic studies now show that downstream protein signatures of neoplasms are strong predictors of biological behavior. Gliomas, and specifically IDH-wt GBMs, may thus benefit from a broad proteomic analysis. A rapid FFPE-compatible proteomic platform may be optimized in a manner that is useful in the prompt differentiation between different brain tumor and glioma types. Embodiments can use the abbreviated LC-MS/MS method to study and subclassify a larger set of GBMs.

There is an interest in molecular refinement of classic definitions of neuropathological processes. Novel strategies to interrogate biologically defined subpopulations of cells should be developed. An FFPE-based proteomic workflow can be optimized that leverages clinical expertise and access to extensive archival clinical material. For example, this strategy can be to study dynamic proteomic changes within the developing fetal brain and identified novel protein signatures of brain development and related pathologies.

The approach can be optimized to FFPE tissue and can use reduced laborious fractionation steps to improve throughput and cost-effectiveness. In short, tissue lysates can be prepared from strategically selected, well-defined anatomical regions and developmental milestones of the fetal brain. These well-annotated regions can then be analyzed by label-free shotgun LC-MS/MS (ThermoFisher Q-Exactive Plus) to define spatiotemporal proteomic signatures of development. The protocols can routinely yield >2,200 quantified proteins from dissected regions of 30 μm thick sections that mirror the well-accepted function of the anatomical and developmental coordinates. Hierarchical clustering of proteomic signatures allows accurate spatiotemporal classification of anatomical regions and discovery of novel biomarkers. Importantly, quantitative measurements using this approach can show strong concordance with orthogonal immunohistochemical methods.

The validated workflow can be translated to a set of common brain tumors. This includes IDH-wt and IDH-mut GBMs, IDH-mut 1p/19q co-deleted oligodendrogliomas, meningiomas, and medulloblastomas (n=21). Indeed, the developed preliminary signatures differentiate between brain tumor types. Importantly, hierarchical clustering shows reliable differentiation between IDH-mut and IDH-wt tumors. Achievement of these technical milestones highlights capabilities to profile a large set (n=200) of gliomas and define novel molecular subgroups for improve risk stratification.

Example Experiments

Example embodiments were tested using an example experiment.

Recruitment and Curation of a Glioma Cohort:

A locally established and clinically well-annotated cohort of diffuse gliomas enriched for IDH-wt GBMs-LTS was leveraged. This is a clinically distinct and currently molecularly undefined class. This cohort can allow assessment of potential proteomic differences in IDH-wt GBMs with baseline or long-term survival (BS vs. LTS) and other glioma types. Multi-OMIC genomic profiling efforts and a large neuro-oncology service can creates a unique resource.

The cohort includes an appropriately powered set of 200 diffuse gliomas. All cases represents initial treatment-naïve tissue resections and include 25 IDH-mut low grade astrocytomas, 25 IDH-mut GBMs, 25 IDH-mut 1p/19q co-deleted oligodendrogliomas, and 125 IDH-wt GBMs. IDH-wt GBMs have a median survival (MS) of 12-15 months, while IDH-mut GBMs (MS: 30 months), low grade astrocytomas (MS: 60 months) and oligodendrogliomas (MS: 10-15 yrs) have much longer, non-overlapping survivals. These latter tumors thus serve as strong positive controls for identifying risk stratification signatures in an example cohort. The IDH-wt GBM cohort has similar treatment and demographic parameters but stratified to include substantially divergent overall survival. Patients with an overall survival (OS) of <12 months will be classified as GBMs with baseline survival (GBMs-BS, n≥25), while patients with an overall survival of >36 months will be classified in the GBMs with long term survival (GBMs-LTS, n≥25) groups. Twenty-five cases of both BS and LTS have been defined. An additional 75 IDH-wt GBMs can be recruited from a tumor bank. The companion cohort of IDH-wt GBM-BS can be stratified, from the much larger pool of available cases, to match for other clinically relevant variables (age, sex, and location, extent of resection, molecular subgroup, treatment regimen and MGMT status). This approach will help to significantly reduce confounding variables. All cases are reviewed by board-certified neuropathologists to ensure that cases have >80% viable tumor and the appropriate molecular diagnosis. A larger validation cohort can be used.

Proteomic Profiling:

The optimized LC-MS/MS workflow can be used to profile and define proteomic signatures of 25 IDH-wt GBMs-BS, 25 IDH-wt GBMs-LTS, 75 additional IDH-wt GBMs, 25 IDH-mut GBMs, 25 IDH-mut low grade astrocytomas, and 25 IDH-mut 1p/19q co-deleted oligodendrogliomas (200 cases total). From a technical perspective, the LC-MS/MS proteomic profiling approach will mirror the optimized protocol described above. The abbreviated approach is fully compatible with this goal as >250 samples have already been profiled this past year alone.

Biostatistics and Bioinformatics Analysis:

Proteomic profiles of the diffuse gliomas cohort can first be analyzed using an unsupervised clustering approach (Perseus software) to uncover molecular signatures of biologically distinct glioma subgroups. Consensus and X-means clustering can be used to establish the optimal number of glioma subgroups. In addition to the IDH-mut glioma types, this analysis can also identify proteomically distinct sub-classes within the larger (n=125) IDH-wt GBMs cohort. The prognostic significance of these subgroups can then be assessed through Kaplan-Meier analysis. Whether particular proteomic subgroups within the dataset enrich for known biomarkers of diffuse gliomas, such as MGMT promoter methylation, IDH1/2 mutation and 1p19q co-deletion status, can also be evaluated.

These proteomic sub-groups may also represent gliomas driven by pathways amenable to pharmacological inhibition. Gene Ontology and gene set enrichment analysis (GSEA) will thus be used to predict driver pathways that may serve as promising targets for personalized therapeutic interventions. This approach has already proven effective in a workflow with a 94-fold increase in detection of downstream targets (e.g., NAB2/STAT6) of the Early Growth Response 1 (EGR1) driver pathway in solitary fibrous tumors compared to other brain tumor types.

Prognostically favorable proteomic signatures may exist, independent of these self-organizing biological subgroups. The data can be reanalyzed using a more intensely supervised approach, based on the clinical outcomes groups outlined above (BS vs. LTS in IDH-wt GBMs). Machine learning algorithms can be used to develop protein-based prognostic classifiers. For this analysis, IDH-wt GBMs can be assigned into training and test sets for prognostic biomarker discovery and model testing. The training set serves to develop and optimize various classification models. The best preforming model can be applied to the test set and assessed by calculating the area under the receiver operative characteristic curve (AUC). Signature development employs feature-selection on a mix of discrete and discretized variables, followed by aggregation using hyperparameter-optimized RandomForest learners with bootstrapping to optimize model selection (R-package, Python).

Pilot data reveals that the standardized patient-to-patient variance of individual protein abundance measures ($\mu_o=1$) have an average standard deviation ($\mu_o$) of 1.34. An example minimum sample size (n=25 per group), therefore, provides sufficient statistical power (Power=0.8, $\sigma_{error}=0.000025$, Bonferroni-corrected) to detect prognostic biomarkers with a minimal protein abundance change of 2.95 fold. In fact, the assay can identify larger protein abundance changes (e.g. >60-fold enrichment of the putative neural stem cell marker Filamin C (FLNC)) between IDH-mut and IDH-wt GBMs.

Example Alternative Approaches

This investigation can generate unique phenotypic information that can serve as a springboard for novel, unexplored hypotheses in gliomas and particularly in IDH-wt GBMs.

It can also possible that additional subtype-specific signatures may not be clearly identifiable in a IDH-wt GBM cohort using an abbreviated FFPE-based approach. In this case, there are a number of alternative approaches to achieve success. For one, inclusion of a small number of fractionation steps can increase proteomic coverage and identify additional biomarkers. Furthermore, use of frozen tissue can also be explored if biomarkers are not initially identified in FFPE samples. However, the benefits of using a rapid and cost-effective FFPE-based assay is preferable. The dramatic proteomics differences of IDH-wt and IDH-mut GBMs serve as an example.

The use of "data independent analysis" (DIA) can improve the yields of a shotgun LC-MS/MS workflow. This approach includes construction of a large protein library that is run concurrently with the samples of interest. Such an approach can provide marked improvements in the consistency and coverage of the proteins identified, without the need of fractionation steps. Incorporation of such methodological advancements offers additional solutions to potential pitfalls, while still maintaining the strengths of the example workflow.

Impact:

The discovery of IDH1/2 mutations revolutionizes the clinical practice of modern neuro-oncology. There are, however, still molecularly undefined groups of GBMs (e.g., IDH-wt GBMs-LTS) of equal prognostic significance. Discovery of biomarkers for this latter group can therefore improve risk stratification in a similar subset of GBM patients. Largescale MS-based analysis can highlight the potential of proteomics at improving prognostication in a variety of cancer types. The optimized FFPE-based LC-MS/MS workflow aims to translate this promising technology to diffuse gliomas, and particularly, IDH-wt GBMs. Similarly, a generalizable, cost-effective and rapid precision-based tool may be introduced for cancer care that can be easily translated into the current FFPE-based clinical workflow.

A CNN-based histologic classification tool for diffuse gliomas can be developed. Histologic analysis lags behind more contemporary molecular tools in precision-based diagnostics. Molecular tools are, however, not always readily available and thus clinicians still often rely on histomorphology for clinical decision making. Advances in a form of AI, known as CNNs, now allow computers to excel at complex image-based tasks. A CNN-based brain tumor classifier has been developed as exemplified in embodiments described herein. This tool can be applied to a larger set of diffuse gliomas to identify novel histologic ("histomic") predictors of molecular changes and outcomes. This can revolutionize morphology-based classification of diffuse gliomas by rendering refined, rapid, objective and cost-effective interpretations.

Figure 22:
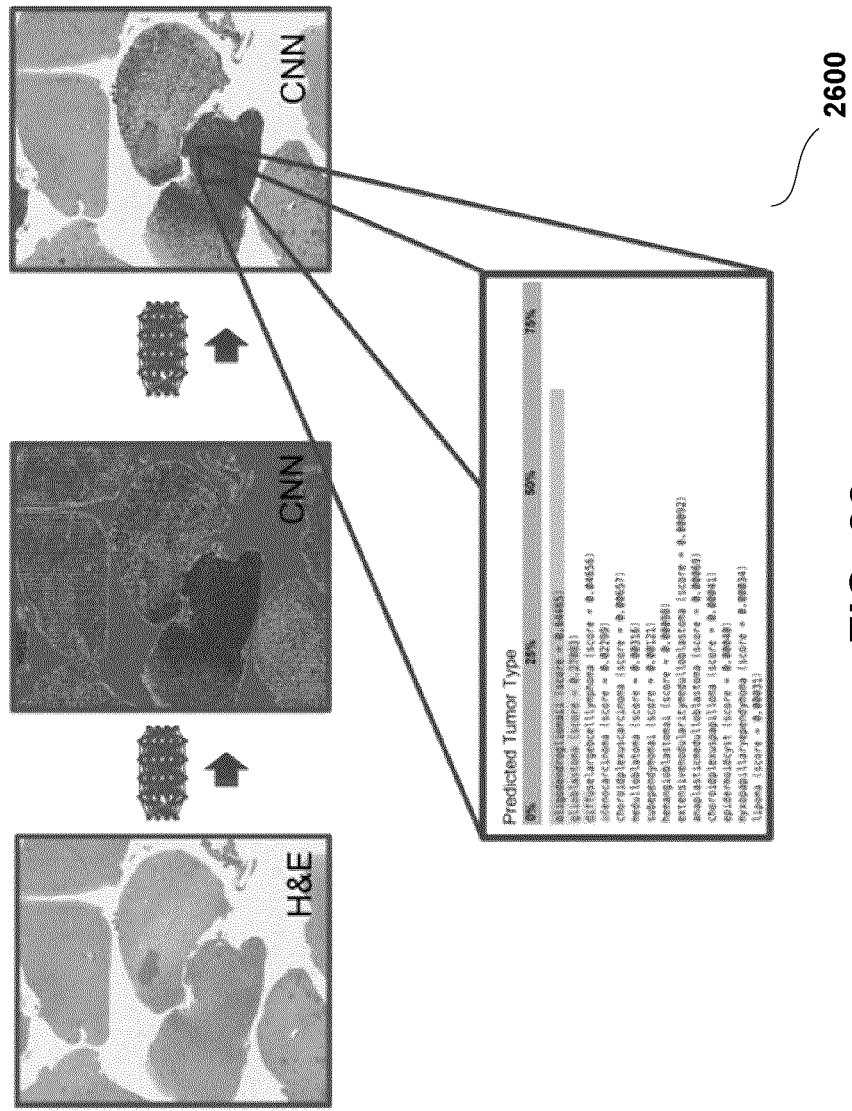
FIG. 22 depicts CAMs reflecting tumour type classification by digital pathology platform.
Figure 24:
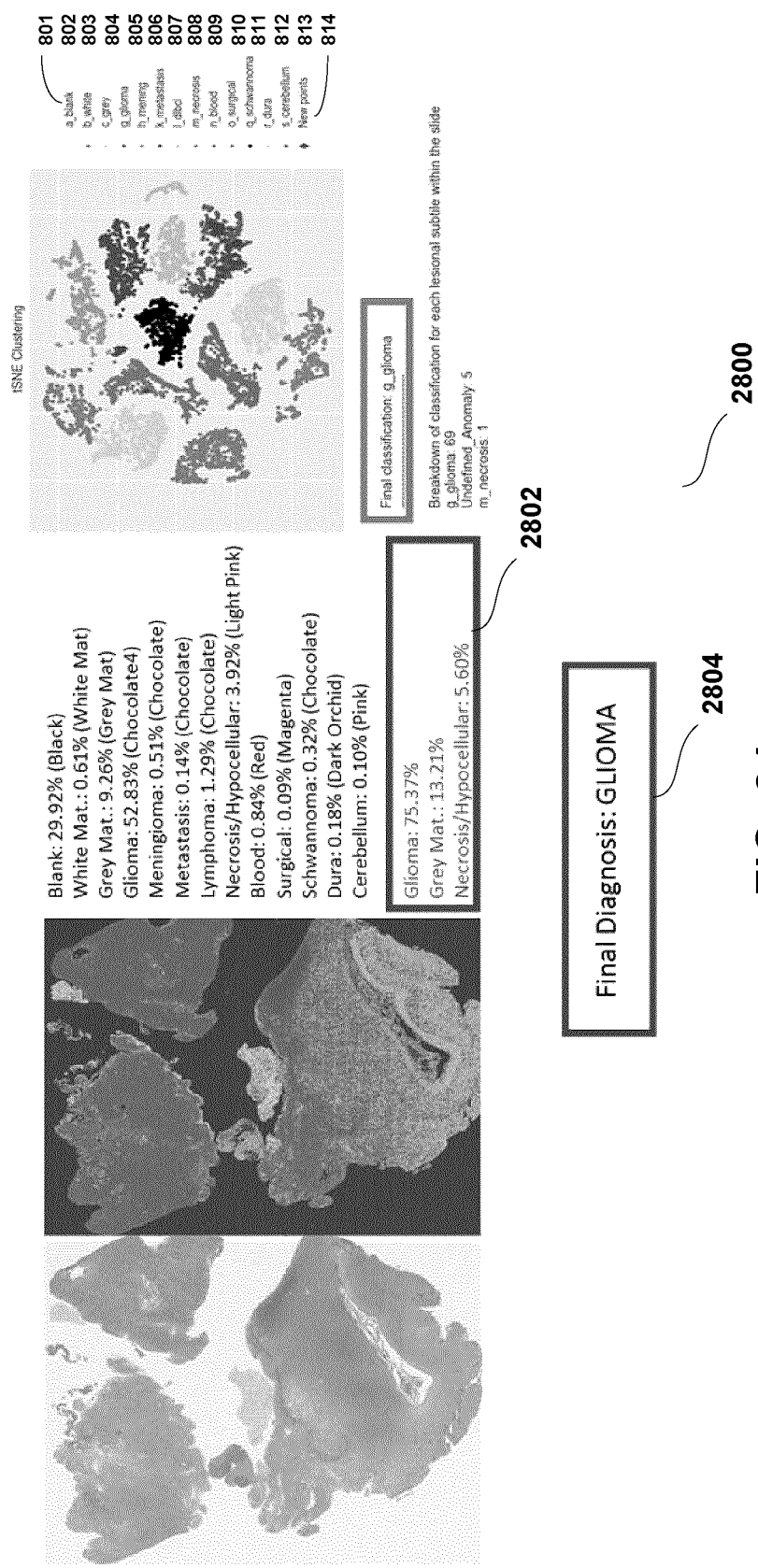
FIG. 24 depicts CAMs reflecting tumour type classification by digital pathology platform.
Figure 25:
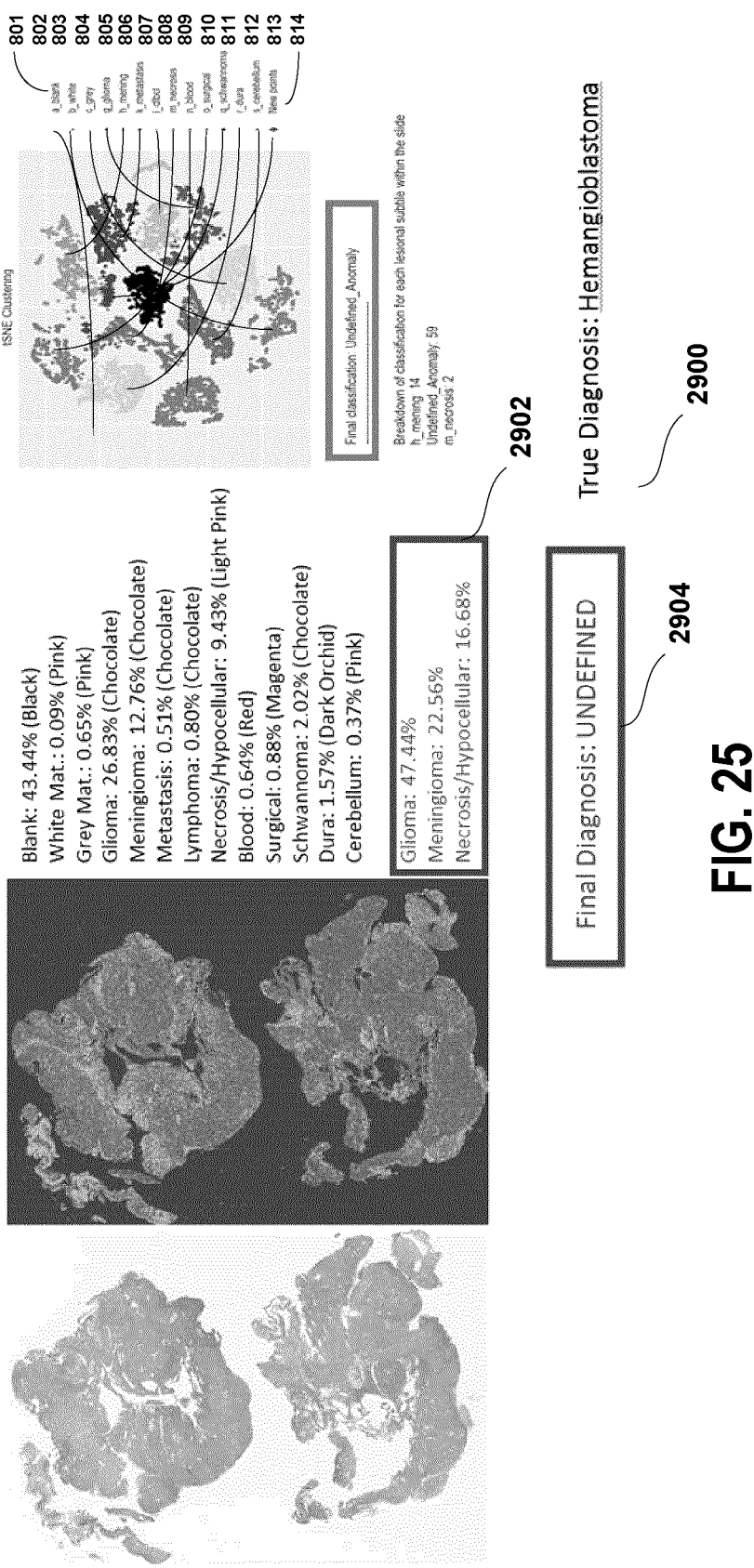
FIG. 25 depicts CAMs reflecting tumour type classification by digital pathology platform.

Histomic correlates of specific molecular changes, patient outcomes and treatment response can be defined. Toward this, an automated and precise AI-based diagnostic workflows compatible with hematoxylin and eosin (H&E)-stained slides is developed. In short, neuropathologist (P.D.) annotated digitized slides are used to train CNNs to analyze cell morphology, highlight regions of interest and carry out histology-based brain tumor classifications (FIGS. 5 and 6). From each digitized slide, >200-2000 unique and diagnostic "image patches" (1024×1024 pixels) are extracted to form a robust training set for machine learning. These images are used to retrain the VGG19 CNN image classifier using the Python programing language. For example, this workflow can train CNNs to differentiate between a pilot set of 12 different brain tumors types (FIG. 22). The CNN includes >30,000 pathologist-annotated images of brain tumors. Training with even this relatively small number of pilot images shows promise, with classification accuracy of 95% of test images spanning a diverse array of brain tumors and AUC of over >0.96 for a number of different binary classification tasks. Furthermore, the workflow is automated to allow for streamlined AI-based slide annotation, lesion detection and classification (FIG. 6). These technical milestones allow for training with a larger set of clinically-stratified gliomas. The CNN can be trained to include >10 training images spanning all glioma types, to allow predictions of not only cell-of-origin, but also molecular and clinical parameters.

Example embodiments were tested using an example experiment.

An existing clinically and molecularly annotated glioma cohort (n=200) was levered. H&E slides (1-2 per/case) from each case was digitized and used to train the CNN and to assess its performance as a glioma classifier. To reinforce training of a digital cohort, the open access TCGA digital slide archive can be used. This includes digital slides from both low-grade gliomas (TCGA-LGG, n=516) and glioblastomas (TCGA-GBM, n=605) with corresponding diagnoses, molecular and clinical information. This can provide well over >1,000,000 image patches for robust training and feature extraction. A hold-out test set can then be used to assess if the CNN can resolve subtle but objective morphologic differences between gliomas with varying IDH-mutation, 1p/19q co-deletion and MGMT promoter methylation status.

In another example 28 TCGA lung adenocarcinoma cases were used to generate another cohort consisting of 1024×1024 pixel tiles from various microscopic features seen in lung tissue specimens. Following training of the VGG19 CNN using this cohort of images, our classifier reached a training accuracy of over 95%. As illustrated in FIG. 46, classes included 'adenocarcinoma', 'alveolar tissue', 'stromal tissue', and 'blank'. Excellent separation between individual tissue types is demonstrated on a clustered t-SNE plot, with performance characteristics listed just below plot (A) 5410. Further quality control and differentiation of the different classes is highlighted by the dendrogram demonstrating hierarchical clustering of tissue images to their appropriate branch (B) 5420. A heat map depicting clustering of 512 individual features (horizontal axis) for training classes (vertical axis) is shown in (C) 5430. This provides a complementary visualization of the data stored within the CNN. Overall the wide distribution of classes once again allows us to classify lung tumors using our t-SNE approach. This highlight the generalizability of our approach beyond just brain tumor cases.

In addition to training the CNN to differentiate between genomically defined glioma types, correlation with novel proteomic subgroups can also be assessed. Similarly, the CNN can be used to potentially differentiate IDH-wt GBMs with diverse clinical outcomes (BS vs LTS). This can also be applied to different types of lung cancer.

Slide Scanning and Training Set Development:

A high-throughput digital slide scanner can be used to digitize a cohort @ 40× resolution (>400 slides). All slides can be anonymized with identifying patient information removed from images. These slides can only be identifiable by a study identifier that in linked to demographic and molecular information in a password-protected file. Additional cases can be prospectively selected and scanned when assessing the performance of the classifier in a clinical setting. >200-2000 pathologist-annotated images (patch size: 1024×1024 pixels) can be extracted from each slide using Aperio ImageScope software.

Development and Training of Glioma CNN:

The CNN is constructed using the open source Python programing language and utilizes the Tensorflow and specifically the InceptionV3 architecture, an extensively pre-trained CNN-based image-classifier. To remove systemic variation in images that may erroneously affect tumor classification, each "image patch" first undergoes several random alterations (e.g., 90° rotations, changes in brightness/saturation). A glioma CNN can be trained on >1,000,000 image patches. Although training can take some time (hours-days), once trained, CNNs can classify images within seconds. The glioma CNN can be housed in a cloud-based environment, to allow it to function as a global referral tool for remote cancer centers.

Biostatistics and Bioinformatics Analysis:

The performance of the CNN can be assessed by several methods. A test set of randomly selected cases can be created from an original local cohort (size: 10% of training set) generated using a 10-fold cross-validation approach. This testing includes calculating various areas under the curves (AUC) and "%-correctly classified" for all diagnostic, survival and molecular classes detailed above. All slide classifications use an "unbiased" automated and global approach that first localizes abnormal tissue on the slide and takes an average of classifications from CNN-defined lesion areas (See FIG. 6). A similar approach can be used for the low grade gliomas and GBMs in the TCGA datasets. These freely available online images come with substantial amount of clinical and molecular information and allows evaluation of the CNN's ability to predict specific molecular changes and survival from morphologic features. Specifically for this, an assessment can be made to determine if the CNN can better predict IDH and 1p19q co-deletion status in pathologically ambiguous "oligoastrocytomas".

The external ("real world") validity of the classifier can also be assessed with prospective cases from the diagnostic neuropathology practice. For this, the performance of the CNN can be intermittently (quarter-year) evaluated against current diagnostic workflow. Specifically, this can include scanning and evaluating the CNN's classification performance on all gliomas cases. This can allow assessment of the potential improved efficiency and impact (e.g., faster preliminary diagnosis, performance with frozen sections and predicted molecular changes). Lastly, the CNN's performance can be validated at an independent center.

Machine learning can sometimes be prone to systematic errors when trained on small datasets, that limits applicability to "real-world" examples. However, improvements in computer processing power (e.g., use of GPUs) can accommodate larger, more complex training sets that overcome these limitations. These advances and the digital pathology system 100 can tune the CNN to perform well in diverse environments. Similarly, the use of both local and public (TCGA) image sets help mitigate systematic digitization errors and artifacts. The CNN algorithm can incorporate critical clinical data for classification (e.g., imaging, age, location). A more multi-disciplinary and integrated workflow, coupled with good human-based clinical judgment, can further improve the CNN's classification scores. The classifier can be a completely autonomous AI-based classifier. Other areas of neuro-oncology (e.g., radiology) can be incorporated into the AI-workflow. Such a synergism of multidisciplinary data can even uncover improved multi-parametric algorithms for risk stratification.

Impact:

Even in the molecular era, histopathologic analysis continues to play an important role in optimizing care for the majority of brain tumor patients. Histopathology is, however, long overdue for innovations that can yield more objective, timely, and personalized diagnostic information. The digital pathology system 100 including one or more CNNs can address this gap. Specifically, the trained CNN can provide prompt, intra-operative information that neurosurgeons can use to tailor surgical resections. In the sub-acute setting, the CNN can provide timely and valuable information to help triage molecular tests, reduce diagnostic work-up times and improve accuracy. This is critical in smaller oncology centers that may not have dedicated neuropathologists. Lastly, the CNN may also act as a generalizable tool that can be used to identify novel morphologic predictors of response and help stratify patents to appropriate and personalized therapies.

Digital pathology system 100 applies new technologies and analytical methods to resources to generate precise and personalized risk stratification algorithms for GBM patients. The multi-parametric analytical models also allow for incorporation of key demographic variables (e.g., age and sex).

Furthermore, this helps development of global protein-based signatures of GBMs, a highly relevant readout of prognosis and biological behavior. By leveraging a unique cohort enriched in IDH-wt GBM-LTS, novel biomarkers for improved prognostication can be developed. Secondly, the close phenotypic association of protein with function aims to reveal novel, actionable and personalized therapeutic targets. Importantly, a clinically relevant FFPE-compatible proteomic approach is introduced that reduces laborious steps and costs. Similarly, the CNN-classifier can leverage existing diagnostic material. Theses state-of-the-art tools thus stand to provide tangible and sustainable impact to personalized medicine with minimal changes to clinical workflow or additional financial investment. In fact, the AI-based histomic classification tool may allow for robust predictions of molecular changes using existing H&E slides. This offers a highly practical way to manage the rising cost of molecular testing, both locally and at remote national and international institutions through cloud-based tools. Overall, digital pathology system 100 including one or more CNNs harmonizes existing morphologic and genomic datasets with new phenotypic signatures (proteomics and histomics) and develops novel and cost-effective tools with immediate translational potential to precision and personalized medicine.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer platform for digital pathology comprising:
memory having a stored data structure defining a hierarchy of convolutional neural networks that model a hyperdimensional space, the hierarchy of convolutional neural networks trained using pathology images;
one or more processors in communication with the memory having the stored data structure defining the hierarchy of convolutional neural networks; and
one or more programs, wherein the one or more program are stored in the memory and configured to be executed by the one or more processors, the one or more programs including instructions to:
determine a region of interest on a pathology slide and a predicted region of interest (ROI) type by classifying a plurality of pathology features abstracted from the pathology slide and identifying the region of interest on the pathology slide by a processor of the one or more processors using the hierarchy of convolutional neural networks defined by the data structure stored in the memory; and
generate, at an interface tool for display on a display device, output indications of the region of interest on a visual representation of the pathology slide, a reduced dimensionality view of the pathology features for classifying the predicted region of interest type, and annotations of the predicted region of interest type on the visual representation of the pathology slide.

2. The platform of claim 1, wherein the processor executes the instructions to determine the predicted region of interest type by determining a mapping of the region of interest to a portion of the hyperdimensional space, wherein the portion recognizes one or more of the plurality of pathology features consistent with the predicted region of interest type.

3. The platform of claim 1, wherein the processor executes the instructions to generate the output indications comprising a surface map showing the basis of a prediction for the predicted region of interest type, the surface map being the reduced dimensionality view of a classification for the predicted region of interest type.

4. The platform of claim 1, wherein the processor executes the instructions to use a first convolutional neural network to classify the pathology slide and, based on the classification, select a second convolutional neural network to determine the region of interest on the pathology slide.

5. The platform of claim 1, wherein the output indications comprise an original pathology slide, a false colour slide showing the region of interest, an overall view of the original pathology slide and the false colour slide, and a legend indicating the predicted region of interest type and an associated false colour.

6. The platform of claim 1, wherein the processor executes the instructions to receive, at the interface tool, an input indication that a specific region of interest is of an unknown type.

7. The platform of claim 1, wherein the processor executes the instructions to determine a prediction score for the predicted region of interest type using the convolutional neural network.

8. The platform of claim 1, wherein the processor executes the instructions to generate, at the interface tool, a t-distributed stochastic neighbor embedding visualization of the convolutional neural network, the t-distributed stochastic neighbor embedding visualization depicting the hyperdimensional space modeled by the convolutional neural network.

9. The platform of claim 1, wherein the processor executes the instructions to determine the region of interest on the pathology slide and the predicted region of interest (ROI) type by tiling an image on the pathology slide into a plurality of image tiles and classifying the plurality of image tiles using the convolutional neural network.

10. The platform of claim 1 wherein the processor executes the instructions to generate a distribution of a plurality of image tiles on a t-distributed Stochastic Neighbour Embedding plot to display, at the interface tool, a planar representation of the convolutional neural network.

11. The platform of claim 10 wherein the processor executes the instructions to project representative image tiles from the plurality of image tiles onto the planar representation.

12. The platform of claim 1, wherein the processor executes the instructions to generate, at the interface tool, a class activation map having the region of interest and the predicted region of interest type.

13. The platform of claim 1, wherein the pathology features and the predicted region of interest type comprise a tumor type selected from the group of a cancer tumor type, a brain tumor type, and a lung tumor type.

14. The computer platform for digital pathology of claim 1 wherein the processor executes the instructions to:
  detect a lesion on a pathology slide by implementing multi-class lesion segmentation using the convolutional neural network;
  determine a lesion classification of the detected lesion by implementing multi-class lesion classification using the convolutional neural network;
  determine a lesion sub-classification of the lesion classification by implementing lesion sub-classification using the convolutional neural network; and
  generate, at the interface tool for display on the display device, the output indication comprising the lesion sub-classification on a visual representation of the pathology slide.

15. A process for digital pathology upon an unclassified pathology image comprising:
  receiving the unclassified pathology image;
  determining a region of interest on a pathology slide and a predicted region of interest (ROI) type by classifying a plurality of pathology features abstracted from the pathology slide by the processor using a hierarchy of convolutional neural networks that model a hyperdimensional space, the hierarchy of convolutional neural networks trained using pathology images, the hierarchy of convolutional neural networks stored on a memory accessible by the processor;
  generating output indications on the pathology image by the processor using the classification data, the output indications comprising the region of interest, the predicted region of interest type, and a surface map showing a basis of the prediction for the predicted region of interest type, the surface map being a reduced dimensionality view of a classification for the predicted region of interest type; and
  visually annotating the pathology image using the processor to generate an interface tool with the output indications.

16. A computer product with non-transitory computer readable media storing program instructions to configure a processor to:
  determine a region of interest on a pathology slide and a predicted region of interest (ROI) type by classifying a plurality of pathology features abstracted from the pathology slide by the processor using a hierarchy of convolutional neural networks that model a hyperdimensional space, the hierarchy of convolutional neural networks trained using pathology images, the hierarchy of convolutional neural networks stored on a memory accessible by the processor;
  generate output indications of the region of interest on a visual representation of the pathology slide, a reduced dimensionality view of the pathology features for classifying the predicted region of interest type, and annotations of the predicted region of interest type on the visual representation of the pathology slide; and
  update an interface tool to display the output indications and the annotations on a display device.

17. The computer product of claim 16, wherein the instructions configure the processor to determine the predicted region of interest type by determining a mapping of the region of interest to a portion of the hyperdimensional space, wherein the portion recognizes one or more of the plurality of pathology features consistent with the predicted region of interest type.

18. The computer product of claim 16, wherein the instructions configure the processor to generate the output indications comprising a surface map showing the basis of a prediction for the predicted region of interest type, the surface map being a reduced dimensionality view of a classification for the predicted region of interest type.

19. The computer product of claim 16, wherein the instructions configure the processor to use a first convolutional neural network to classify the pathology slide and, based on the classification, select a second convolutional neural network to determine the region of interest on the pathology slide.

20. The computer product of claim 16, wherein the output indications comprise an original pathology slide, a false colour slide showing the region of interest, an overall view of the original pathology slide and the false colour slide, and a legend indicating the predicted region of interest type and an associated false colour.

* * * * *